(12) United States Patent
Matsumoto

(10) Patent No.: US 10,557,948 B2
(45) Date of Patent: Feb. 11, 2020

(54) RADIATION IMAGING SYSTEM AND MOVING IMAGE GENERATION METHOD

(71) Applicant: CANON KABUSHIKI KAISHA, Tokyo (JP)

(72) Inventor: Kazumasa Matsumoto, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/135,232

(22) Filed: Sep. 19, 2018

(65) Prior Publication Data

US 2019/0094394 A1 Mar. 28, 2019

(30) Foreign Application Priority Data

Sep. 26, 2017 (JP) .................................. 2017-185316
Sep. 26, 2017 (JP) .................................. 2017-185320

(51) Int. Cl.
| | |
|---|---|
| *G01T 1/24* | (2006.01) |
| *H04N 5/32* | (2006.01) |
| *H04N 5/3745* | (2011.01) |
| *H04N 5/357* | (2011.01) |
| *H04N 5/355* | (2011.01) |

(52) U.S. Cl.
CPC .............. *G01T 1/247* (2013.01); *H04N 5/32* (2013.01); *H04N 5/3559* (2013.01); *H04N 5/3575* (2013.01); *H04N 5/37452* (2013.01)

(58) Field of Classification Search
CPC .................................. G01T 1/247; H04N 5/32
See application file for complete search history.

(56) References Cited

U.S. PATENT DOCUMENTS

| | | | |
|---|---|---|---|
| 9,467,631 B2 | 10/2016 | Dowaki et al. | |
| 9,482,628 B2 | 11/2016 | Naito et al. | |
| 9,606,246 B2 | 3/2017 | Naito | |
| 9,756,267 B2 | 9/2017 | Dowaki et al. | |
| 9,869,774 B2 | 1/2018 | Dowaki et al. | |
| 2014/0124668 A1 | 5/2014 | Ikawa et al. | |
| 2014/0139712 A1* | 5/2014 | Yamamoto | H01L 27/14632 348/296 |
| 2014/0219422 A1* | 8/2014 | Nishino | G06T 11/005 378/62 |
| 2017/0019617 A1 | 1/2017 | Dowaki et al. | |
| 2018/0203138 A1* | 7/2018 | Dillen | G01T 1/247 |

FOREIGN PATENT DOCUMENTS

JP 2016-095278 A 5/2016

* cited by examiner

*Primary Examiner* — Hugh Maupin
(74) *Attorney, Agent, or Firm* — Venable LLP

(57) ABSTRACT

A radiation imaging system for generating a moving image includes pixels each including a signal generation unit configured to convert radiation into charges; a reading circuit configured to read, from each pixel, an accumulation signal output from the signal generation unit in accordance with accumulated charges and a reset signal output from the signal generation unit in a reset state; a storage unit; and a signal processing unit stores, in the storage unit, a correction image generated based on the reset signal and the accumulation signal read from each pixel before initial irradiation, and generates a frame image in each frame period based on a radiation image generated based on the accumulation signal read from each pixel, a reset image generated based on the reset signal read from each pixel, and the correction image stored in the storage unit.

22 Claims, 22 Drawing Sheets

RADIATION IMAGING SYSTEM AND MOVING IMAGE GENERATION METHOD

BACKGROUND OF THE INVENTION

Field of the Invention

The present invention relates to a radiation imaging system and a moving image generation method.

Description of the Related Art

In the field of radiation imaging apparatuses, to improve the resolution, reduce the volume, and suppress the distortion of an image, large-area flat panel type radiation imaging apparatuses each including an equal-magnification optical system using a photoelectric conversion element have become popular. Japanese Patent Laid-Open No. 2016-95278 describes generating a frame image by subtracting an offset image generated in a state without irradiation from a radiation image, thereby removing a noise component derived from a dark current or the like. In addition, the radiation image is generated by subtracting a noise signal held by a second sample hold circuit from an optical signal held by a first sample hold circuit.

SUMMARY OF THE INVENTION

In the offset image and the radiation image, 1/f noise or noise by a temperature drift is generated by semiconductor elements such as an amplification transistor, a constant current source, and a switch included in the radiation imaging apparatus. These noise components fluctuate over time. Hence, if the time interval between offset image acquisition and radiation image acquisition is long, the difference between noise included in the radiation image and that included in the offset image becomes large, and the noise cannot sufficiently be reduced from the frame image. Some aspects of the present invention provide a technique advantageous in reducing noise in a frame image.

According to some embodiments, a radiation imaging system for generating a moving image, comprising: a plurality of pixels each including a signal generation unit configured to convert radiation into charges; a reading circuit configured to read, from each pixel, an accumulation signal output from the signal generation unit in accordance with accumulated charges and a reset signal output from the signal generation unit that is in a reset state; a storage unit capable of storing data; and a signal processing unit configured to store, in the storage unit, a correction image generated based on the reset signal and the accumulation signal read from each pixel before initial irradiation, and generate a frame image in each frame period based on a radiation image generated based on the accumulation signal read from each pixel, a reset image generated based on the reset signal read from each pixel, and the correction image stored in the storage unit, is provided.

Further features of the present invention will become apparent from the following description of exemplary embodiments (with reference to the attached drawings).

DESCRIPTION OF THE EMBODIMENTS

Figure 1:
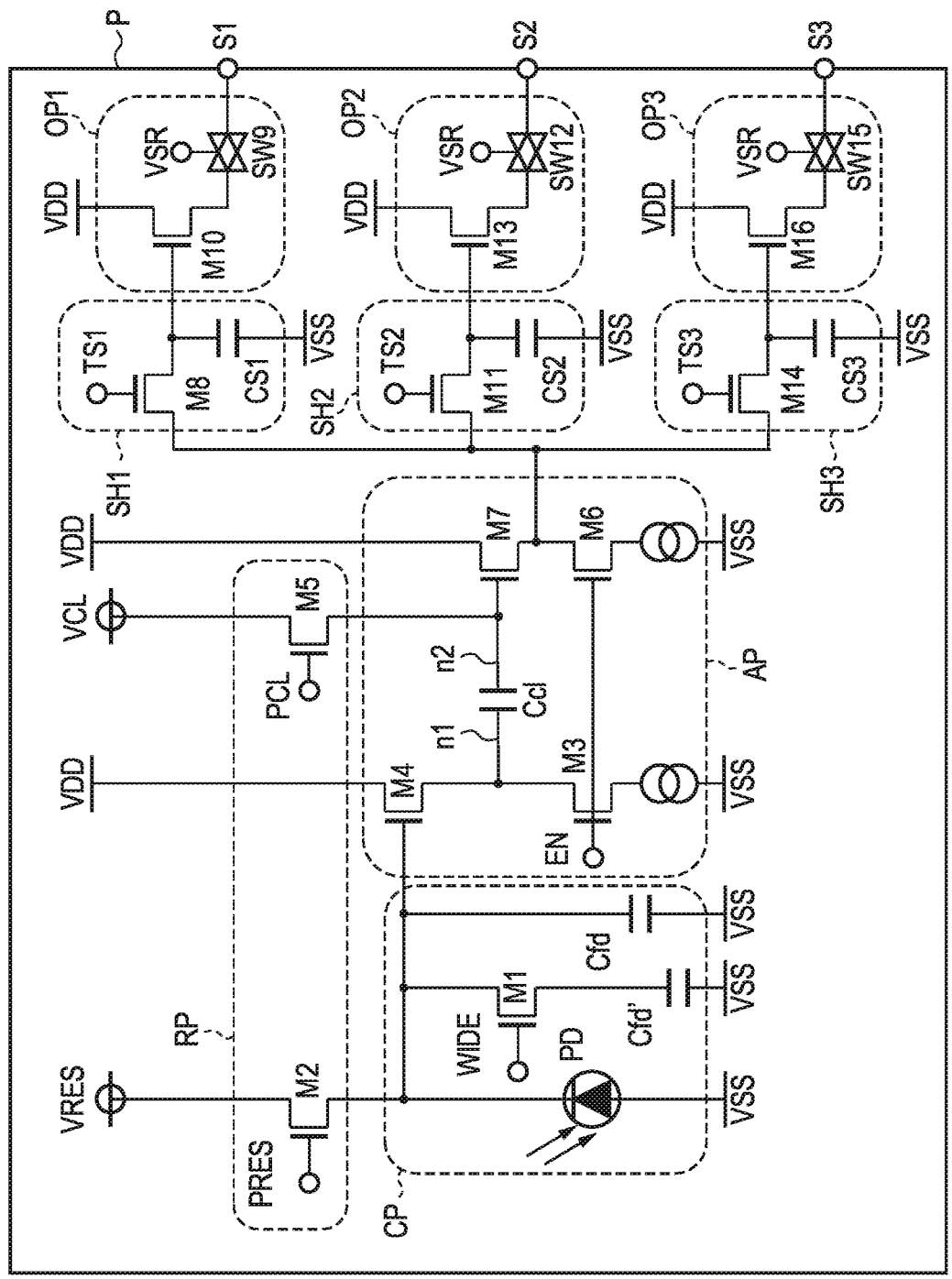
FIG. 1 is an equivalent circuit diagram for explaining the arrangement of a pixel according to some embodiments of the present invention.

The embodiments of the present invention will now be described with reference to the accompanying drawings. The same reference numerals denote the same elements throughout various embodiments, and a repetitive description thereof will be omitted. In addition, the embodiments can appropriately be changed or combined. The embodiments to be described below are directed to a radiation imaging apparatus such as a digital X-ray imaging apparatus and a radiation imaging system. The radiation imaging system particularly generates a moving image.

First Embodiment

FIG. 1 is an equivalent circuit diagram for explaining the schematic circuit of one pixel P in a radiation imaging apparatus 100 (FIG. 3) according to some embodiments of the present invention. The pixel P includes a conversion portion CP, an amplification portion AP, a reset portion RP, holding portions SH1 to SH3, and output portions OP1 to OP3. In the following example, these components are formed by circuits. For example, the conversion portion CP is formed by a conversion circuit.

The conversion portion CP includes a photodiode PD, a transistor M1, a floating diffusion capacitor Cfd (to be referred to as an FD capacitor Cfd hereinafter), and an additional capacitor Cfd' for sensitivity switching. The photodiode PD is an example of a photoelectric conversion element and converts light generated in correspondence with radiation that has entered a scintillator serving as a wavelength converter into charges. That is, a conversion element that converts radiation into charges is formed by the wavelength converter that converts radiation into light and the photoelectric conversion element that converts light into charges. Instead, an element that directly converts radiation into charges may be used as the conversion element. Charges in an amount corresponding to the radiation are generated in the photodiode PD, and a voltage of the FD capacitor Cfd corresponding to the generated charge amount is output to the amplification portion AP. In addition, the capacitor Cfd' for sensitivity switching is used to switch the sensitivity of the pixel P to radiation and connected to the photodiode PD via the transistor M1 (switch element). When a signal WIDE is activated, the transistor M1 changes to a conductive state, and the voltage of the synthetic capacitor of the FD capacitor Cfd and the capacitor Cfd' is output to the amplification portion AP. That is, one of a high-sensitivity signal that is a voltage corresponding to the charges converted by the conversion portion CP of high sensitivity and a low-sensitivity signal that is a voltage corresponding to the charges converted by the conversion portion CP of low sensitivity is output by controlling the conductive state of the transistor M1.

The amplification portion AP includes a control transistor M3, an amplification transistor M4, a clamp capacitor Ccl, a control transistor M6, an amplification transistor M7, and constant current sources. The control transistor M3, the amplification transistor M4, and a constant current source (for example, a transistor having a current mirror structure) are connected in series to form a current path. When an enable signal EN input to the gate of the control transistor M3 is activated, the amplification transistor M4 that receives the voltage from the conversion portion CP changes to an operating state. A source follower circuit is thus formed, and a voltage obtained by amplifying the voltage from the conversion portion CP is output from the amplification transistor M4. The voltage output from the amplification transistor M4 is input to the amplification transistor M7 via the clamp capacitor Ccl. The control transistor M6, the amplification transistor M7, and a constant current source are connected in series to form a current path. When the enable signal EN input to the gate of the control transistor M6 is activated, the amplification transistor M7 that receives the voltage from the amplification transistor M4 changes to the operating state. A source follower circuit is thus formed, and a voltage obtained by amplifying the voltage from the amplification transistor M4 is output from the amplification transistor M7. The clamp capacitor Ccl is connected in series between the amplification transistor M4 and the amplification transistor M7. A clamp operation by the clamp capacitor Ccl will be described together with the reset portion RP to be described later.

The reset portion RP includes a reset transistor M2 and a reset transistor M5. When a reset signal PRES is activated, the reset transistor M2 supplies a predetermined potential to the photodiode PD, thereby resetting (initializing) charges in the photodiode PD and resetting the voltage output to the amplification portion AP. The reset transistor M5 supplies a predetermined potential to a connection node between the clamp capacitor Ccl and the amplification transistor M7, thereby resetting the voltage output from the amplification transistor M7. A voltage corresponding to the voltage from the conversion portion CP at the time of resetting by the reset transistor M2 is input to an input terminal n1 of the clamp capacitor Ccl. In addition, when a clamp signal PCL is activated, the reset transistor M5 changes to the conductive state, and a clamp voltage VCL that is a predetermined potential is input to an output terminal n2 of the clamp capacitor Ccl. In this way, the potential difference generated across the terminals of the clamp capacitor Ccl is clamped as a noise component, and a voltage that changes according to the generation and accumulation of charges in the photodiode PD later is output as a signal component. This is the clamp operation using the clamp capacitor Ccl. Noise components such as kTC noise generated in the conversion portion CP and an offset of the amplification transistor M4 are suppressed by the clamp operation.

A signal generation unit that converts radiation into charges and generates a signal based on the charges accumulated in the conversion portion CP is formed by the conversion portion CP and the amplification portion AP. The signal based on the accumulated charges will be referred to as an accumulation signal. The charges accumulated in the conversion portion CP include charges generated in correspondence with radiation and charges (so-called dark charges) generated independently of the radiation. The accumulation signal is based on the above-described high-sensitivity signal or low-sensitivity signal. A signal generated by the signal generation unit when the reset portion RP resets the signal generation unit to a state before charge accumulation is called a reset signal. Resetting of the signal generation unit is performed by resetting the potential of the photoelectric conversion element PD and the potential of the output terminal n2 of the clamp capacitor Ccl in the above-described way. The accumulation signal and the reset signal are collectively called a pixel signal. A pixel signal output from the signal generation unit after charges are accumulated in the conversion portion CP is the accumulation signal, and a pixel signal output when the signal generation unit is in a reset state is the reset signal.

The holding portion SH1 is a sample hold circuit that is a portion capable of holding the pixel signal output from the amplification portion AP and includes a transfer transistor M8 and a holding capacitor CS1. More specifically, the state (conductive state or non-conductive state) of the transfer transistor M8 is switched using a sample hold control signal TS1, thereby performing sampling of transferring the pixel signal to the capacitor CS1 and holding the signal. The output portion OP1 includes a signal amplification transistor M10 and an output switch SW9. The signal amplification transistor M10 is a transistor configured to amplify the pixel signal held by the holding capacitor CS1 and output it. The output switch SW9 is a switch that transfers the pixel signal output by the signal amplification transistor M10. More specifically, the output switch SW9 is set in the conductive state by a vertical scanning signal VSR input to the output switch SW9, whereby a source follower circuit is formed by the signal amplification transistor M10 and a constant current source CCSp on the subsequent stage connected by a column signal line 406. Accordingly, the pixel signal held by the holding portion SH1 is amplified and output from the pixel P by the output portion OP1. The amplified pixel signal output from the pixel P will be referred to as a pixel signal S1 hereinafter. In addition, if the pixel signal is an accumulation signal, it will be referred to as an accumulation signal S1, and if the pixel signal is a reset signal, it will be referred to as a reset signal S1.

The holding portion SH2 is a sample hold circuit that is a portion capable of holding the pixel signal output from the amplification portion AP and includes a transfer transistor M11 and a holding capacitor CS2. More specifically, the state (conductive state or non-conductive state) of the transfer transistor M11 is switched using a sample hold control signal TS2, thereby performing sampling of transferring the pixel signal to the capacitor CS2 and holding the signal. The output portion OP2 includes a signal amplification transistor M13 and an output switch SW12. The signal amplification transistor M13 is a transistor configured to amplify the pixel signal held by the holding capacitor CS2 and output it. The output switch SW12 is a switch that transfers the pixel signal output by the signal amplification transistor M13. More specifically, the output switch SW12 is set in the conductive state by the vertical scanning signal VSR input to the output switch SW12 whereby a source follower circuit is formed by the signal amplification transistor M13 and the constant current source CCSp on the subsequent stage connected by a column signal line 407. Accordingly, the pixel signal held by the holding portion SH2 is amplified and output from the pixel P by the output portion OP2. The amplified pixel signal output from the pixel P will be referred to as a pixel signal S2 hereinafter. In addition, if the pixel signal is an accumulation signal, it will be referred to as an accumulation signal S2, and if the pixel signal is a reset signal, it will be referred to as a reset signal S2.

The holding portion SH3 is a sample hold circuit that is a portion capable of holding the pixel signal output from the amplification portion AP and includes a transfer transistor M14 and a holding capacitor CS3. More specifically, the state (conductive state or non-conductive state) of the transfer transistor M14 is switched using a sample hold control signal TS3, thereby performing sampling of transferring the pixel signal to the capacitor CS3 and holding the signal. The output portion OP3 includes a signal amplification transistor M16 and an output switch SW15. The signal amplification transistor M16 is a transistor configured to amplify the pixel signal held by the holding capacitor CS3 and output it. The output switch SW15 is a switch that transfers the pixel signal output by the signal amplification transistor M16. More specifically, the output switch SW15 is set in the conductive state by the vertical scanning signal VSR input to the output switch SW15 whereby a source follower circuit is formed by the signal amplification transistor M16 and the constant current source CCSp on the subsequent stage connected by a column signal line 408. Accordingly, the pixel signal held by the holding portion SH3 is amplified and output from the pixel P by the output portion OP3. The amplified pixel signal output from the pixel P will be referred to as a pixel signal S3 hereinafter. In addition, if the pixel signal is an accumulation signal, it will be referred to as an accumulation signal S3, and if the pixel signal is a reset signal, it will be referred to as a reset signal S3.

After sample holding of the capacitors CS1, CS2, and CS3, the transfer transistors M8, M11, and M14 are turned off, and the capacitors CS1, CS2, and CS3 are thus disconnected from the amplification portion AP on the preceding stage. For this reason, the held pixel signal (the accumulation signal or the reset signal) can be read nondestructively until it is sampled and held again.

Figure 2A:
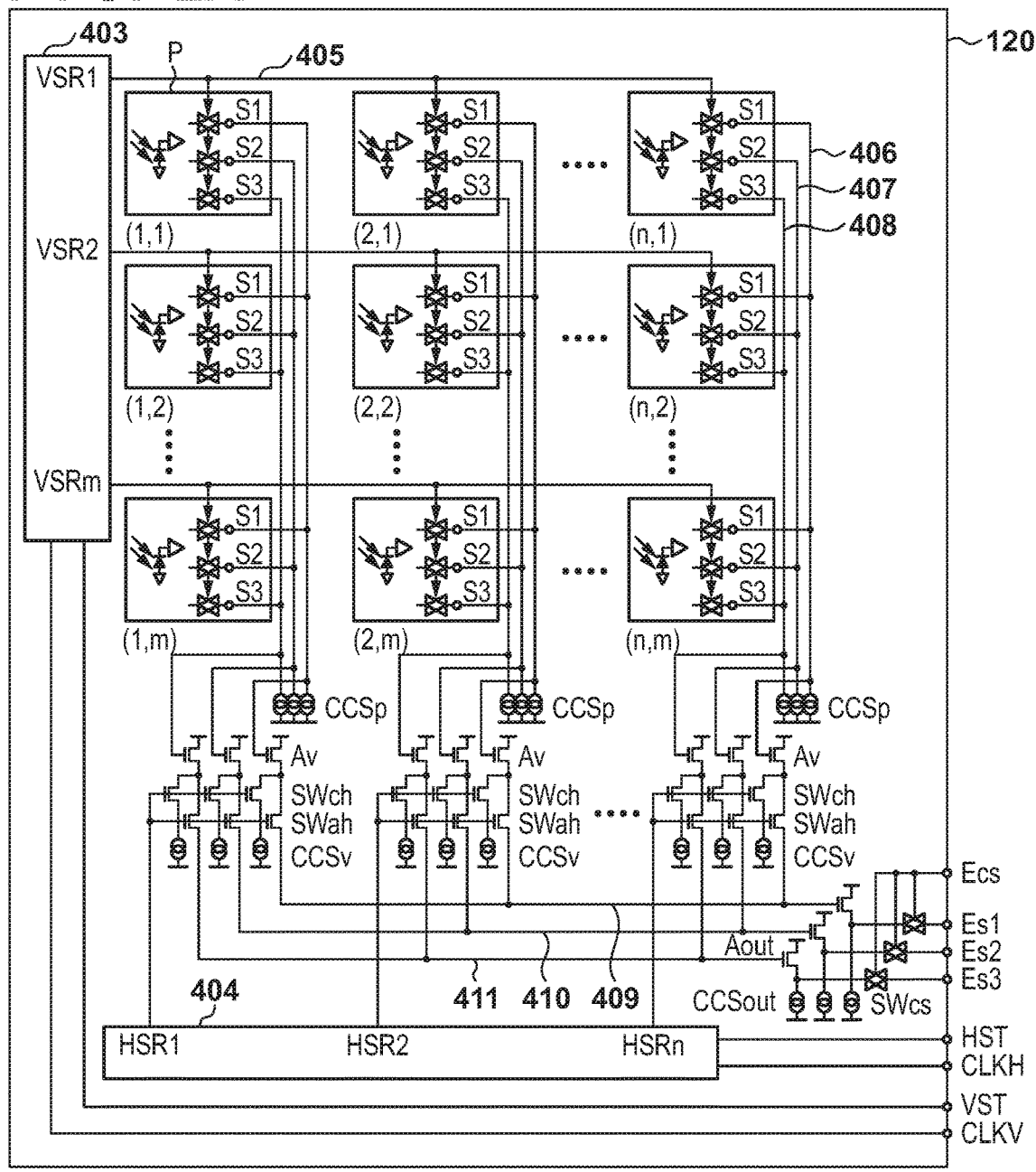
FIGS. 2A and 2B are equivalent circuit diagrams for explaining the arrangements of a pixel array and a signal reading unit according to some embodiments of the present invention.
Figure 2B:
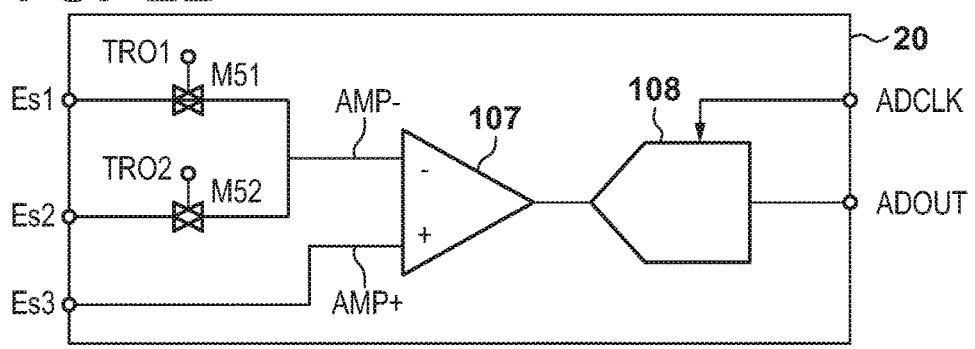

A pixel array 120 and a reading circuit 20 of the radiation imaging apparatus 100 according to this embodiment will be described next with reference to FIGS. 2A and 2B. A plurality of pixels P shown in FIG. 1 are arranged in a two-dimensional array to form the pixel array 120. A signal from the pixel array 120 is read by the reading circuit 20. The pixel array 120 of the radiation imaging apparatus 100 according to this embodiment will be described first with reference to FIG. 2A. FIG. 2A is an equivalent circuit diagram for explaining the schematic arrangements of the pixel array 120 of the radiation imaging apparatus 100 according to this embodiment.

Figure 3:
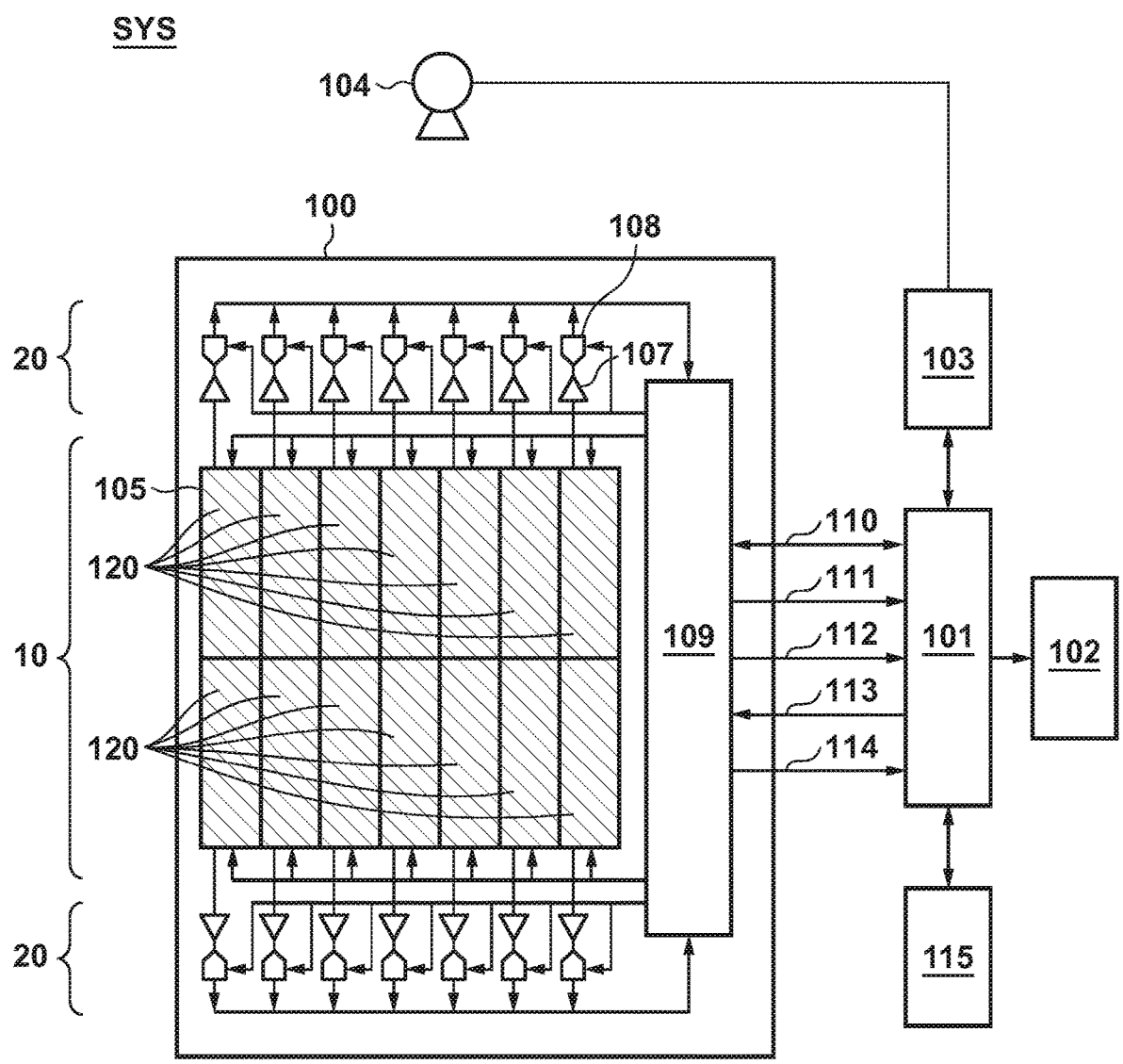
FIG. 3 is a schematic view for explaining the arrangement of a radiation imaging system according to some embodiments of the present invention.

The pixel array 120 includes a vertical scanning circuit 403 configured to drive each pixel P, and a horizontal scanning circuit 404 configured to read a signal from each pixel P. Each of the vertical scanning circuit 403 and the horizontal scanning circuit 404 is formed by, for example, a shift register and operates based on a control signal from a control unit 109 (FIG. 3). The vertical scanning circuit 403 supplies the vertical scanning signal VSR to each pixel P via a control line 405 and drives the pixels P on the row basis based on the vertical scanning signal VSR. That is, the vertical scanning circuit 403 functions as a row selection unit and selects the pixels P to read a signal on the row basis. In addition, the horizontal scanning circuit 404 functions as a column selection unit, selects the pixels P on the column basis based on a horizontal scanning signal HSR, and causes the pixels P to sequentially output signals (horizontal transfer). Here, the operating frequency of the row selection unit (vertical scanning circuit 403) is lower than the operating frequency of the column selection unit (horizontal scanning circuit 404). That is, the operation of the row selection unit (vertical scanning circuit 403) is slower than the operation of the column selection unit (horizontal scanning circuit 404).

In addition, the pixel array 120 includes a terminal Es1 configured to read the pixel signal held by the capacitor CS1 of each pixel P, a terminal Es2 configured to read the pixel signal held by the capacitor CS2, and a terminal Es3 configured to read the pixel signal held by the capacitor CS3. The pixel array 120 also includes a select terminal Ecs. When a signal received by the terminal Ecs is activated, the pixel signal of each pixel P of the pixel array 120 is read via the terminals Es1, Es2, and Es3. More specifically, the pixel signals S1, S2, and S3 of each pixel P described above are supplied to the column signal lines 406 to 408 corresponding to the terminals.

A control transistor SWch, an amplification transistor Av, and a constant current source CCSv are connected in series to form a current path. Outputs of the amplification transistors Av are connected to analog signal lines 409 to 411 via transfer transistors SWah that change to the conductive state in response to the horizontal scanning signal HSR from the horizontal scanning circuit 404. When the horizontal scanning signal HSR input to the gates of the control transistors SWch is activated, the amplification transistors Av that receive voltages from the column signal lines 406 to 408 change to the operating state. A source follower circuit is thus formed, and voltages obtained by amplifying the voltages from the column signal lines 406 to 408 are output to the analog signal lines 409 to 411 via the transfer transistors SWah that change to the conductive state in response to the horizontal scanning signal HSR.

An amplification transistor Aout and a constant current source CCSout are connected in series to form a current path, whereby a source follower circuit in the operating state is formed. Accordingly, voltages obtained by amplifying the voltages from the analog signal lines 409 to 411 are output from the terminals Es1, Es2, and Es3 via transfer transistors SWcs that change to the conductive state in response to the signal received by the terminal Ecs.

The pixel array 120 also includes terminals HST, CLKH, VST, and CLKV that receive control signals used to control the vertical scanning circuit 403 and the horizontal scanning circuit 404. The terminal HST receives a start pulse input to the horizontal scanning circuit 404. The terminal CLKH receives a clock pulse input to the horizontal scanning circuit 404. The terminal VST receives a start pulse input to the vertical scanning circuit 403. The terminal CLKV receives a clock pulse input to the vertical scanning circuit 403. These control signals are input from the control unit 109 to be described later. The horizontal scanning circuit 404 generates the horizontal scanning signal HSR based on the input start pulse and clock signal and outputs it. The vertical scanning circuit 403 generates the vertical scanning signal VSR based on the input start pulse and clock signal and outputs it. Accordingly, the pixel signals S1, S2, and S3 are sequentially read from each pixel P by an X-Y address method. That is, in the pixel array 120, the pixels P are controlled on the row basis, and the signals held by the holding portions are output (horizontally transferred) on the column basis, thereby reading the signals.

The reading circuit 20 of the radiation imaging apparatus according to this embodiment will be described next with reference to FIG. 2B. FIG. 2B is an equivalent circuit diagram for explaining the schematic arrangement of the reading circuit 20 of the radiation imaging apparatus according to this embodiment. The reading circuit 20 includes, for example, a signal amplification unit 107 including a differential amplifier and the like, and an A/D conversion unit 108 that performs A/D conversion.

The pixel signal S3 from the terminal Es3 is input to a noninverting input terminal AMP+ of the signal amplification unit 107. The pixel signal S1 from the terminal Es1 is input to an inverting input terminal AMP− of the signal amplification unit 107 via a switch M51 that changes to the conductive state in response to a control signal TRO1 input to the control terminal. The pixel signal S2 from the terminal Es2 is input to the inverting input terminal AMP− via a switch M52 that changes to the conductive state in response to a control signal TRO2 input to the control terminal. The switches M51 and M52 are controlled such that the signal of one of the terminals Es1 and Es2 is input to the inverting input terminal AMP−. The switches M51 and M52 and the signal amplification unit 107 are designed to have a response characteristic that can follow the period of a signal ADCLK.

The signal amplification unit 107 amplifies the difference between the signal from the terminal Es1 and the signal from the terminal Es3 or the difference between the signal from the terminal Es2 and the signal from the terminal Es3. The difference is A/D-converted into digital data by the A/D conversion unit 108 based on a clock signal input via the terminal ADCLK. By this arrangement, image data (digital data) of the pixel array 120 is obtained and output to the control unit 109 (to be described later) via a terminal ADOUT.

The radiation imaging apparatus 100 and a radiation imaging system SYS according to this embodiment are formed using the pixel array 120 and the reading circuit 20 as described above. The radiation imaging apparatus 100 and the radiation imaging system SYS according to this embodiment will be described next with reference to FIG. 3. FIG. 3 is a schematic view for explaining the schematic arrangement of the radiation imaging apparatus 100 and the radiation imaging system SYS according to this embodiment.

The radiation imaging system SYS includes the radiation imaging apparatus 100, a radiation generation apparatus 104 that generates radiation, an irradiation control unit 103, a signal processing unit 101 that performs image processing and system control, and a display unit 102 including a display and the like. When performing radiation imaging, the signal processing unit 101 synchronously controls the radiation imaging apparatus 100 and the irradiation control unit 103. The radiation imaging apparatus 100 generates a signal based on radiation (X-rays, α-rays, β-rays, γ-rays, or the like) that has passed through a subject. After the signal processing unit 101 and the like perform predetermined processing for the signal, image data based on the radiation is generated. The image data is displayed as a radiation image on the display unit 102. The radiation imaging apparatus 100 includes an imaging panel 105 including an imaging region 10, the reading circuit 20 that reads a signal from the imaging region 10, and the control unit 109 that controls the units.

The imaging panel 105 is formed by tiling (two-dimensionally arranging) a plurality of pixel arrays 120 on a plate-shaped base, and the large imaging panel 105 is formed by this arrangement. A plurality of pixels P are arranged in each pixel array 120. The imaging region 10 includes the plurality of pixels P that are arranged such that a row and a plurality of columns are formed by the plurality of pixel arrays 120. In addition, an arrangement obtained by tiling the plurality of pixel arrays 120 to form 7 columns×2 rows is exemplified here. However, the present invention is not limited to this arrangement.

The control unit 109 performs communication of a control command and communication of a synchronization signal with, for example, the signal processing unit 101, and outputs image data to the signal processing unit 101. In addition, the control unit 109 controls the imaging region 10 or each unit and, for example, sets the reference voltage of each pixel array 120 and performs driving control of each pixel and operation mode control. The control unit 109 also synthesizes one frame image data using the image data (digital data) of each pixel array 120, which is A/D-converted by the A/D conversion unit 108 of the reading circuit 20, and outputs the data to the signal processing unit 101. The control unit 109 may be formed by a processor such as a CPU and memories such as a RAM and a ROM. The operation of the radiation imaging apparatus 100 to be described later may be executed by executing a program stored in the memory by the processor of the control unit 109. Instead, the control unit 109 may be formed by a dedicated circuit such as an ASIC (Application Specific Integrated Circuit). Similarly, the signal processing unit 101 may be a computer formed by a processor such as a CPU and memories such as a RAM and a ROM, or may be formed by a dedicated circuit such as an ASIC. The signal processing unit 101 generates an image, as will be described later, and can therefore be called an image generation device. A storage unit 115 capable of storing data to be used in the processing of the signal processing unit 101 is connected to the signal processing unit 101. The storage unit 115 may be formed by, for example, a magnetic disk or a semiconductor drive.

Transmission/reception of a control command or a control signal and image data is performed between the control unit 109 and the signal processing unit 101 via various kinds of interfaces. The signal processing unit 101 outputs setting information such as an operation mode and various kinds of parameters or imaging information to the control unit 109 via a control interface 110. In addition, the control unit 109 outputs device information such as the operating state of the radiation imaging apparatus 100 to the signal processing unit 101 via the control interface 110. The control unit 109 also outputs image data obtained by the radiation imaging apparatus 100 to the signal processing unit 101 via an image data interface 111. The control unit 109 also notifies the signal processing unit 101, using a READY signal 112, that the radiation imaging apparatus 100 has changed to an imaging enable state. In addition, the signal processing unit 101 notifies the control unit 109 of the timing of the start of irradiation using a synchronization signal 113 in response to the READY signal 112 from the control unit 109. An irradiation permission signal 114 is a signal that notifies the signal processing unit 101 that the imaging panel 105 is executing accumulation. When the irradiation permission signal 114 is in the enable state, the signal processing unit 101 outputs a control signal to the irradiation control unit 103 and causes it to start irradiation.

Figure 4:
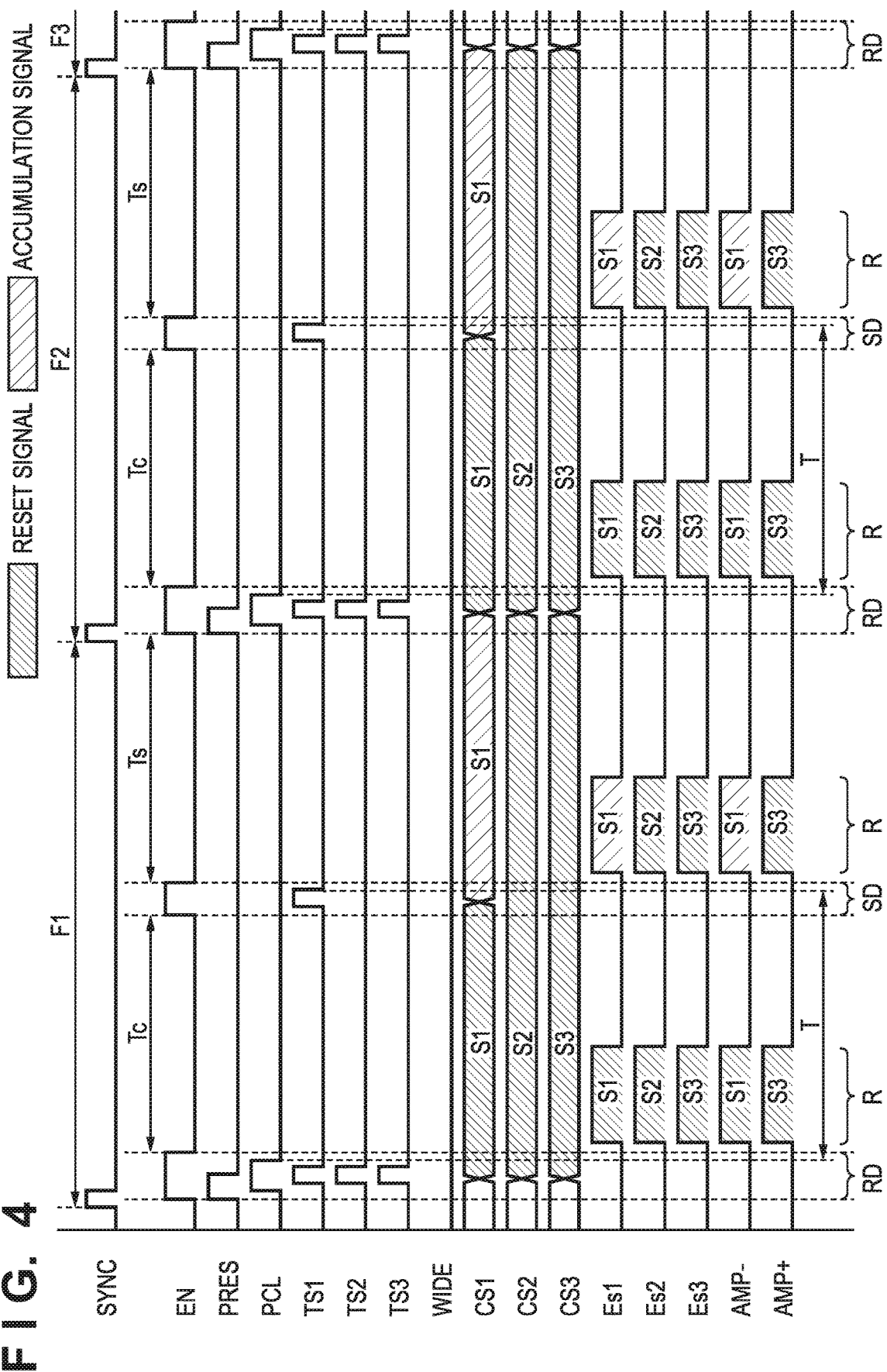
FIG. 4 is a timing chart showing an example of a driving method at the time of moving image capturing according to some embodiments of the present invention.

FIG. 4 is a timing chart showing an example of the driving method of the radiation imaging apparatus 100. This method is executed by controlling the operation of each component of the radiation imaging apparatus 100 by the control unit 109. The radiation imaging apparatus 100 captures a moving image formed by a plurality of frame images. A reset image is an image generated based on a reset signal read from each pixel.

Referring to FIG. 4, "SYNC" to "WIDE" represent the levels of signals. "CS1", "CS2", and "CS3" represent signals held by the capacitive elements CS1, CS2, and CS3. "Es1", "Es2", and "Es3" represent periods to read signals from the holding portions of the pixel array 120 to the reading circuit 20. The control unit 109 executes the signal read operation while "Es1" to "Es3" are at high level. "AMP−" represents a period in which a signal is input to the inverting input terminal AMP− of the signal amplification unit 107. "AMP+" represents a period in which a signal is input to the noninverting input terminal AMP+ of the signal amplification unit 107. A period R is a period in which a signal is output from the output terminal of the signal amplification unit 107. "AMP−" and "AMP+" represent signal input periods at high level.

Concerning the driving method shown in FIG. 4, a case in which an imaging mode, in which the frame image rate is constant, a period Tc after reset driving RD and a period Ts after sample hold driving SD are longer than a read period R of a pixel signal, and the additional capacitor Cfd' is not added, is set will be described.

Frame periods F1 and F2 represent the first and second frame periods after the start of imaging. The frame period is a period repeated to generate a plurality of frame images. An accumulation period T is an accumulation period corresponding to each of the frame periods F1 and F2. The accumulation period is a period in which charges are accumulated in the photoelectric conversion element PD. During the accumulation period T, the control unit 109 notifies the signal processing unit 101, by the irradiation permission signal 114, that irradiation is possible.

Before imaging, an imaging mode is set. More specifically, since the sensitivity of the pixel P is high sensitivity using only the FD capacitor Cfd without adding the additional capacitor Cfd' for sensitivity switching, the control unit 109 inactivates the control signal WIDE. Upon detecting the leading edge of the pulse of a signal SYNC, the control unit 109 starts driving to generate a frame image in the frame period F1. The signal SYNC can be either an external synchronization signal or an internal synchronization signal, and an external synchronization signal is used in this embodiment. For example, at the leading edge of the pulse of the signal SYNC, one frame period F1 starts. At the next leading edge, the frame period F1 ends, and the next frame period F2 starts. The driving RD represents reset driving executed in the frame periods F1 and F2, and the driving SD represents sample hold driving executed in the frame periods F1 and F2. The reset driving is driving for performing a reset of the conversion portion CP and the amplification portion AP and sample holding of the reset signal. The sample hold driving is driving for performing a sample holding of the accumulation signal.

The reset driving RD in the frame period F1 will be described. The control unit 109 performs the reset driving RD to be explained below at once for all pixels P included in the imaging panel 105. That is, the control unit 109 controls the pixels P such that the plurality of pixels generate reset signals at the same timing.

Upon detecting the leading edge of the pulse of the signal SYNC, the control unit 109 starts driving to generate a frame image in the frame period F1. The control unit 109 activates the enable signal EN. This sets the control transistors M3 and M6 in the conductive state. When the control transistor M3 changes to the conductive state, the amplification transistor M4 that receives the voltage from the conversion portion CP changes to the operating state, and a voltage obtained by amplifying the voltage from the conversion portion CP is output from the amplification transistor M4. In addition, when the control transistor M6 changes to the conductive state, the amplification transistor M7 that receives the voltage from the amplification transistor M4 changes to the operating state, and a voltage obtained by amplifying the voltage from the amplification transistor M4 is output from the amplification transistor M7.

In addition, the control unit 109 activates the reset signal PRES. Accordingly, a reset voltage VRES that is a predetermined potential is supplied to the photodiode PD, and the charges in the photodiode PD are reset. As a result, the voltage output to the amplification portion AP is reset, and a voltage corresponding to the voltage from the conversion portion CP at the time of resetting by the reset transistor M2 is input to the input terminal n1 of the clamp capacitor Ccl. Next, the control unit 109 activates the clamp signal PCL. Accordingly, the predetermined voltage VCL is supplied to the connection node between the clamp capacitor Ccl and the amplification transistor M7. As a result, the voltage output from the amplification transistor M7 is reset, and the clamp voltage VCL that is a predetermined potential is input to the output terminal n2 of the clamp capacitor Ccl.

Next, the control unit 109 temporarily activates the control signals TS1 to TS3 until the clamp signal PCL is inactivated. Accordingly, the transfer transistors M8, M11, and M14 temporarily switch from the non-conductive state to the conductive state, and the reset signals S1 to S3 are transferred to the holding capacitors CS1 to CS3 and held (that is, sampling of the reset signals is performed).

While the control signals TS1 to TS3 are temporarily activated, the control unit 109 inactivates the reset signal PRES. This sets the reset transistor M2 in the non-conductive state. The control unit 109 inactivates the control signals TS1 to TS3 and, after that, inactivates the clamp signal PCL. This changes the reset transistor M5 to the non-conductive state, the potential difference generated between the input terminal n1 and the output terminal n2 is held by the two terminals of the clamp capacitor Ccl, and the accumulation period T in which charges converted in correspondence with radiation are accumulated in the photoelectric conversion element PD starts. The control unit 109 inactivates the clamp signal PCL and, after that, inactivates the enable signal EN input to the gates of the control transistors M3 and M6. The reset driving RD in the frame period F1 thus ends.

An operation of reading the reset signals S1 and S3 in the period Tc of the frame period F1 will be described continuously with reference to FIG. 4. In this embodiment, the reading circuit 20 starts reading the reset signals S1 and S3 after the elapse of a predetermined time from the start of holding of the reset signals S1 to S3. At the time of the end of the reset driving RD in the frame period F1, the holding capacitors CS1 to CS3 hold the reset signals S1 to S3. The control unit 109 starts reading the reset signals S1 and S3 held by these holding capacitors after the elapse of a predetermined time from the end of the reset driving RD. More specifically, the control unit 109 activates the select terminal Ecs and the control signal TRO1, and inactivates the control signal TRO2. Subsequently, the control unit 109 controls the vertical scanning circuit 403 and the horizontal scanning circuit 404, thereby selecting a pixel to read first in the plurality of pixels P included in the pixel array 120. Accordingly, the reset signal S1 held by the holding portion SH1 of the selected pixel P is input to the inverting input terminal AMP− of the signal amplification unit 107, and the reset signal S3 held by the holding portion SH3 of the selected pixel P is input to the noninverting input terminal AMP+ of the signal amplification unit 107. In this way, the reading circuit 20 reads the reset signals S1 and S3 at the same timing.

In the above-described reset driving RD, reset signals of the same potential are held by the holding capacitors CS1 and CS3. The control unit 109 reads the held reset signals S1 and S3 via the signal paths (differential signal paths) of the pixel signals of two systems in the pixel array 120 and outputs them to the signal amplification unit 107. The signal amplification unit 107 that receives the output from the pixel array 120 outputs a signal obtained by calculating the difference between the reset signal S1 and the reset signal S3. The reset signal S1 is read from the holding portion SH1 via a first signal path, and the reset signal S3 is read from the holding portion SH3 to the reading circuit 20 via a second signal path different from the first signal path. The accumulation signal S1 and the reset signal S1 are read from each pixel P to the reading circuit 20 via the same first signal path.

The output signal from the signal amplification unit 107 corresponds to a pixel signal in which an offset common to the signal paths of the two systems is corrected by the differential input. However, the difference between different noise components included in the signal paths of the two systems remains. This output signal is converted into digital data by the A/D conversion unit 108 and supplied to the control unit 109. During the period R, the control unit 109 sequentially switches the selected pixel by controlling the vertical scanning circuit 403 and the horizontal scanning circuit 404, acquires pixel data used to generate an image, and generates a reset image formed by the reset signals corresponding to the frame period F1.

The sample hold driving SD in the frame period F1 will be described next. The control unit 109 performs the sample hold driving SD to be explained below at once for all pixels P included in the imaging panel 105. That is, the control unit 109 controls the pixels P such that the plurality of pixels generate accumulation signals at the same timing.

The control unit 109 activates the enable signal EN after the elapse of the period Tc from the inactivation of the enable signal EN by the reset driving RD in the frame period F1. This sets the control transistors M3 and M6 in the conductive state. When the control transistor M3 changes to the conductive state, the amplification transistor M4 that receives the voltage from the conversion portion CP changes to the operating state, and a voltage obtained by amplifying the voltage from the conversion portion CP is output from the amplification transistor M4. In addition, when the control transistor M6 changes to the conductive state, the amplification transistor M7 that receives the voltage from the amplification transistor M4 changes to the operating state, and a voltage obtained by amplifying the voltage from the amplification transistor M4 is output from the amplification transistor M7.

Next, the control unit 109 temporarily activates the control signal TS1. Accordingly, the transfer transistor M8 switches from the non-conductive state to the conductive state, and the accumulation signal S1 accumulated in the period T is transferred to the holding capacitor CS1 and held (that is, sampling of the accumulation signal is performed). After completion of the sampling, the control unit 109 inactivates the enable signal EN input to the gates of the control transistors M3 and M6. This changes the amplification transistors M4 and M7 to a non-operating state.

An operation of reading the accumulation signal S1 and the reset signal S3 in the period Ts of the frame period F1 will be described continuously with reference to FIG. 4. In this embodiment, the reading circuit 20 starts reading the accumulation signal S1 and the reset signal S3 after the elapse of a predetermined time from the start of holding of the accumulation signal S1. At the time of the end of the sample hold driving SD in the frame period F1, the holding capacitor CS1 holds the accumulation signal S1, and the holding capacitors CS2 and CS3 hold the reset signals S2 and S3. The control unit 109 starts reading the accumulation signal S1 and the reset signal S3 which are held by these holding capacitors after the elapse of a predetermined time from the end of the sample hold driving SD. More specifically, the control unit 109 activates the select terminal Ecs and the control signal TRO1, and inactivates the control signal TRO2. Subsequently, the control unit 109 controls the vertical scanning circuit 403 and the horizontal scanning circuit 404, thereby selecting one of the plurality of pixels P included in the pixel array 120. Accordingly, the accumulation signal S1 held by the holding portion SH1 of the selected pixel P is input to the inverting input terminal AMP− of the signal amplification unit 107, and the reset signal S3 held by the holding portion SH3 of the selected pixel P is input to the noninverting input terminal AMP+ of the signal amplification unit 107. In this way, the reading circuit 20 reads the accumulation signal S1 and the reset signal S3 at the same timing.

The control unit 109 reads the held accumulation signal S1 and reset signal S3 via the signal paths (differential signal paths) of the pixel signals of two systems in the pixel array 120 and outputs them to the signal amplification unit 107. The signal amplification unit 107 that receives the output from the pixel array 120 outputs a signal obtained by calculating the difference between the accumulation signal S1 and the reset signal S3. The output signal from the signal amplification unit 107 corresponds to a pixel signal in which the offset of the signal paths of the two systems is corrected by the differential input. However, the difference between noise components included in the signal paths of the two systems remains. The accumulation signal S1 is read from the holding portion SH1 via the first signal path, and the reset signal S3 is read from the holding portion SH3 via the second signal path.

This output signal is converted into digital data by the A/D conversion unit 108 and supplied to the control unit 109. During the period R, the control unit 109 sequentially switches the selected pixel by controlling the vertical scanning circuit 403 and the horizontal scanning circuit 404, acquires digital data used to generate an image, and generates an image of accumulation signals corresponding to the frame period F1. The image thus generated based on the accumulation signals read from the pixels is called an accumulation image. The processing shown in FIG. 4 is performed in each of a state in which irradiation is not performed in the radiation imaging apparatus 100 and a state in which irradiation is performed in the radiation imaging apparatus 100, as will be described later. An accumulation image generated in the state in which irradiation is not performed in the radiation imaging apparatus 100 is called a dark image. An accumulation image generated in the state in which irradiation is performed in the radiation imaging apparatus 100 is called a radiation image. The reset image generated by reading the reset signals and the accumulation image generated by reading the accumulation signals may have the same resolution. For example, when performing signal addition using a switch, the same signal addition is performed for the reset image and the accumulation image.

Next, in the frame period F2 as well, the reset driving RD and the sample hold driving SD are sequentially performed, as in the frame period F1. By the reset driving RD, the reset signals S1 to S3 are transferred to the holding capacitors CS1 to CS3 and held. By the sample hold driving SD, the accumulation signal S1 is transferred to the holding capacitor CS1 and held. During the period Tc from the end of the reset driving RD to the start of the sample hold driving SD, in the period R, the control unit 109 sequentially switches the selected pixel, acquires digital data used to generate an image, and generates a reset image corresponding to the frame period F2.

During the period Ts from the end of the sample hold driving SD to the start of the reset driving RD in a next frame period F3, in the period R, the control unit 109 sequentially switches the selected pixel, acquires digital data used to generate an image, and generates an accumulation image corresponding to the frame period F2. In each frame period after the frame period F3 as well, the same driving as in the frame period F2 is performed, and a reset image and an accumulation image are sequentially generated.

The signal path of the pixel signal in the pixel array 120 includes semiconductor elements such as an amplification transistor, a constant current source, and a switch in addition to signal lines, and different 1/f noise and a temperature drift are generated by the individual semiconductor elements. The lower the frequency is, the larger the 1/f noise is. The semiconductors in the signal amplification unit 107 and the A/D conversion unit 108, which form the reading circuit 20, also include the 1/f noise component. That is, in the generated signal, the noise component of the reading circuit 20 is superimposed on the noise of the signal path in the pixel array 120.

In the above-described example, a method of differentially transmitting read signals is performed. Each semiconductor element of the differential transmission paths has a unique offset, 1/f noise, and temperature drift. The difference between the differential signals is superimposed on the generated image and appears as a unique artifact, random noise, longitudinal line noise, or a block artifact on the image. As for the unique offset, a dark image acquired in advance before imaging is subtracted from the radiation image, thereby suppressing the artifact.

To satisfactorily correct the 1/f noise of the semiconductor element, which fluctuates over time, it is considered that the dark image is generated immediately before the start of imaging. However, even if the imaging modes are limited to several types, time is required to generate the dark image. In particular, when the dark image is generated immediately before the start of imaging, a time lag is generated at the start of imaging.

In addition, the influence of low-frequency noise on the image changes depending on the location of the circuit in which the semiconductor element is used. For example, the low-frequency noise of the amplification transistors M10, M13, and M16 of the holding capacitors of the pixel circuit P of the pixel array 120 influences the image as random noise. The low-frequency noise of the constant current source CCSp, the amplification transistor Av, and the constant current source CCSv, which are used to amplify the pixel signals of the column signal lines 406 to 408 of the pixel array 120, influences the image as longitudinal line noise. As for the low-frequency noise of the amplification transistor Aout, the constant current source CCSout, the signal amplification unit 107, and the A/D conversion unit 108, which are used to amplify the pixel signals of the analog signal lines 409 to 411, the noise is superimposed on the whole region of the pixel array and influences the image as a block artifact. In particular, it is known that in 3D imaging using a large-area flat panel sensor, the longitudinal line noise or block artifact causes a ring artifact in a 3D reconstructed image and exerts an influence more than a random noise on the image.

In this embodiment, a correction image is generated before the initial irradiation, and a frame image is generated based on the correction image, and a reset image and a radiation image generated in each frame period. This can correct the longitudinal line noise or block artifact derived from the 1/f noise.

Figure 5:
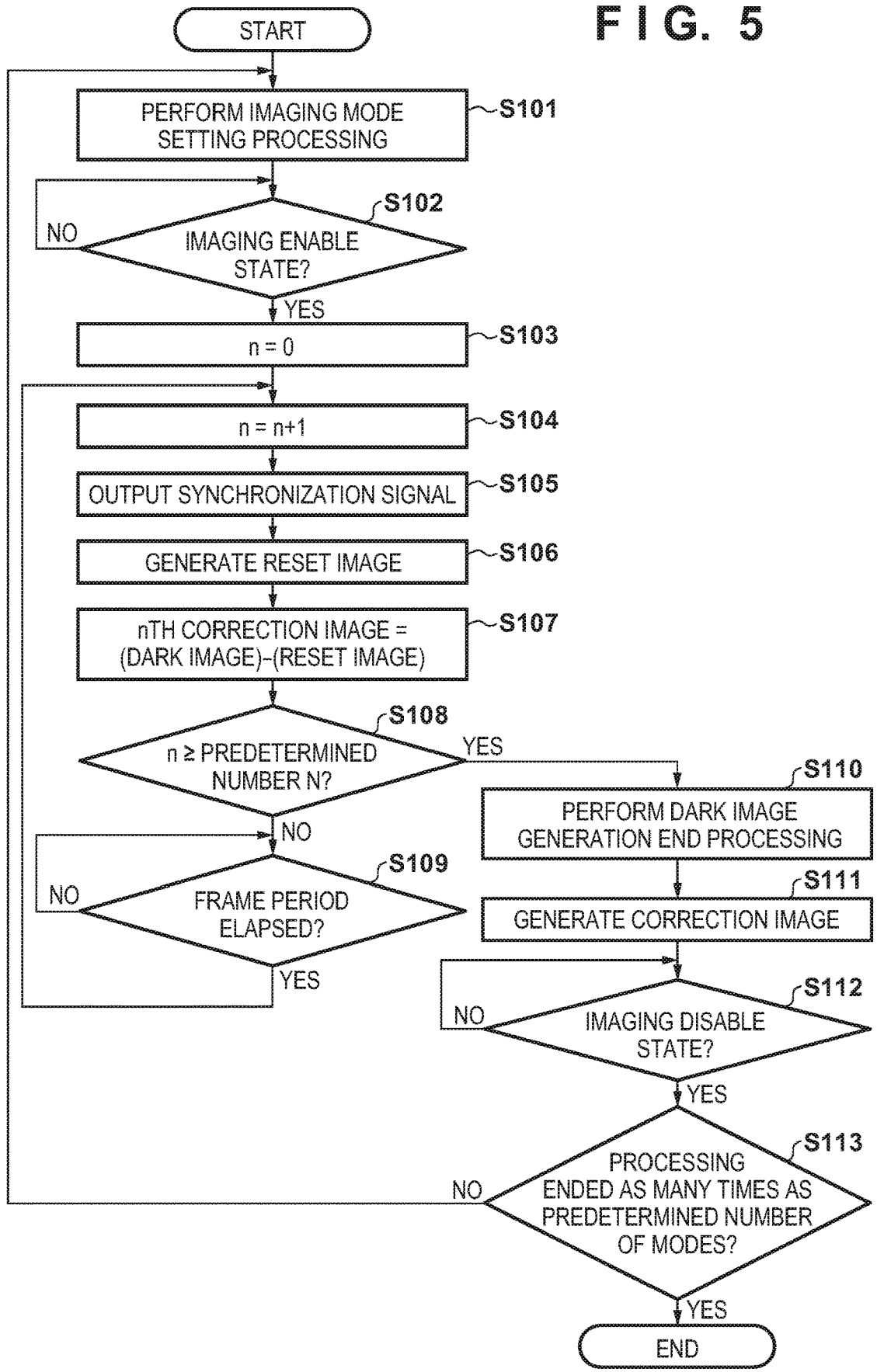
FIG. 5 is a flowchart showing an example of processing of generating a correction image according to some embodiments of the present invention.

A frame image generation method will be described next with reference to FIGS. 5 and 6. FIG. 5 explains an operation for generating a correction image. The operation shown in FIG. 5 is executed before the start of radiation imaging, more specifically, before the initial irradiation.

In step S101, the signal processing unit 101 issues a control command to the control unit 109 of the radiation imaging apparatus 100 via the control interface 110 and sets an imaging mode. Setting of the imaging mode includes sensitivity setting, setting of a frame image rate, accumulation time setting, pixel addition setting, and the like. The signal processing unit 101 also makes the radiation imaging apparatus 100 transit to the imaging enable state by a control command.

In step S102, the signal processing unit 101 determines whether the radiation imaging apparatus 100 transits to the imaging enable state. If the radiation imaging apparatus 100 transits to the imaging enable state ("YES" in step S102), the signal processing unit 101 advances the process to step S103. If the radiation imaging apparatus 100 has not transited to the imaging enable state ("NO" in step S102), the signal processing unit 101 repeats step S102.

In step S103, the signal processing unit 101 resets an imaging counter n in the signal processing unit 101 to 0. In step S104, the signal processing unit 101 increments the imaging counter n and starts generating an accumulation image and a reset image, which serve as the base of a correction image.

In step S105, the signal processing unit 101 outputs the synchronization signal pulse SYNC to the control unit 109 via the synchronization signal 113. Since the correction image is generated based on a dark image, the radiation generation apparatus 104 does not perform irradiation. In step S106, upon receiving the synchronization signal pulse SYNC via the synchronization signal 113, the control unit 109 drives the imaging panel 105 and the reading circuit 20 in accordance with the timing chart of FIG. 4. The control unit 109 A/D-converts a reset signal held by each pixel within the frame period, and transfers it as pixel data to the signal processing unit 101 via the image data interface 111. The signal processing unit 101 generates a reset image based on the transferred pixel data and stores it in the storage unit 115.

In step S107, the control unit 109 A/D-converts an accumulation signal held by each pixel within the frame period, and transfers it as pixel data of a dark image to the signal processing unit 101. The signal processing unit 101 generates an accumulation image from the sequentially transferred pixel data and subtracts the reset image stored in the storage unit 115 in step S106 from the accumulation image, thereby generating an nth correction image. The signal processing unit 101 stores the nth correction image in the storage unit 115.

In step S108, the signal processing unit 101 determines whether correction images in a predetermined number N are acquired in the imaging mode set by the imaging mode setting processing. If the predetermined number N of correction images are acquired ("YES" in step S108), the signal processing unit 101 advances the process to step S110. If the predetermined number N of correction images are not acquired ("NO" in step S108), the signal processing unit 101 advances the process to step S109. In step S109, the signal processing unit 101 waits until a frame period F elapses from the output of the synchronization signal pulse SYNC and returns the process to step S104.

Since acquisition of the predetermined number N of image data is completed, in step S110, the signal processing unit 101 transmits a control command to notify the end of image generation in the current imaging mode to the control unit 109 via the control interface 110. In step S111, the signal processing unit 101 averages the N correction images to generate one image, and stores the image as a correction image in the storage unit 115. This correction image is based on accumulation signals read a plurality of times and reset signals read a plurality of times.

In step S112, the signal processing unit 101 determines whether the radiation imaging apparatus 100 is in an imaging disable state (for example, a sleep state). The change of the state can be confirmed by the end control command transmitted in step S110. If the radiation imaging apparatus 100 transits to the imaging disable state ("YES" in step S112), the signal processing unit 101 advances the process to step S113. If the radiation imaging apparatus 100 has not transited to the imaging disable state ("NO" in step S112), the signal processing unit 101 repeats step S112.

In step S113, the signal processing unit 101 determines whether correction image acquisition is completed as many times as the number of imaging modes used for imaging by the radiation imaging system SYS. If the correction image acquisition is not completed ("NO" in step S113), the signal processing unit 101 returns the process to step S101 to generate correction images as many as the number of necessary types. If the correction image acquisition is completed ("YES" in step S113), the signal processing unit 101 ends the processing.

On the dark image acquired in step S107 of the above processing, the offset of the read system is superimposed in addition to the offsets of the conversion portion CP and the amplification portion AP. On the other hand, the reset image acquired in step S106 includes only the offset of the read system. When the reset image is subtracted from the dark image in step S107, the offset components of the read system in the images cancel each other, and an image including only the offsets of the conversion portion CP and the amplification portion AP without including the offset of the read system is be obtained. Since a correction image is obtained by averaging a plurality of thus obtained images, a correction image including little random noise is obtained.

In the example of the flowchart shown in FIG. 5, generation of the frame image in step S107 is performed in the signal processing unit 101. However, the subtraction processing of the reset image from the dark image may be performed by the control unit 109. In this case, the control unit 109 includes a storage unit configured to store the reset image, and the control unit 109 transfers the image after the subtraction processing to the signal processing unit 101. In the processing of the signal processing unit 101 in step S107, the nth correction image is generated based on the transferred image and saved in the storage unit 115.

An operation for generating a radiation image will be described next with reference to FIG. 6. The operation shown in FIG. 6 is executed after the start of radiation imaging.

In step S201, the signal processing unit 101 issues a control command to the control unit 109 and sets an imaging mode. After that, the signal processing unit 101 makes the radiation imaging apparatus 100 transit to the imaging enable state by a control command. In step S202, the signal processing unit 101 determines whether the radiation imaging apparatus 100 transits to the imaging enable state. If the radiation imaging apparatus 100 transits to the imaging enable state ("YES" in step S202), the signal processing unit 101 advances the process to step S203. If the radiation imaging apparatus 100 has not transited to the imaging enable state ("NO" in step S202), the signal processing unit 101 repeats step S202. Whether the radiation imaging apparatus 100 transits to the imaging enable state can be determined based on, for example, whether the READY signal 112 is activated. Upon determining that the radiation imaging apparatus 100 transits to the imaging enable state, the signal processing unit 101 starts radiation imaging.

In step S203, the signal processing unit 101 outputs the synchronization signal pulse SYNC to the control unit 109. Upon receiving the synchronization signal pulse SYNC, the control unit 109 starts driving the imaging panel 105 in accordance with the timing chart of FIG. 4, and outputs the irradiation permission signal 114 to the signal processing unit 101 during the accumulation period T set in step S201.

In step S204, the signal processing unit 101 determines whether the irradiation permission signal 114 is activated. If the irradiation permission signal 114 is activated ("YES" in step S204), the signal processing unit 101 advances the process to step S205. If the irradiation permission signal 114 is not activated ("NO" in step S204), the signal processing unit 101 repeats step S204.

In step S205, the signal processing unit 101 outputs a control signal to the irradiation control unit 103 such that irradiation is performed according to the period of the accumulation period T. In step S206, the control unit 109 drives the imaging panel 105 and the reading circuit 20 in accordance with the driving started in step S203. The control unit 109 A/D-converts a reset signal held by each pixel within the frame period, and transfers it as the pixel data of a reset image to the signal processing unit 101 via the image data interface 111. The signal processing unit 101 generates a reset image based on the transferred pixel data and stores it in the storage unit 115.

In step S207, the control unit 109 A/D-converts an accumulation signal held by each pixel within the frame period, and transfers it as the pixel data of a radiation image to the signal processing unit 101. The signal processing unit 101 generates a radiation image based on the sequentially transferred pixel data. The signal processing unit 101 subtracts the reset image stored in the storage unit 115 in step S206 and the correction image stored in the storage unit 115 in step S111 from the radiation image, thereby generating a frame image. In this processing, a correction image check grammar imaging mode including the resolution and the accumulation time is the same as in radiation imaging is selected.

In step S208, the signal processing unit 101 transfers the frame image to the post-process in accordance with the imaging mode. In the post-process, image processes such as gain correction processing and sharpening processing are performed for the transferred frame image by a pipeline method in parallel to the radiation imaging. In imaging such as radiation fluoroscopy in which an image is observed in real time, an image after processing is transferred to the display unit 102 and displayed. In imaging such as 3D imaging in which processing is performed based on a plurality of images, a frame image after image processing is stored in the storage unit 115.

In step S209, the signal processing unit 101 determines, based on a radiation fluoroscopy switch (not shown) or a programmed number of images, whether to end the imaging. To continue the imaging ("NO" in step S209), in step S210, the signal processing unit 101 determines the elapse of time of the frame period. Upon determining to end the imaging ("YES" in step S209), in step S211, the signal processing unit 101 transmits a control command to notify the end of image generation in the current imaging mode to the control unit 109 via the control interface 110, and performs end processing of the imaging.

In step S210, the signal processing unit 101 determines whether the frame period F has elapsed. Upon determining that the frame period F has not elapsed ("NO" in step S210), the signal processing unit 101 returns the process to step S209. Upon determining that the frame period F has elapsed ("YES" in step S210), the signal processing unit 101 returns the process to step S203 to perform imaging of the next frame image.

In step S212, the signal processing unit 101 determines whether the radiation imaging apparatus 100 is in an imaging disable state (for example, a sleep state). The change of the state can be confirmed by the end control command. If the radiation imaging apparatus 100 transits to the imaging disable state ("YES" in step S212), the signal processing unit 101 ends the processing. If the radiation imaging apparatus 100 has not transited to the imaging disable state ("NO" in step S212), the signal processing unit 101 repeats step S212.

Figure 6:
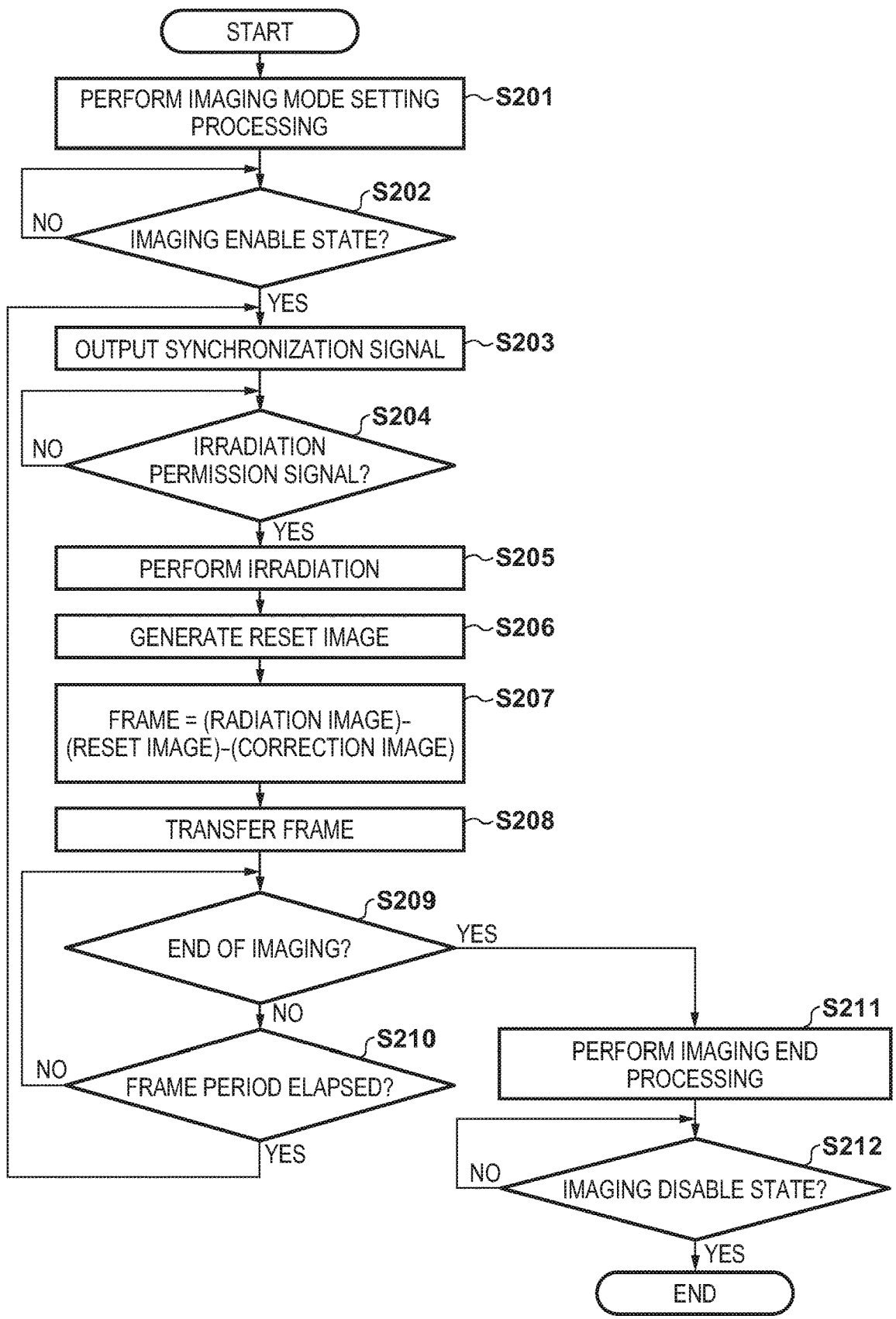
FIG. 6 is a flowchart showing an example of processing of generating a frame image according to some embodiments of the present invention.

In the example of the flowchart shown in FIG. 6, the subtraction processing of the pixel data of the reset image from the pixel data of the radiation image is performed by the signal processing unit 101 in the process of step S207. However, the subtraction processing may be performed by the control unit 109. In this case, the control unit 109 includes a storage unit configured to store the reset image, and stores the reset image read earlier in the frame period in the storage unit. Then, the control unit 109 subtracts the pixel data of the reset image read from the storage unit from the pixel data of the radiation image read from the imaging panel 105 and transfers the pixel data after the processing to the signal processing unit 101. In the processing of the signal processing unit 101 in step S207, the pixel data of the correction image is subtracted from the transferred pixel data, thereby generating a frame image.

On the radiation image acquired in step S207 of the above processing, the offset of the read system is superimposed in addition to the offsets of the conversion portion CP and the amplification portion AP. On the other hand, the reset image includes only the offset of the read system. When the reset image is subtracted from the radiation image, the offset components of the read system in the images cancel each other, and an image on which only the offsets of the conversion portion CP and the amplification portion AP are superimposed is obtained. When the offset components of the conversion portion CP and the amplification portion AP in the correction image are subtracted from the image, a frame image in which the offset components of the conversion portion CP and the amplification portion AP are canceled can be generated. In this frame image, noise and an artifact are satisfactorily suppressed. In this embodiment, the method of differentially reading the signals has been described. However, the reading circuit 20 may read the signals not differentially but by a single end method.

Second Embodiment

Figure 7:
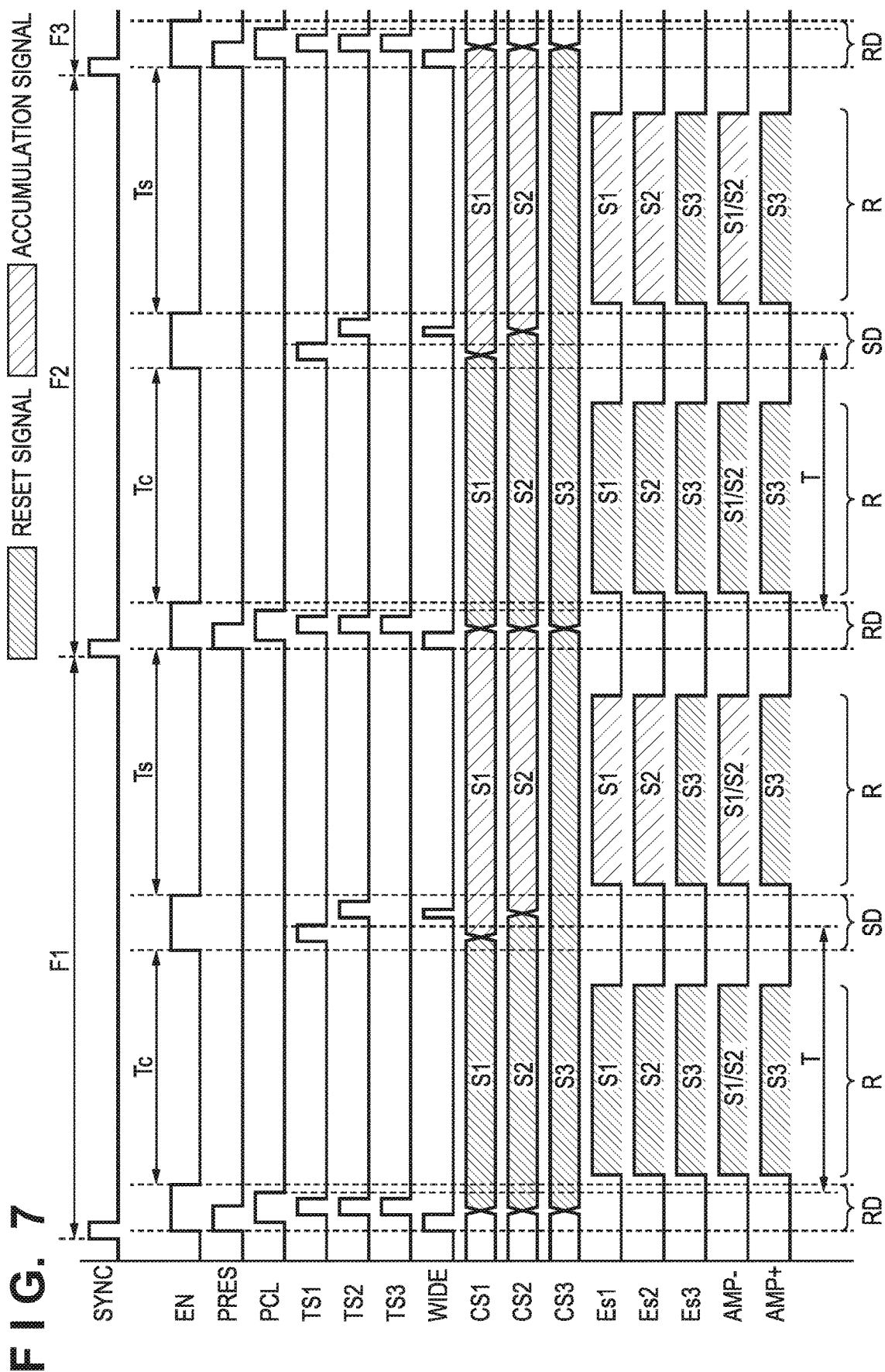
FIG. 7 is a timing chart showing an example of a driving method of reading a signal with a plurality of sensitivities according to some embodiments of the present invention.

A driving method of a radiation imaging apparatus 100 according to the second embodiment will be described with reference to FIG. 7. The hardware arrangement of the radiation imaging apparatus 100 may be the same as in the first embodiment, and a repetitive description thereof will be omitted. The difference between the first embodiment and the second embodiment will mainly be explained below. Concerning the driving method shown in FIG. 7, a case in which an imaging mode to read signals of two types of sensitivities is set will be described.

Concerning the driving method shown in FIG. 7, a case in which the frame image rate is constant, and periods Tc and Ts are longer than a pixel signal read period R will be described. In addition, an imaging mode in which a signal is read with a high sensitivity at which an additional capacitor Cfd' is not added and a low sensitivity at which the additional capacitor Cfd' is added is set. As in the first embodiment, SYNC is an external synchronization signal. Read images of the two types of sensitivities are used, for example, as images used for synthesis to expand the dynamic range. The imaging mode is set before imaging.

Reset driving RD in a frame period F1 will be described. Upon detecting the leading edge of the pulse of a signal SYNC, a control unit 109 starts driving to generate a frame image in the frame period F1. First, the control unit 109 activates an enable signal EN. In addition, the control unit 109 activates a reset signal PRES and a control signal WIDE for sensitivity switching. This sets a transistor M1 in a conductive state and resets charges in a photodiode PD, a floating diffusion capacitor Cfd, and the additional capacitor Cfd' for sensitivity switching in a conversion portion CP. As a result, a voltage corresponding to the voltage from the conversion portion CP at the time of resetting is input to an input terminal n1 of a clamp capacitor Ccl. Next, the control unit 109 activates a clamp signal PCL. Accordingly, a clamp voltage VCL is input to an output terminal n2 of the clamp capacitor Ccl.

Next, the control unit 109 inactivates the control signal WIDE. Accordingly, the voltage at the time of resetting is held by the additional capacitor Cfd'. Next, the control unit 109 temporarily activates control signals TS1 to TS3 until the clamp signal PCL is inactivated. Accordingly, reset signals S1 to S3 are transferred to holding capacitors CS1 to CS3 and held (that is, sampling of the reset signals is performed).

While the control signals TS1 to TS3 are temporarily activated, the control unit 109 inactivates the reset signal PRES. This sets a reset transistor M2 in a non-conductive state. The control unit 109 inactivates the control signals TS1 to TS3 and, after that, inactivates the clamp signal PCL. Accordingly, an accumulation period T in which charges converted in correspondence with radiation are accumulated in the photoelectric conversion element PD starts. The control unit 109 inactivates the clamp signal PCL and, after that, inactivates the enable signal EN. The reset driving RD in the frame period F1 thus ends.

An operation of reading the reset signals S1 to S3 in the period Tc of the frame period F1 will be described continuously with reference to FIG. 7. In the second embodiment, a reading circuit 20 starts reading the reset signals S1 to S3 after the elapse of a predetermined time from the start of holding of the reset signals S1 to S3. More specifically, the control unit 109 activates a select terminal Ecs, activates a control signal TRO1, and inactivates a control signal TRO2. The reset signal S1 is thus selected. Subsequently, the control unit 109 controls a vertical scanning circuit 403 and a horizontal scanning circuit 404, thereby selecting a pixel to read first in a plurality of pixels P included in a pixel array 120. Accordingly, the reset signal S1 of the first pixel is input to an inverting input terminal AMP− of a signal amplification unit 107, and the reset signal S3 is input to a noninverting input terminal AMP+ of the signal amplification unit 107. In this way, the reading circuit 20 reads the difference between the reset signal S1 and the reset signal S3 at the same timing. The control unit 109 sequentially switches the selected pixel by controlling the horizontal scanning circuit 404, and reads the pixel data of one row as the difference between the reset signal S1 and the reset signal S3.

Next, the control unit 109 inactivates the control signal TRO1 and activates the control signal TRO2. The reset signal S2 is thus selected. The control unit 109 sequentially switches the selected pixel by controlling the horizontal scanning circuit 404, and reads the pixel data of one row as the difference between the reset signal S2 and the reset signal S3. That is, the control unit 109 scans one row twice, reads the difference between the reset signal S1 and the reset signal S3 by the first scanning, and reads the difference between the reset signal S2 and the reset signal S3 by the second scanning.

The control unit 109 switches the control signal TRO1 and the control signal TRO2 for each scanning while controlling the vertical scanning circuit 403 and the horizontal scanning circuit 404, thereby generating pixel data used to generate two types of images in the read period R of the period Tc. A reset image based on the reset signal S1 held by the holding capacitor CS1 in the frame period F1 and a reset image based on the reset signal S2 held by the holding capacitor CS2 are generated based on the pixel data. The reset image based on the reset signal S1 is called a high-sensitivity reset image, and the reset image based on the reset signal S2 is called a low-sensitivity reset image.

Sample hold driving SD in the frame period F1 will be described next. The control unit 109 activates the enable signal EN after the elapse of the period Tc from the inactivation of the enable signal EN by the reset driving RD in the frame period F1. Next, the control unit 109 temporarily activates the control signal TS1 while keeping the control signal WIDE for sensitivity switching inactive. Charges are generated in the photodiode PD in the period T, and the high-sensitivity voltage of the FD capacitor Cfd corresponding to the generated charge amount is transferred to the holding capacitor CS1 and held as the accumulation signal S1.

Next, the control unit 109 activates the control signal WIDE for sensitivity switching and the control signal TS2. When the signal WIDE is activated, the transistor M1 changes to the conductive state, and the capacitor of the conversion portion CP becomes the composite capacitor of the FD capacitor Cfd and the capacitor Cfd'. The output of the conversion portion CP is a low-sensitivity voltage of the composite capacitor of the FD capacitor Cfd and the capacitor Cfd' corresponding to the charges generated in the photodiode PD in the period T.

Next, the control unit 109 inactivates the control signal WIDE for sensitivity switching. The transistor M1 changes to the non-conductive state, and the capacitor of the conversion portion CP becomes the FD capacitor Cfd, but the output of the conversion portion CP is maintained. Next, the control unit 109 inactivates the control signal TS2. The low-sensitivity voltage is transferred to the holding capacitor CS2 and held as the accumulation signal S2. The control unit 109 inactivates the enable signal EN after completion of sampling.

An operation of reading the accumulation signal S1, the accumulation signal S2, and the reset signal S3 in the period Ts of the frame period F1 will be described continuously with reference to FIG. 7. The control unit 109 switches the control signal TRO1 and the control signal TRO2 for each scanning while controlling the vertical scanning circuit 403 and the horizontal scanning circuit 404, thereby generating pixel data used to generate two types of images in the read period R of the period Ts. An accumulation image based on the high-sensitivity voltage signal held by the holding capacitor CS1 corresponding to the frame period F1 and an accumulation image based on the low-sensitivity voltage signal held by the holding capacitor CS2 are generated based on the pixel data. The accumulation image of the high-sensitivity voltage signal is called a high-sensitivity accumulation image, and the accumulation image of the low-sensitivity voltage signal is called a low-sensitivity accumulation image.

Next, in a frame period F2 as well, the reset driving RD and the sample hold driving SD are sequentially performed, as in the frame period F1. By the reset driving RD, the reset signals S1 to S3 are transferred to the holding capacitors CS1 to CS3 and held. By the sample hold driving SD, the high-sensitivity accumulation signal S1 is held by the holding capacitor CS1, and the low-sensitivity accumulation signal S2 is held by the holding capacitor CS2.

During the period Tc from the end of the reset driving RD to the start of the sample hold driving SD, the control unit 109 sequentially switches the selected pixel, acquires digital data in the period R, and generates a high-sensitivity reset image and a low-sensitivity reset image corresponding to the frame period F2.

During the period Ts from the end of the sample hold driving SD to the start of the reset driving RD in a next frame period F3, in the period R, the control unit 109 sequentially switches the selected pixel, acquires digital data, and generates a high-sensitivity accumulation image and a low-sensitivity accumulation image corresponding to the frame period F2. In each frame period after the frame period F3 as well, the same driving as in the frame period F2 is performed.

In the moving image generation method according to the second embodiment as well, a correction image is generated before the initial irradiation, and a frame image is generated based on the correction image, and a reset image and a radiation image generated in each frame period, as in the first embodiment. This can correct longitudinal line noise or block artifact derived from 1/f noise.

Figure 8:
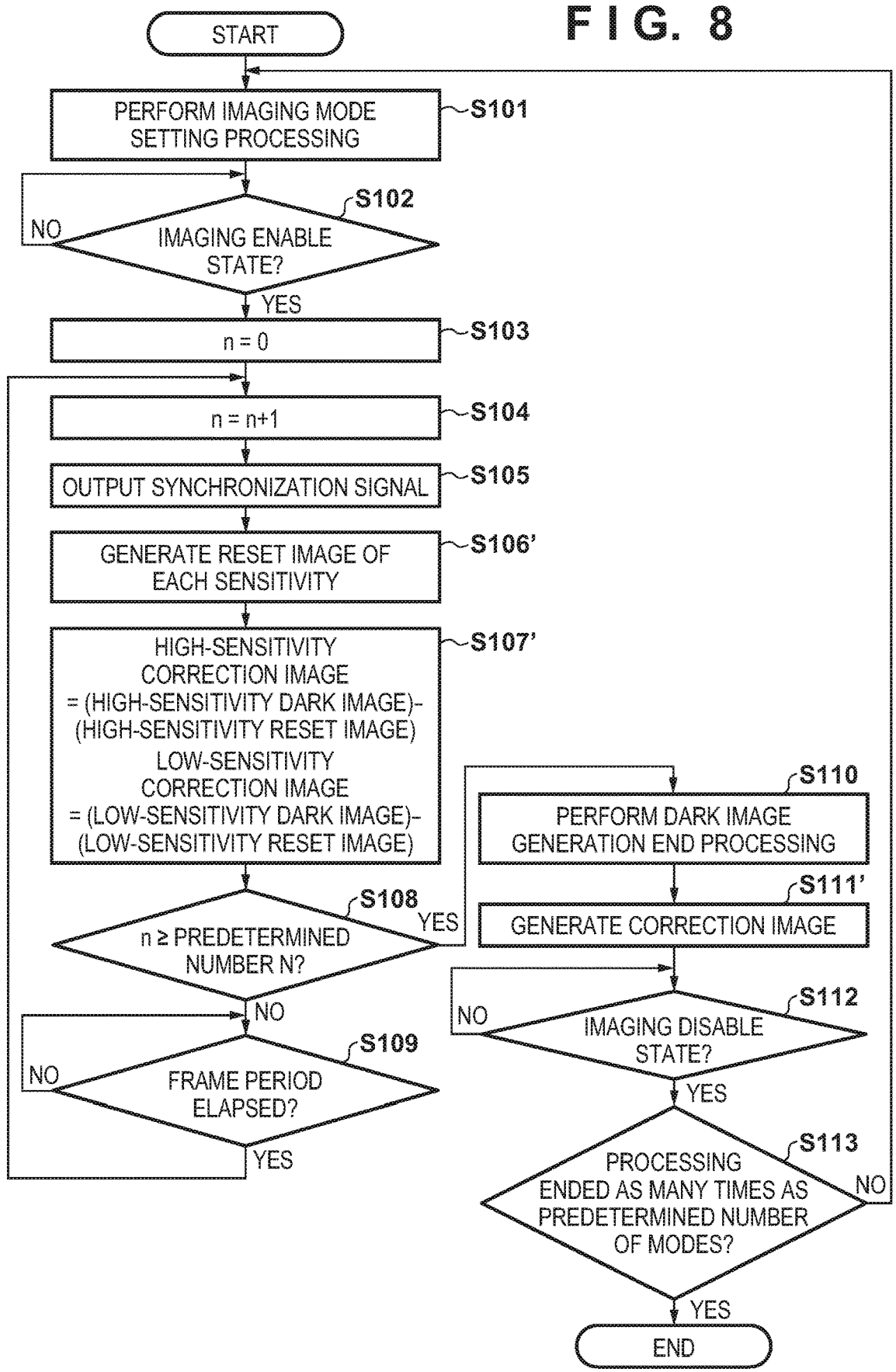
FIG. 8 is a flowchart showing an example of processing of generating a correction image with a plurality of sensitivities according to some embodiments of the present invention.

FIG. 8 explains an operation for generating a correction image. The operation shown in FIG. 8 is executed before the start of radiation imaging. The difference between the first embodiment and the second embodiment will mainly be explained below. A case in which an imaging mode to read two types of sensitivities shown in the driving method of FIG. 7 is set will be described.

Steps S101 to S105 shown in FIG. 8 are the same as in the first embodiment. In step S106', the control unit 109 drives an imaging panel 105 and the reading circuit 20. More specifically, the control unit 109 A/D-converts a reset signal held by each pixel within the frame period, and transfers the pixel data of a high-sensitivity reset image and a low-sensitivity reset image to a signal processing unit 101. The signal processing unit 101 generates the high-sensitivity reset image and the low-sensitivity reset image based on the transferred pixel data and stores them in a storage unit 115.

In step S107', the control unit 109 A/D-converts an accumulation signal held by each pixel within the frame period, and transfers the pixel data of a high-sensitivity dark image and a low-sensitivity dark image to the signal processing unit 101. The signal processing unit 101 subtracts, from the sequentially transferred pixel data, the pixel data of the high-sensitivity reset image and the low-sensitivity reset image in the storage unit 115 corresponding to the pixel data, thereby generating a high-sensitivity correction image and a low-sensitivity correction image and storing them in the storage unit 115. The processes of steps S108 to S110 shown in FIG. 8 are the same as in the first embodiment.

In step S111', the signal processing unit 101 stores, in the storage unit 115, an image obtained by averaging N high-sensitivity correction images as a high-sensitivity correction image and an image obtained by averaging N low-sensitivity correction images as a low-sensitivity correction image. The processes of steps S112 and S113 shown in FIG. 8 are the same as in the first embodiment.

Figure 9:
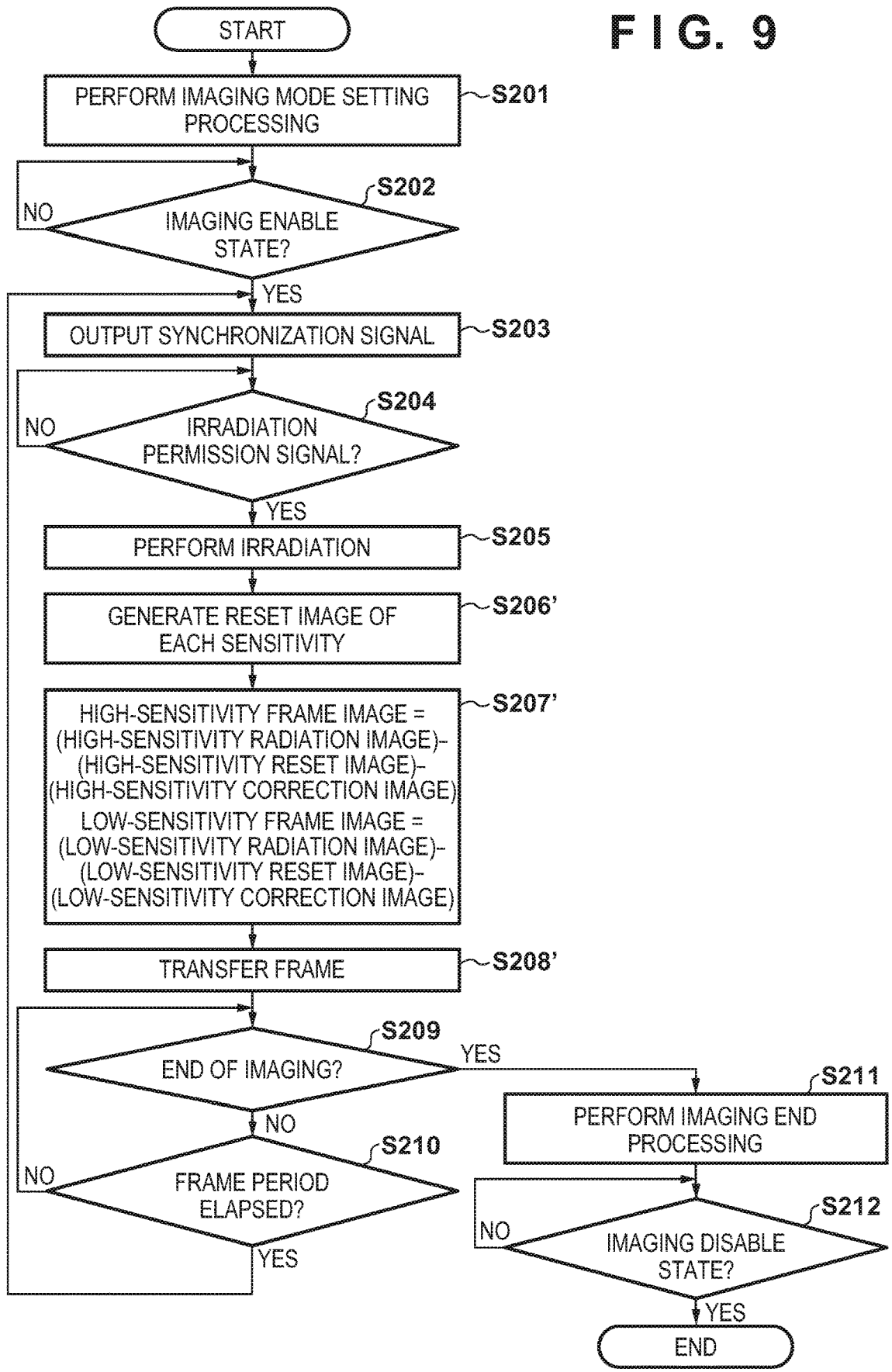
FIG. 9 is a flowchart showing an example of processing of generating a frame image with a plurality of sensitivities according to some embodiments of the present invention.

An operation for generating a radiation image will be described next with reference to FIG. 9. The operation shown in FIG. 9 is executed after the start of radiation imaging. The difference between the first embodiment and the second embodiment will mainly be explained below. A case in which an imaging mode to read two types of sensitivities shown in the driving method of FIG. 7 is set will be described.

Processes of steps S201 to S205 shown in FIG. 9 are the same as in the first embodiment. In step S206', the control unit 109 drives the imaging panel 105 and the reading circuit 20. More specifically, the control unit 109 A/D-converts a reset signal held by each pixel within the frame period, and transfers the pixel data of a high-sensitivity reset image and a low-sensitivity reset image to the signal processing unit 101. The signal processing unit 101 generates a high-sensitivity reset image and a low-sensitivity reset image based on the transferred pixel data and stores them in the storage unit 115.

In step S207', the control unit 109 A/D-converts an accumulation signal held by each pixel within the frame period, and transfers it as the pixel data of a high-sensitivity radiation image and a low-sensitivity radiation image to the signal processing unit 101. The signal processing unit 101 subtracts, from the sequentially transferred pixel data, the pixel data of a reset image of the sensitivity corresponding to the pixel data and the pixel data of a correction image of the corresponding sensitivity, thereby generating a high-sensitivity frame image and a low-sensitivity frame image. The correction image used here is the correction image saved in the storage unit in advance in accordance with the imaging mode. A correction image whose imaging mode including the resolution and the accumulation time is the same as in radiation imaging is selected.

In step S208', the signal processing unit 101 transfers the frame images of the plurality of sensitivities to the post-process in accordance with the imaging mode. In the post-process, image processes such as gain correction processing, dynamic range expansion processing, and sharpening processing are performed for the transferred frame images by a pipeline method in parallel to the radiation imaging. In imaging such as radiation fluoroscopy in which an image is observed in real time, an image after processing is transferred to a display unit 102 and displayed. In imaging such as 3D imaging in which processing is performed based on a plurality of images, a frame image after image processing is stored in the storage unit 115. The processes of steps S209 to S212 shown in FIG. 9 are the same as in the first embodiment.

Third Embodiment

A driving method of a radiation imaging apparatus 100 according to the third embodiment will be described with reference to FIGS. 10 and 11. The hardware arrangement of the radiation imaging apparatus 100 may be the same as in the first embodiment, and a repetitive description thereof will be omitted. The radiation imaging apparatus 100 generates a plurality of reset images by the driving method shown in FIG. 10 and captures a moving image formed from a plurality of frame images by the driving method shown in FIG. 11. The reset image is an image generated based on a reset signal read from each pixel. A description of signals shown in FIGS. 10 and 11 is the same as in FIG. 4 described above.

Figure 10:
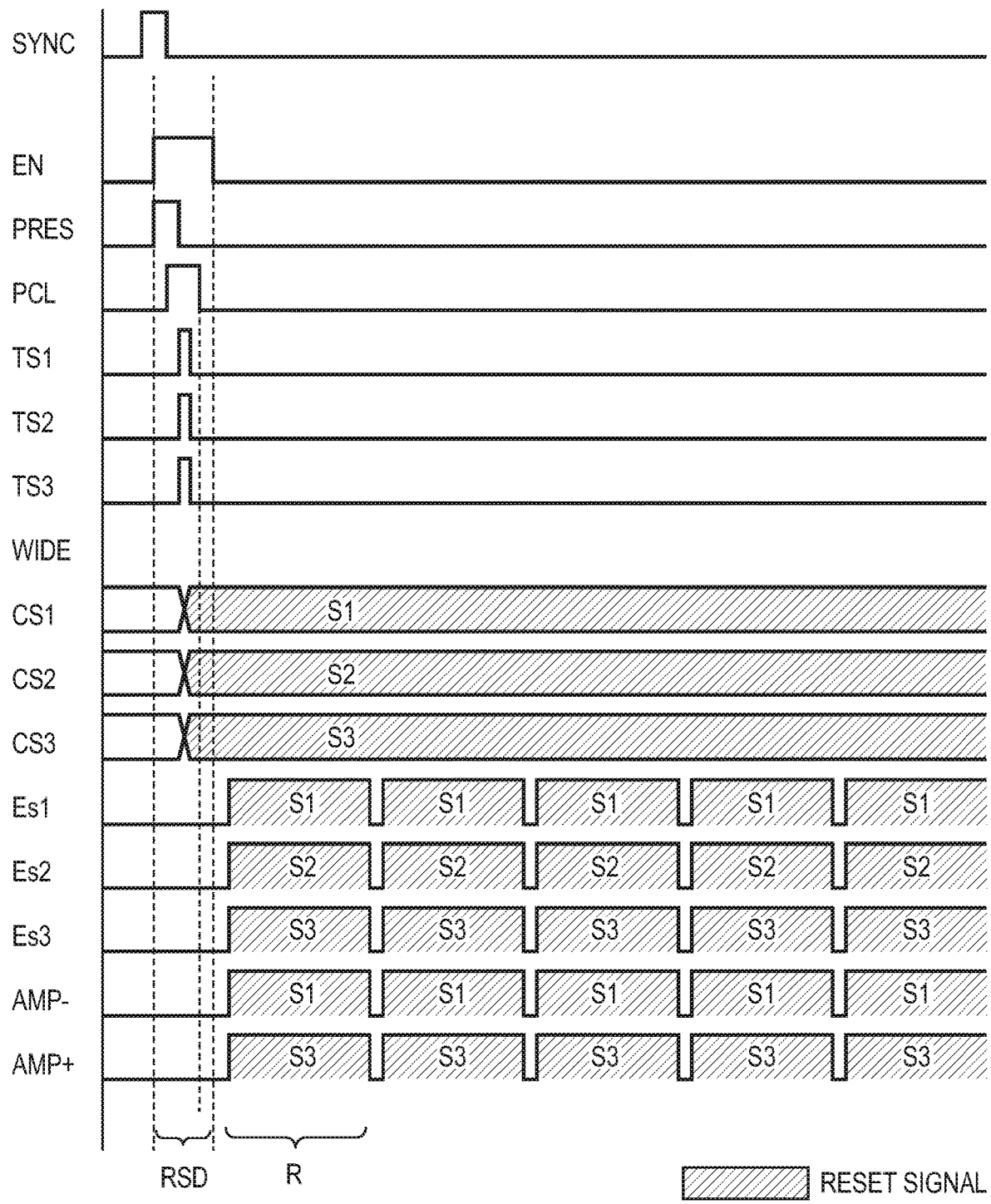
FIG. 10 is a timing chart showing an example of a driving method of continuously reading a reset signal according to some embodiments of the present invention.
Figure 11:
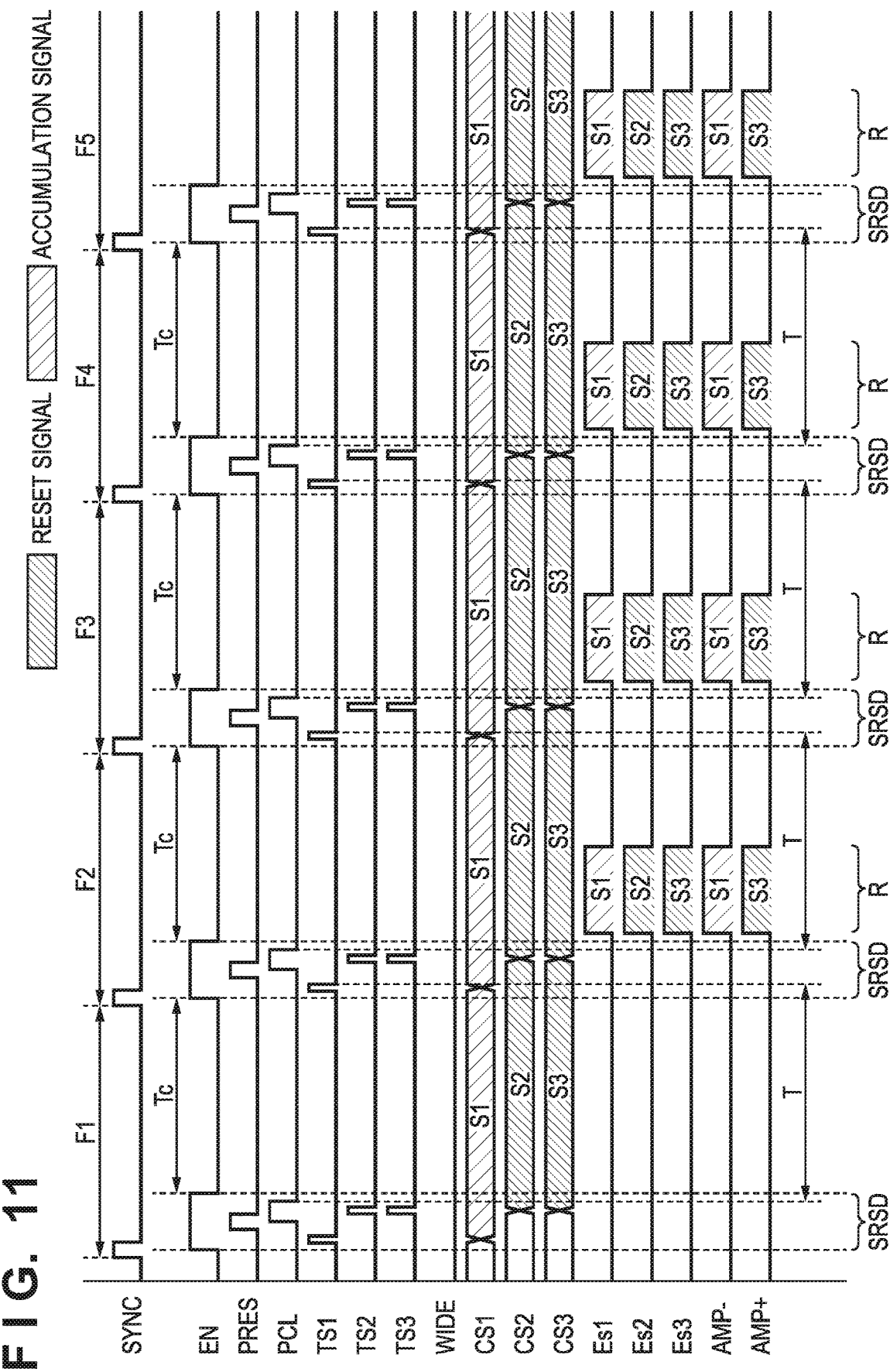
FIG. 11 is a timing chart showing an example of a driving method of maximizing an accumulation period according to some embodiments of the present invention.

FIG. 10 is a timing chart showing an example of a driving method of continuously reading a reset signal a plurality of times after resetting of a conversion portion CP and an amplification portion AP in a pixel P is performed. Concerning the driving method shown in FIG. 10, a case in which an imaging mode for a sensitivity without adding an additional capacitor Cfd' is set will be described.

Before the driving shown in FIG. 10 is performed, an imaging mode is set. More specifically, since the sensitivity of the pixel P is high sensitivity using only an FD capacitor Cfd without adding the additional capacitor Cfd' for sensitivity switching, a control unit 109 inactivates a control signal WIDE. Upon detecting the leading edge of the pulse of a signal SYNC, the control unit 109 starts driving to generate a reset image. The signal SYNC can be either an external synchronization signal or an internal synchronization signal, and an external synchronization signal is used in this embodiment.

Reset driving and sample hold driving (to be referred to as driving RSD hereinafter) will be described. The driving RSD is driving for performing a reset of the conversion portion CP and the A/D conversion unit 108 and sample holding of a reset signal. The control unit 109 performs the driving RSD to be explained below at once for all pixels P included in an imaging panel 105. That is, the control unit 109 controls the pixels P such that the plurality of pixels generate reset signals at the same timing.

Upon detecting the leading edge of the pulse of the signal SYNC, the control unit 109 starts driving to generate a reset image. The control unit 109 activates an enable signal EN. This sets control transistors M3 and M6 in a conductive state. When the control transistor M3 changes to the conductive state, an amplification transistor M4 that receives the voltage from the conversion portion CP changes to an operating state, and a voltage obtained by amplifying the voltage from the conversion portion CP is output from the amplification transistor M4. In addition, when the control transistor M6 changes to the conductive state, an amplification transistor M7 that receives the voltage from the amplification transistor M4 changes to the operating state, and a voltage obtained by amplifying the voltage from the amplification transistor M4 is output from the amplification transistor M7.

In addition, the control unit 109 activates a reset signal PRES. Accordingly, a reset voltage VRES that is a predetermined potential is supplied to a photodiode PD, and charges in the photodiode PD are reset. As a result, the voltage output to the amplification portion AP is reset, and a voltage corresponding to the voltage from the conversion portion CP at the time of resetting by a reset transistor M2 is input to an input terminal n1 of a clamp capacitor Ccl. Next, the control unit 109 activates a clamp signal PCL. Accordingly, a predetermined voltage VCL is supplied to the connection node between the clamp capacitor Ccl and the amplification transistor M7. As a result, the voltage output from the amplification transistor M7 is reset, and the clamp voltage VCL that is a predetermined potential is input to an output terminal n2 of the clamp capacitor Ccl.

Next, the control unit 109 temporarily activates the control signals TS1 to TS3 until the clamp signal PCL is inactivated. Accordingly, transfer transistors M8, M11, and M14 temporarily switch from a non-conductive state to the conductive state, and reset signals S1 to S3 are transferred to holding capacitors CS1 to CS3 and held (that is, sampling of the reset signals is performed).

While the control signals TS1 to TS3 are temporarily activated, the control unit 109 inactivates the reset signal PRES. This sets the reset transistor M2 in the non-conductive state. The control unit 109 inactivates the control signals TS1 to TS3 and, after that, inactivates the clamp signal PCL. This changes a reset transistor M5 to the non-conductive state. The control unit 109 inactivates the clamp signal PCL and, after that, inactivates the enable signal EN input to the gates of the control transistors M3 and M6. The driving RSD thus ends.

An operation of reading the reset signals S1 and S3 after the driving RSD will be described continuously with reference to FIG. 10. In this embodiment, a reading circuit 20 starts reading the reset signals S1 and S3 after the elapse of a predetermined time from the start of holding of the reset signals S1 to S3. At the time of the end of the driving RSD, the holding capacitors CS1 to CS3 hold the reset signals S1 to S3. The control unit 109 starts reading the reset signals S1 and S3 held by these holding capacitors after the elapse of a predetermined time from the end of the driving RSD. More specifically, the control unit 109 activates a select terminal Ecs and a control signal TRO1, and inactivates a control signal TRO2. Subsequently, the control unit 109 controls a vertical scanning circuit 403 and a horizontal scanning circuit 404, thereby selecting a pixel to read first in the plurality of pixels P included in a pixel array 120. Accordingly, the reset signal S1 held by a holding portion SH1 of the selected pixel P is input to an inverting input terminal AMP− of a signal amplification unit 107, and the reset signal S3 held by a holding portion SH3 of the selected pixel P is input to a noninverting input terminal AMP+ of the signal amplification unit 107. In this way, the reading circuit 20 reads the reset signals S1 and S3 at the same timing.

In the above-described driving RSD, reset signals of the same potential are held by the holding capacitors CS1 and CS3. The control unit 109 reads the held reset signals S1 and S3 via the signal paths (differential signal paths) of the pixel signals of two systems in the pixel array 120 and outputs them to the signal amplification unit 107. The signal amplification unit 107 that receives the output from the pixel array 120 outputs a signal obtained by calculating the difference between the reset signal S1 and the reset signal S3. The reset signal S1 is read from the holding portion SH1 via a first signal path, and the reset signal S3 is read from the holding portion SH3 to the reading circuit 20 via a second signal path different from the first signal path. The accumulation signal S1 and the reset signal S1 are read from each pixel P to the reading circuit 20 via the same first signal path.

The output signal from the signal amplification unit 107 corresponds to a pixel signal in which an offset common to the signal paths of the two systems is corrected by the differential input. However, the difference between different noise components included in the signal paths of the two systems remains. This output signal is converted into digital data by an A/D conversion unit 108 and supplied to the control unit 109. The control unit 109 sequentially switches the selected pixel by controlling the vertical scanning circuit 403 and the horizontal scanning circuit 404, acquires pixel data used to generate an image in a period R, and generates a reset image formed by the reset signals. The control unit 109 acquires a plurality of reset images by performing the read in the period R a plurality of times.

FIG. 11 is a timing chart showing an example of a driving method of maximizing an accumulation period. Concerning the driving method shown in FIG. 11, a case in which an imaging mode in which the frame image rate is constant, and the additional capacitor Cfd' is not added is set will be described.

Frame periods F1 to F5 represent the first to fifth frame periods after the start of imaging. The frame period is a period repeated to generate a plurality of frame images. An accumulation period T is an accumulation period corresponding to each of the frame periods F1 to F5. The accumulation period T is a period in which charges are accumulated in the photoelectric conversion element PD. The charges include charges generated by radiation and dark charges other than those charges. During the accumulation period T, the control unit 109 notifies a signal processing unit 101, by an irradiation permission signal 114, that irradiation is possible.

Before imaging, an imaging mode is set. More specifically, since the sensitivity of the pixel P is high sensitivity using only the FD capacitor Cfd without adding the additional capacitor Cfd' for sensitivity switching, the control unit 109 inactivates the control signal WIDE, as in the timing chart of FIG. 10.

Upon detecting the leading edge of the pulse of the signal SYNC, the control unit 109 starts driving to generate a frame image in the frame period F1. At the leading edge of the pulse of the signal SYNC, one frame period F1 starts. At the next leading edge, the frame period F1 ends, and the next frame period F2 starts.

Driving SRSD in the frame period F1 will be described. Concerning the driving, the same description as in FIG. 10 will be omitted. The control unit 109 performs the driving SRSD to be explained below at once for all pixels P included in the imaging panel 105. The driving SRSD represents sample hold driving and reset driving executed in the frame periods F1 to F5. The sample hold driving is driving for performing a sample holding for holding a pixel signal in a holding portion. The reset driving is driving for performing a reset of the conversion portion CP and the amplification portion AP.

Upon detecting the leading edge of the pulse of the signal SYNC, the control unit 109 starts driving to generate a frame image in the frame period F1. First, the control unit 109 activates the enable signal EN. Accordingly, a voltage obtained by amplifying the voltage from the conversion portion CP is output from the amplification transistor M4. In addition, a voltage obtained by amplifying the voltage from the amplification transistor M4 is output from the amplification transistor M7. Next, the control unit 109 temporarily activates the control signal TS1. Accordingly, the accumulation signal S1 is transferred to the holding capacitor CS1 and held. The accumulation signal S1 is an unnecessary signal in the first driving SRSD of imaging.

Next, the control unit 109 activates the reset signal PRES. Accordingly, the reset voltage VRES that is a predetermined potential is supplied to the photodiode PD, and the charges in the photodiode PD are reset. As a result, the voltage from the conversion portion CP at the time of resetting is input to the input terminal n1 of the clamp capacitor Ccl. Next, the control unit 109 activates the clamp signal PCL. Accordingly, the clamp voltage VCL as a predetermined potential is input to the output terminal n2 of the clamp capacitor Ccl.

Next, the control unit 109 temporarily activates the control signals TS2 and TS3 until the clamp signal PCL is inactivated. Accordingly, the reset signals S2 and S3 are transferred to the holding capacitors CS2 and CS3 and held (that is, sampling of the reset signals is performed).

While the control signals TS2 and TS3 are temporarily activated, the control unit 109 inactivates the reset signal PRES. This sets the reset transistor M2 in the non-conductive state. The control unit 109 inactivates the control signals TS2 and TS3 and, after that, inactivates the clamp signal PCL. This changes the reset transistor M5 to the non-conductive state, the potential difference generated between the input terminal n1 and the output terminal n2 is held by the two terminals of the clamp capacitor Ccl, and the accumulation period T in which charges are accumulated in the photoelectric conversion element PD starts. The control unit 109 inactivates the clamp signal PCL and, after that, inactivates the enable signal EN. Accordingly, the driving SRSD in the frame period F1 thus ends. In the period F1, since an effective accumulation signal is not held by the holding capacitor CS1, read of the pixel signal is not performed.

Upon detecting the next leading edge of the pulse in the signal SYNC, the control unit 109 starts driving to generate a frame image in the frame period F2. In the frame period F2 as well, the driving SRSD is performed, as in the frame period F1.

First, the control unit 109 activates the enable signal EN, and then temporarily activates the control signal TS1. Accordingly, the transfer transistor M8 switches from the non-conductive state to the conductive state, and the accumulation signal S1 accumulated in the period T started in the frame period F1 is transferred to the holding capacitor CS1 and held (that is, sampling of the accumulation signal is performed).

Next, the control unit 109 sequentially activates the reset signal PRES and the clamp signal PCL, as in the period F1. Next, the control unit 109 temporarily activates the control signals TS2 and TS3, and holds the reset signals S2 and S3 in the holding capacitors CS2 and CS3. Next, the control unit 109 sequentially inactivates the reset signal PRES and the clamp signal PCL. By the inactivation of the clamp signal PCL, the accumulation period T of the frame period F2 starts. After that, the control unit 109 inactivates the enable signal EN and ends the driving SRSD in the frame period F2.

An operation of reading the accumulation signal S1 and the reset signal S3 in a period Ts of the frame period F2 will be described continuously with reference to FIG. 11. In this embodiment, the reading circuit 20 starts reading the accumulation signal S1 and the reset signal S3 after the elapse of a predetermined time from the start of holding of the accumulation signal S1. At the time of the end of the driving SRSD in the frame period F2, the holding capacitor CS1 holds the accumulation signal S1 in the frame period F1, and the holding capacitors CS2 and CS3 hold the reset signals S2 and S3 by the clamp voltage VCL that is a predetermined potential. The control unit 109 starts reading the accumulation signal S1 and the reset signal S3 which are held by these holding capacitors after the elapse of a predetermined time from the end of the driving SRSD. More specifically, the control unit 109 activates the select terminal Ecs and the control signal TRO1, and inactivates the control signal TRO2. Subsequently, the control unit 109 controls the vertical scanning circuit 403 and the horizontal scanning circuit 404, thereby selecting one of the plurality of pixels P included in the pixel array 120. Accordingly, the accumulation signal S1 held by the selected pixel P is input to the inverting input terminal AMP− of the signal amplification unit 107, and the reset signal S3 held by the selected pixel P is input to the noninverting input terminal AMP+ of the signal amplification unit 107. In this way, the reading circuit 20 reads the accumulation signal S1 and the reset signal S3 at the same timing.

The control unit 109 reads the held accumulation signal S1 and reset signal S3 via the signal paths (differential signal paths) of the pixel signals of two systems in the pixel array 120 and outputs them to the signal amplification unit 107. The signal amplification unit 107 that receives the output from the pixel array 120 outputs a signal obtained by calculating the difference between the accumulation signal S1 and the reset signal S3. The output signal from the signal amplification unit 107 corresponds to a pixel signal in which the offset of the signal paths of the two systems is corrected by the differential input. However, the difference between noise components included in the signal paths of the two systems remains. The accumulation signal S1 is read from the holding portion SH1 via the first signal path, and the reset signal S3 is read from the holding portion SH3 via the second signal path.

This output signal is converted into digital data by the A/D conversion unit 108 and supplied to the control unit 109. The control unit 109 sequentially switches the selected pixel by controlling the vertical scanning circuit 403 and the horizontal scanning circuit 404, acquires digital data used to generate an image during the period R, and generates an image corresponding to the frame period F1. The image thus generated based on the accumulation signals read from the pixels is called an accumulation image. The processing shown in FIG. 11 is performed in each of a state in which irradiation is not performed in the radiation imaging apparatus 100 and a state in which irradiation is performed in the radiation imaging apparatus 100, as will be described later. An accumulation image generated in the state in which irradiation is not performed in the radiation imaging apparatus 100 is called a dark image. An accumulation image generated in the state in which irradiation is performed in the radiation imaging apparatus 100 is called a radiation image.

Next, in each frame period after the frame period F3 as well, the same driving SRSD is performed. By the driving SRSD, the accumulation signal S1 in the immediately preceding frame period is transferred to the holding capacitor CS1 and held, and the reset signals S2 and S3 are transferred to the holding capacitors CS2 and CS3 and held, respectively. When the driving SRSD ends, the control unit 109 sequentially switches the selected pixel, acquires pixel data used to generate an accumulation signal during the period R, and generates an accumulation image corresponding to the immediately preceding frame period. In each frame period described above, the reset signal S1 is not held by the holding portion SH1.

In this embodiment, a correction image is generated before reception of an imaging start instruction, and a frame image is generated using the correction image, the reset image generated immediately before radiation imaging, and the radiation image. This can correct longitudinal line noise or block artifact derived from 1/f noise while suppressing a time lag at the start of imaging.

Figure 12:
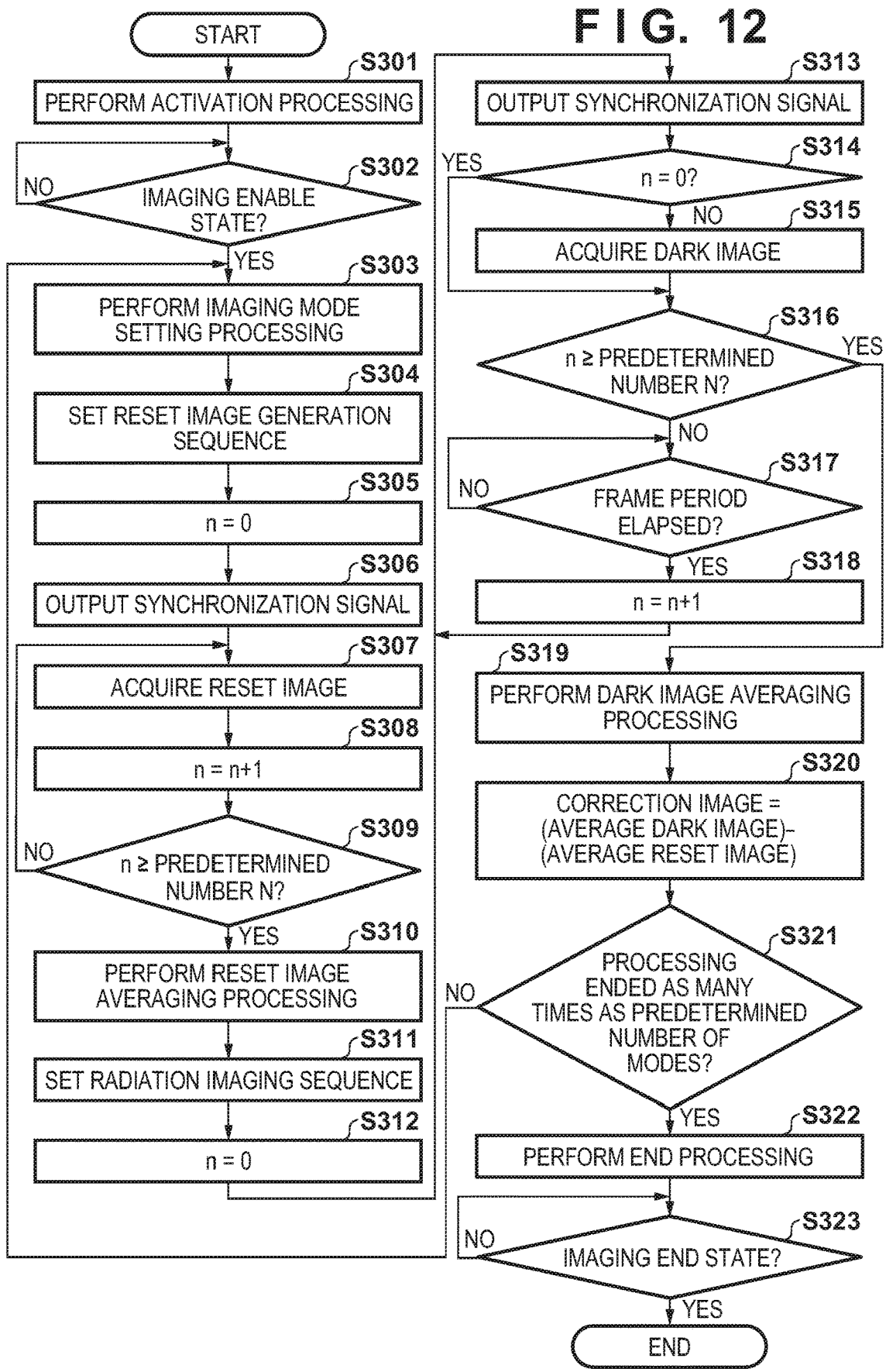
FIG. 12 is a flowchart showing an example of processing of generating a correction image according to some embodiments of the present invention.

FIG. 12 is a flowchart showing an example of processing of generating a correction image by the signal processing unit 101 based on a reset image and a dark image. This processing is performed before a radiation imaging system SYS receives an imaging start instruction from the user. In this processing, a correction image is generated based on the reset signal S1 and the accumulation signal S1 read from each pixel.

In the activation process of step S301, the signal processing unit 101 issues a control command to the control unit 109 of the radiation imaging apparatus 100 via a control interface 110 and makes the radiation imaging apparatus 100 transit to an imaging enable state. In step S302, the signal processing unit 101 determines via the control interface 110 whether the radiation imaging apparatus 100 transits to the imaging enable state. If the radiation imaging apparatus 100 has not transited to the imaging enable state ("NO" in step S302), the signal processing unit 101 waits until the radiation imaging apparatus 100 transits to the imaging enable state.

If the radiation imaging apparatus 100 transits to the imaging enable state ("YES" in step S302), in step S303, the signal processing unit 101 issues a control command to the control unit 109 and sets an imaging mode. Setting of the imaging mode includes sensitivity setting, setting of a frame image rate, accumulation time setting, pixel addition setting, and the like.

In step S304, the signal processing unit 101 issues a control command to the control unit 109 and sets such that the radiation imaging apparatus 100 is driven in a reset image generation sequence. In the reset image generation sequence setting, the signal processing unit 101 simultaneously sets the number N of reset images to be generated because a plurality of reset images are generated by one synchronization signal SYNC. When the reset image generation sequence is set, the control unit 109 becomes ready to control the radiation imaging apparatus by the driving method shown in FIG. 10. That is, the control unit 109 is ready to, upon receiving the synchronization signal SYNC, drive the imaging panel 105, read a reset signal from the imaging panel 105, and sequentially transfer the predetermined number N of reset images to the signal processing unit 101.

In step S305, the signal processing unit 101 resets an internal counter to 0. The counter is a counter configured to count the number of acquired reset images. In step S306, the signal processing unit 101 outputs the synchronization signal SYNC to the control unit 109 via a synchronization signal 113. Here, the control unit 109 that receives the synchronization signal SYNC starts the driving shown in FIG. 10. When the driving RSD is completed, the control unit 109 starts transferring a reset image to the signal processing unit.

Steps S307 to S309 represent processing of sequentially receiving the predetermined number N of reset images by the signal processing unit 101. In step S307, the signal processing unit 101 receives one reset image and stores the received reset image in a storage unit 115. In step S308, the signal processing unit 101 increments the counter. In step S309, the signal processing unit 101 determines whether reset images as many as the predetermined number N set by the reset image generation sequence setting in step S304 are acquired. If the predetermined number N of reset images are acquired ("YES" in step S309), the signal processing unit 101 executes the process of step S310. If the predetermined number N of reset images are not acquired ("NO" in step S309), the signal processing unit 101 returns to the process of step S307 to receive the next reset image. In step S310, the signal processing unit 101 generates an average reset image by averaging the predetermined number N of received reset images, and stores it in the storage unit 115. The processing up to this point is performed before the initial irradiation.

In step S311, the signal processing unit 101 issues a control command to the control unit 109 and sets such that the radiation imaging apparatus 100 is driven in a radiation imaging sequence. When the radiation imaging sequence is set, the control unit 109 becomes ready to control the radiation imaging apparatus by the driving method shown in FIG. 11. That is, the control unit 109 is ready to, upon receiving the synchronization signal SYNC, drive the imaging panel 105, read an accumulation signal from the imaging panel 105, and transfer the accumulation signal as an accumulation image to the signal processing unit 101.

In step S312, the signal processing unit 101 resets the internal counter to 0. In step S313, the signal processing unit 101 outputs the synchronization signal SYNC to the control unit 109. Here, the control unit 109 that receives the synchronization signal SYNC starts the driving in synchronism with the synchronization signal SYNC shown in FIG. 11. According to the first synchronization signal SYNC from the setting in step S311, the control unit 109 performs only the driving SRSD but does not perform read of the accumulation signal. From the second synchronization signal SYNC, the control unit 109 reads the accumulation signal in accordance with the driving SRSD and transfers the accumulation image to the signal processing unit 101. Since irradiation is not performed in the radiation imaging apparatus 100 during this processing, the transferred accumulation image is a dark image.

In step S314, the signal processing unit 101 determines the value of the counter. By the first synchronization signal, no dark image is transferred ("YES" in step S314). Hence, the signal processing unit 101 advances to step S316 without performing dark image acquisition processing. By the second or subsequent synchronization signal ("NO" in step S314), the signal processing unit 101 acquires a dark image.

In step S315, the signal processing unit 101 receives one dark image and stores the received dark image in the storage unit 115. In step S316, the signal processing unit 101 determines whether the predetermined number N of dark images are acquired. If the predetermined number N of dark images are acquired ("YES" in step S316), the signal processing unit 101 executes the process of step S319. If the predetermined number N of dark images are not acquired ("NO" in step S316), the signal processing unit 101 waits for the elapse of time from the output of the synchronization signal SYNC in step S317 ("NO" in step S317). If the frame period has elapsed ("YES" in step S317), the signal processing unit 101 executes the process of step S318. In step S318, the signal processing unit 101 increments the counter and repeats the processing from step S313.

In step S319, the signal processing unit 101 generates an average dark image by averaging the predetermined number N of received dark images, and stores it in the storage unit 115. In step S320, the signal processing unit 101 reads the average dark image data and the average reset image from the storage unit 115, and subtracts the average reset image from the average dark image, thereby generating a correction image corresponding to the imaging mode set in step S303. The signal processing unit 101 stores the correction image in the storage unit 115.

In step S321, the signal processing unit 101 determines whether correction image acquisition is completed as many times as the number of imaging modes used for imaging by the radiation imaging system SYS. If the correction image acquisition is not completed ("NO" in step S321), the signal processing unit 101 repeats the processing from step S301 to generate correction images as many as the number of necessary imaging modes.

If the predetermined number N of correction images are acquired ("YES" in step S321), in step S322, the signal processing unit 101 issues a control command to the control unit 109 of the radiation imaging apparatus 100 via the control interface 110. Accordingly, the radiation imaging apparatus 100 transits to an imaging end state.

In step S323, the signal processing unit 101 determines via the control interface 110 whether the radiation imaging apparatus 100 transits to the imaging end state, and waits until the radiation imaging apparatus 100 transits to the imaging end state ("NO" in step S323). If the radiation imaging apparatus 100 transits to the imaging end state ("YES" in step S323), the signal processing unit 101 completes the correction image generation processing.

On the average dark image generated by the processes of steps S311 to S319, the offset of the read system is superimposed in addition to the offsets of the conversion portion CP and the amplification portion AP. On the other hand, the average reset image generated by the processes of steps S303 to S310 includes only the offset of the read system. When the average reset image is subtracted from the average dark image in step S320, the offset components of the read system in the images cancel each other, and a correction image of the conversion portion CP and the amplification, which includes little random noise but no offset of the read system, is obtained.

In the example of the flowchart shown in FIG. 12, generation of the average reset image is performed in steps S307 to S310 in the signal processing unit 101. Instead, the generation of the average reset image may be performed by the control unit 109. In this case, a storage unit configured to temporarily store the reset image is formed in the control unit 109, and generated reset images are sequentially stored. When generation of the predetermined number N of reset images is completed, averaging processing of the reset images stored in the storage unit is performed, and the generated average reset image is transferred to the signal processing unit 101.

Figure 13:
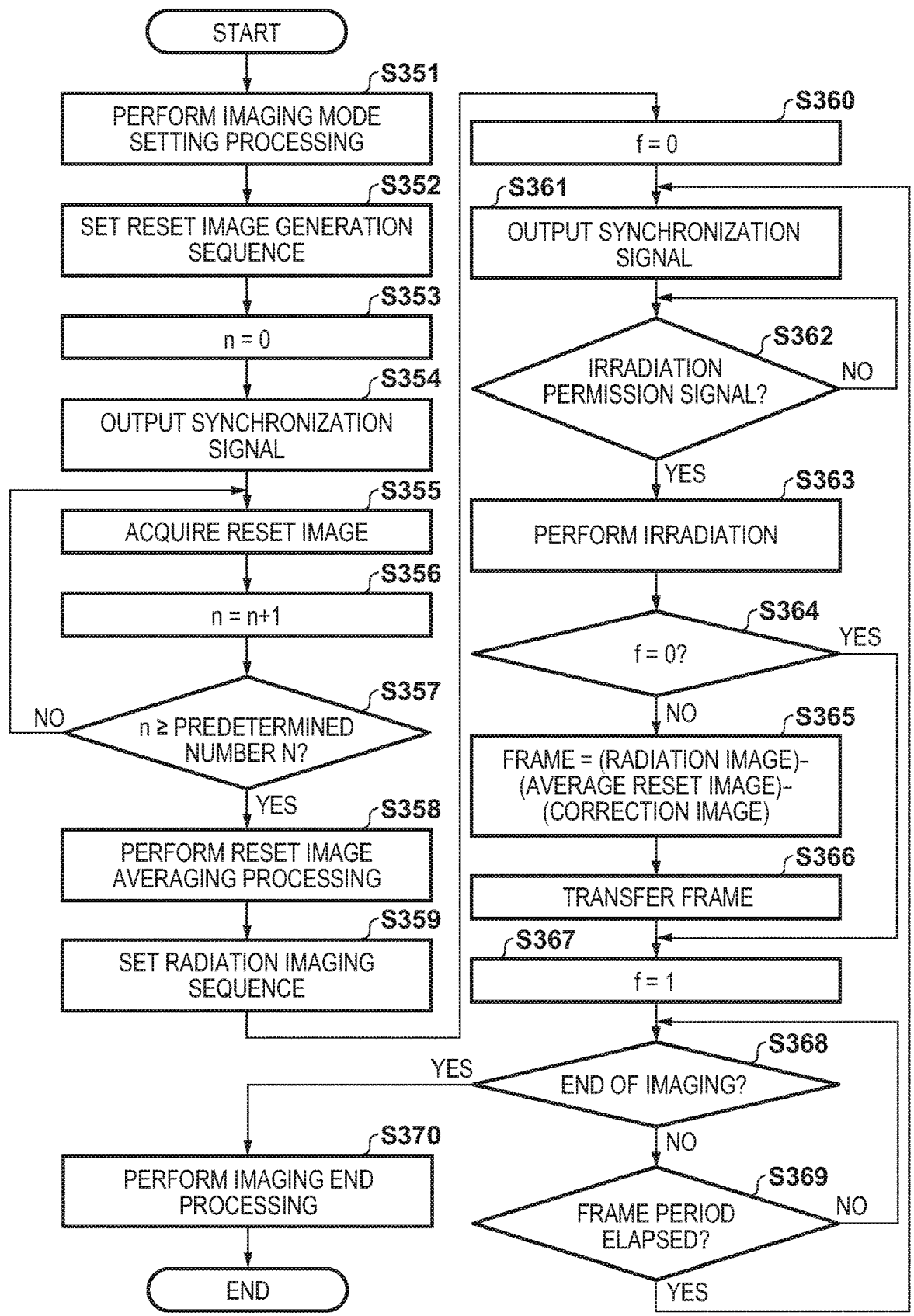
FIG. 13 is a flowchart showing an example of processing of performing offset correction according to some embodiments of the present invention.

FIG. 13 is a flowchart showing an example of processing of acquiring a reset image after reception of an imaging start instruction and correcting a radiation image acquired during imaging using the reset image and a correction image, thereby generating a frame image. The flowchart of FIG. 13 shows an example in which control starts from a state in which the radiation imaging apparatus 100 can perform imaging. A description of the same portions as in the flowchart of FIG. 12 will be simplified.

In step S351, the signal processing unit 101 sets an imaging mode including sensitivity setting, setting of a frame image rate, accumulation time setting, pixel addition setting, and the like. In step S352, the signal processing unit 101 sets such that the radiation imaging apparatus 100 is driven in a reset image generation sequence. In step S353, the signal processing unit 101 resets the internal counter to 0. In step S354, the signal processing unit 101 outputs the synchronization signal SYNC to the control unit 109. The control unit 109 that receives the synchronization signal SYNC starts the driving shown in FIG. 10. When the driving RSD is completed, the control unit 109 starts transferring the predetermined number N of reset images to the signal processing unit.

Steps S355 to S357 represent processing of sequentially receiving the predetermined number N of reset images by the signal processing unit 101. The processes of steps S355 to S357 are the same as in steps S307 to S309 shown in FIG. 10. In step S358, the signal processing unit 101 generates average reset image data by averaging the predetermined number N of received reset images, and stores it in the storage unit 115.

In step S359, the signal processing unit 101 issues a control command to the control unit 109 and sets such that the radiation imaging apparatus 100 is driven in a radiation imaging sequence. In step S360, the signal processing unit 101 resets an internal flag f to 0. The flag f is a flag used for control to inhibit acquisition of a radiation image in the frame period F1 shown in FIG. 11.

In step S361, the signal processing unit 101 outputs the synchronization signal SYNC to the control unit 109. The control unit 109 that receives the synchronization signal SYNC starts driving the imaging panel 105 in accordance with the timing chart of FIG. 11, and outputs the irradiation permission signal 114 to the signal processing unit 101 during the accumulation period T. In step S362, the signal processing unit 101 waits for the irradiation permission signal 114 ("NO" in step S362). Upon detecting that the irradiation permission signal 114 is activated, and an irradiation enable state is set ("YES" in step S362), in step S363, the signal processing unit 101 outputs a control signal to an irradiation control unit 103 such that irradiation is performed in the accumulation period T.

In step S364, the signal processing unit 101 determines whether to acquire a radiation image after output of the synchronization signal SYNC. If the flag f is 0 ("YES" in step S364), since the first synchronization signal SYNC is output, the signal processing unit 101 does not perform the processes of steps S365 and S366 and does not acquire a radiation image. If the flag f is 1 ("NO" in step S364), since the second or subsequent synchronization signal SYNC is output, the signal processing unit 101 starts radiation image acquisition processing.

In step S365, the control unit 109 A/D-converts an accumulation signal held by each pixel within the frame period, and transfers it as a radiation image to the signal processing unit 101. The signal processing unit 101 subtracts the average reset image stored in the storage unit 115 in step S358 and the correction image of the same imaging mode stored in step S320 from the sequentially transferred radiation image, thereby generating a frame image. The correction image used here is the correction image stored in the storage unit 115 in advance in accordance with the imaging mode. A correction image whose imaging mode including the resolution and the accumulation time is the same as in radiation imaging is selected.

In step S366, the signal processing unit 101 transfers the frame image to the post-process in accordance with the imaging mode. In the post-process, the signal processing unit 101 performs image processes such as gain correction processing and sharpening processing for the transferred frame image by a pipeline method in parallel to the radiation imaging. In imaging such as radiation fluoroscopy in which an image is observed in real time, an image after processing is transferred to a display unit 102 and displayed. In imaging such as 3D imaging in which processing is performed based on a plurality of images, the signal processing unit 101 stores a frame image after image processing in the storage unit 115.

In step S367, the signal processing unit 101 sets 1 to the flag f. When 1 is set to the flag f, image acquisition processing is performed for each output of the synchronization signal SYNC. In step S368, the signal processing unit 101 determines, based on a radiation fluoroscopy switch (not shown) or a programmed number of images, whether to end the imaging. To continue the imaging ("NO" in step S368), in step S369, the signal processing unit 101 determines the elapse of time of the frame period. Upon determining to end the imaging ("YES" in step S369), in step S370, the signal processing unit 101 transmits a control command to notify the end of image generation in the current imaging mode to the control unit 109 via the control interface 110, and performs end processing of the imaging.

Upon determining in step S369 that the frame period has not elapsed ("NO" in step S369), the signal processing unit 101 performs the determination processing of step S368 again. Upon determining in step S369 that the frame period has elapsed ("YES" in step S369), the signal processing unit 101 performs imaging of the next frame image from step S361. The signal processing unit 101 continues the processing of the acquired images up to the end of the imaging.

In the example of the flowchart shown in FIG. 13, the subtraction processing of the average reset image from the radiation image in the process of step S365 is performed in the signal processing unit 101. However, the subtraction processing may be performed by the control unit 109. In this case, a storage unit configured to store the reset image is formed in the control unit 109, and the processes of steps S355 to S358 are performed by the control unit 109. That is, the control unit 109 sequentially stores generated reset images. When generation of the predetermined number N of reset images is completed, averaging processing of the reset images stored in the storage unit is performed, and the average reset image is stored in the storage unit. In the process of step S365, the control unit 109 performs subtraction processing of the average reset image stored in the storage unit from the radiation image read from the imaging panel 105, and transfers the pixels after the subtraction processing to the signal processing unit 101. That is, the control unit 109 transfers the image obtained by subtracting the average reset image from the radiation image to the signal processing unit 101, instead of directly transferring the radiation image. In the processing of the signal processing unit 101 in step S365, the correction image is subtracted from the transferred image, thereby generating a frame image.

On the radiation image read from the imaging panel 105 by the process of step S365, the offset of the read system is superimposed in addition to the offsets of the conversion portion CP and the amplification portion AP. On the other hand, the average reset image generated by the processes of steps S355 to S358 includes only the offset of the read system. When the average reset image is subtracted from the radiation image in step S365, the offset components of the read system included in the images cancel each other. In the correction image generated in FIG. 12 as well, the offset component of the read system is canceled. For this reason, a frame image that is hardly influenced by 1/f noise for causing a fluctuation in the offset of the read system is generated. In particular, since the acquisition of the reset image immediately before the imaging does not need an accumulation period, the processing is completed in a short time. For example, when signals are read in parallel from a pixel array including 128 vertical pixels×960 horizontal pixels using a pixel clock of 25 MHz, the read of the pixel signals is completed in 10 msec or less. Hence, for example, even when performing acquisition and averaging processing of 10 reset images, the processing is completed in 0.2 sec or less, and radiation imaging can be started. In this embodiment, the method of differentially reading the signals by the reading circuit 20 has been described. However, the signals may be read by a single end method.

Fourth Embodiment

Figure 14:
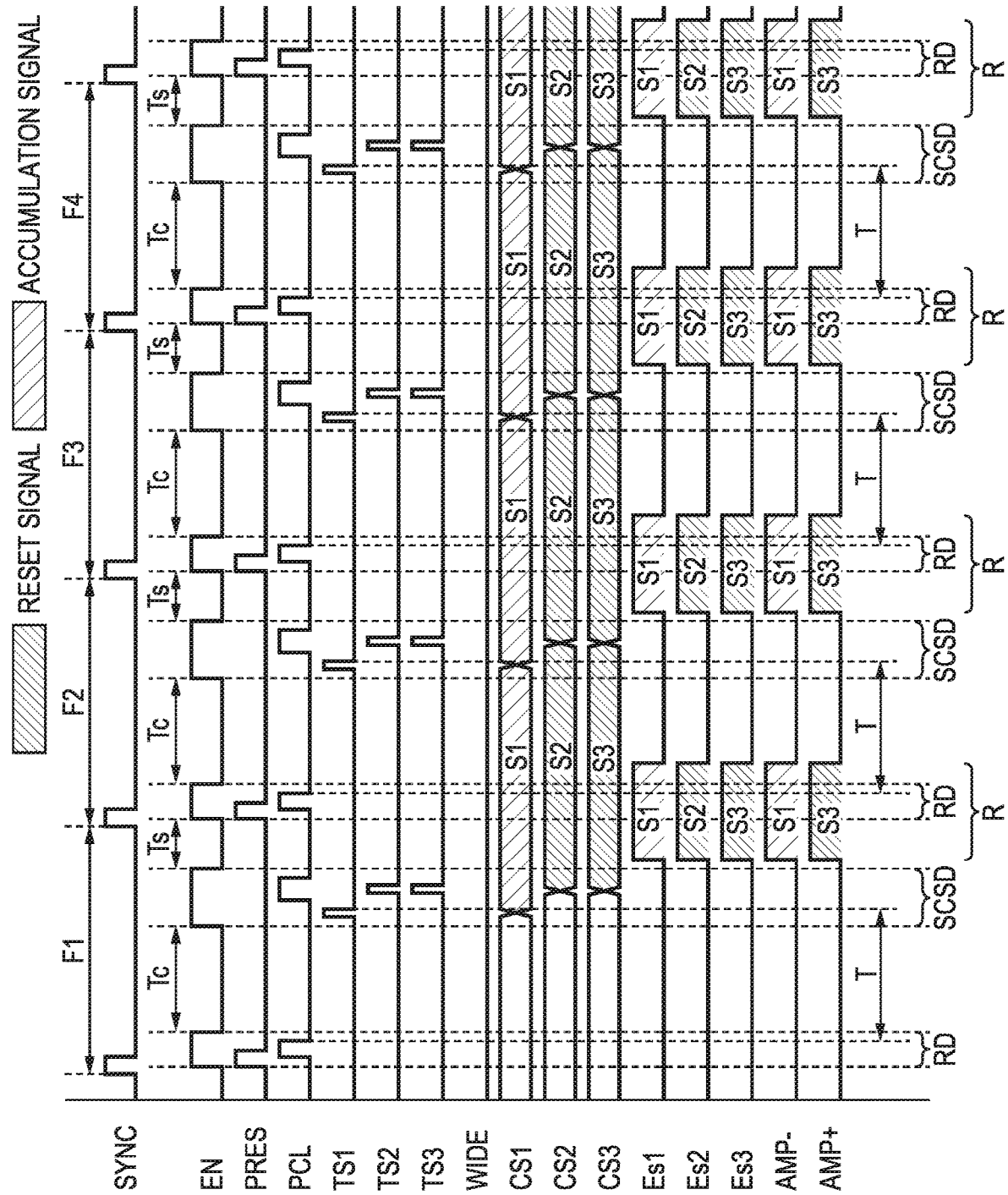
FIG. 14 is a timing chart showing an example of a driving method of resetting a signal generation unit according to some embodiments of the present invention.

A driving method of a radiation imaging apparatus 100 according to the fourth embodiment will be described with reference to FIG. 14. The hardware arrangement of the radiation imaging apparatus 100 may be the same as in the first embodiment, and a repetitive description thereof will be omitted. The difference between the third embodiment and the fourth embodiment will mainly be explained below. FIG. 14 is a timing chart showing an example of a driving method of resetting a conversion portion CP and an amplification portion AP during the read period of an accumulation signal. Concerning the driving as well, the same description as in the third embodiment will be omitted. Concerning the driving method shown in FIG. 14, a case in which an imaging mode in which the frame image rate is constant, and a sensitivity without adding an additional capacitor Cfd' is used is set will be described.

Upon detecting the leading edge of the pulse of a synchronization signal SYNC, a control unit 109 starts driving to generate a frame image in a frame period F1. Driving RD in the frame period F1 will be described. The driving RD represents reset driving of the conversion portion CP and the amplification portion AP executed in frame periods F1 to F4.

First, the control unit 109 activates an enable signal EN. Next, the control unit 109 activates a reset signal PRES. Accordingly, charges in a photodiode PD are reset. As a result, the voltage from the conversion portion CP at the time of resetting is input to an input terminal n1 of a clamp capacitor Ccl. Next, the control unit 109 activates a clamp signal PCL. Accordingly, a clamp voltage VCL is input to an output terminal n2 of the clamp capacitor Ccl.

The control unit 109 inactivates the reset signal PRES and subsequently inactivates the clamp signal PCL. This changes a reset transistor M5 to a non-conductive state, the potential difference generated between the input terminal n1 and the output terminal n2 is held by the two terminals of the clamp capacitor Ccl, and an accumulation period T in which charges are accumulated in the photoelectric conversion element PD starts. The control unit 109 inactivates the clamp signal PCL and, after that, inactivates the enable signal EN. The driving RD in the frame period F1 thus ends.

When a period Tc calculated from the accumulation period set by the setting of the imaging mode elapses, the control unit 109 starts driving SCSD to perform sample holding of an accumulation signal and sample holding of a reset signal. The driving SCSD will be described. First, the control unit 109 activates the enable signal EN. Next, the control unit 109 temporarily activates a control signal TS1. Accordingly, an accumulation signal S1 is transferred to a holding capacitor CS1 and held.

Next, the control unit 109 activates the clamp signal PCL. Accordingly, the clamp voltage VCL that is a predetermined potential is input to the output terminal n2 of the clamp capacitor Ccl. Next, the control unit 109 temporarily activates control signals TS2 and TS3 until the clamp signal PCL is inactivated. Accordingly, reset signals S2 and S3 are transferred to holding capacitors CS2 and CS3 and held (that is, sampling of the reset signals is performed).

The control unit 109 inactivates the control signals TS2 and TS3 and, after that, inactivates the clamp signal PCL. The control unit 109 inactivates the clamp signal PCL and, after that, inactivates the enable signal EN. The driving SCSD in the frame period F1 thus ends.

An operation of reading the accumulation signal S1 and the reset signal S3 in a period Ts of the frame period F1 will be described. In the fourth embodiment, a reading circuit 20 starts reading the accumulation signal S1 and the reset signal S3 after the elapse of a predetermined time from the start of holding of the accumulation signal S1, as in the third embodiment. At the time of the end of the driving SCSD in the frame period F1, the holding capacitor CS1 holds the accumulation signal S1 in the frame period F1, and the holding capacitors CS2 and CS3 hold the reset signals S2 and S3 by the clamp voltage VCL that is a predetermined potential. The control unit 109 starts reading the accumulation signal S1 and the reset signal S3 which are held by these holding capacitors after the elapse of a predetermined time from the end of the driving SCSD.

When the frame period F1 elapses, the synchronization signal SYNC is transmitted from a signal processing unit 101 to the control unit 109. FIG. 12 shows an example in which when the control unit 109 detects the leading edge of the pulse of the synchronization signal SYNC in a read period R of the held signals, the driving RD in the frame period F2 starts. Since the driving RD is driving for performing a reset of the conversion portion CP and the amplification portion AP, the signals held by the holding capacitors do not change. Hence, the resetting and the read of the held signals are performed in parallel. When the control unit 109 inactivates the clamp signal PCL in the driving RD, the accumulation period T starts. The control unit 109 sequentially switches the selected pixel by controlling a vertical scanning circuit 403 and a horizontal scanning circuit 404, and generates an accumulation image corresponding to the frame period F1 in the period R. In the frame period F2 or a subsequent frame period as well, the same driving and read are performed, and the control unit 109 generates an accumulation image corresponding to each frame period.

Figure 15:
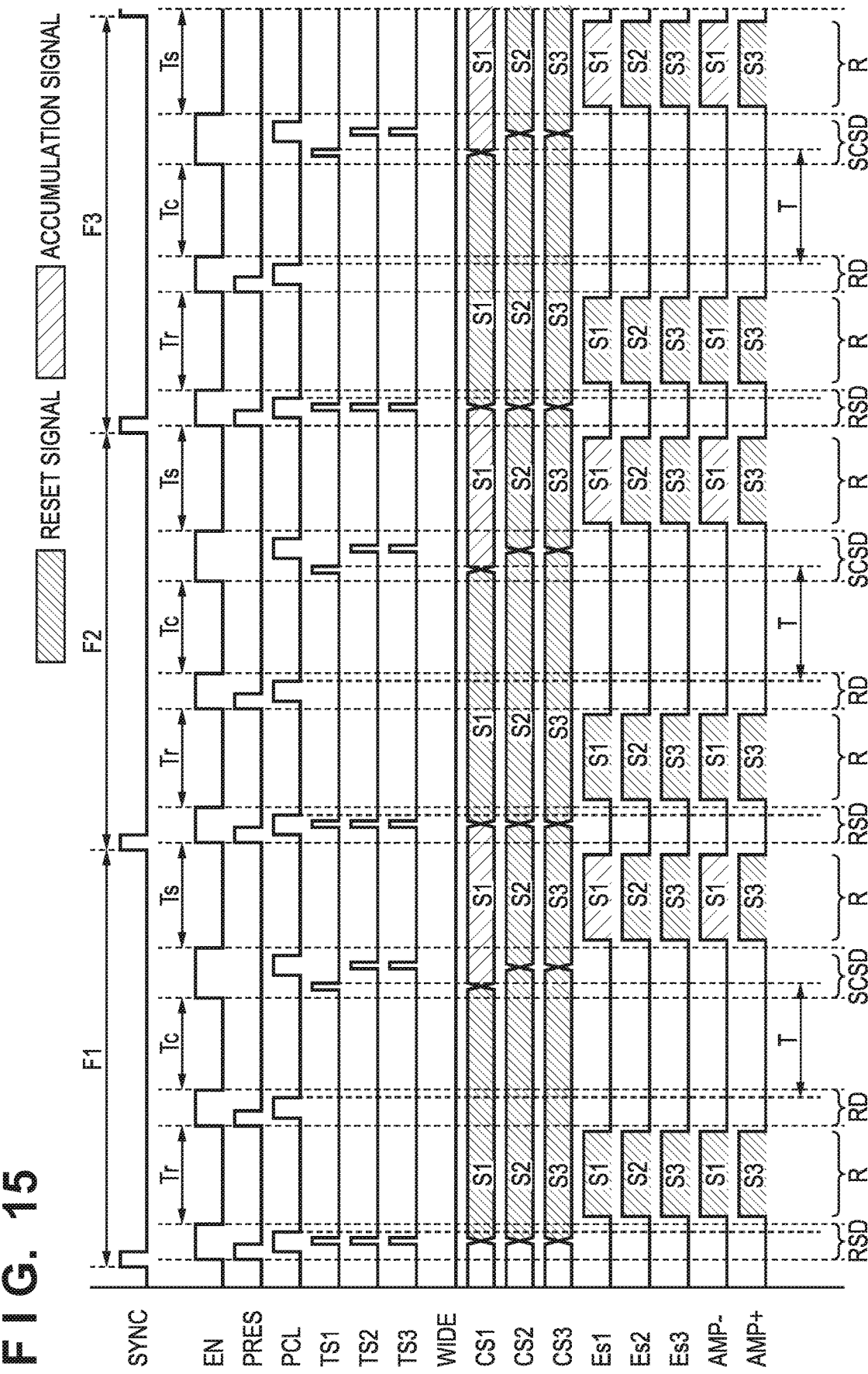
FIG. 15 is a timing chart showing an example of a driving method of reading an accumulation signal according to some embodiments of the present invention.

FIG. 15 is a timing chart showing an example of a driving method of reading a reset signal by resetting the conversion portion CP and the amplification portion AP, performing reset again, and sampling and reading an accumulation signal accumulated in the accumulation period T. The driving shown in FIG. 15 is used when generating a correction image. Concerning the driving shown in FIG. 15 as well, the same description as in the third embodiment will be omitted. Concerning the driving method shown in FIG. 15, a case in which an imaging mode in which the frame image rate is constant, and a sensitivity without adding the additional capacitor Cfd' is used is set will be described, as in the driving shown in FIG. 14.

In the frame period F1 shown in FIG. 15, upon detecting the leading edge of the pulse of the synchronization signal SYNC, the control unit 109 performs driving RSD to generate a reset image. The control unit 109 starts reading the reset signals S1 and S3 after the elapse of a predetermined time from the end of the driving RSD. The control unit 109 reads the reset signal and generates a reset image in the period R.

Next, the control unit 109 performs the reset driving RD to reset the conversion portion CP and the amplification portion AP and starts accumulation. When the period Tc elapses from the completion of the reset driving RD, the control unit 109 starts the driving SCSD and performs sample holding of the accumulation signal and sample holding of the reset signal.

In the period Ts of the frame period F1, the control unit 109 sequentially switches the selected pixel by controlling the vertical scanning circuit 403 and the horizontal scanning circuit 404, acquires the accumulation signal in the frame period F1 during the period R, and generates an accumulation image.

After the completion of the generation of the accumulation signal, the signal processing unit 101 transmits the synchronization signal SYNC to the control unit 109. Upon detecting the leading edge of the pulse of the synchronization signal SYNC, the control unit 109 starts driving in the next frame period F2. In the frame period F2 or a subsequent frame period as well, the same driving and read as in the frame period F1 are performed, and the control unit 109 generates a reset image and an accumulation image corresponding to each frame period.

Figure 16:
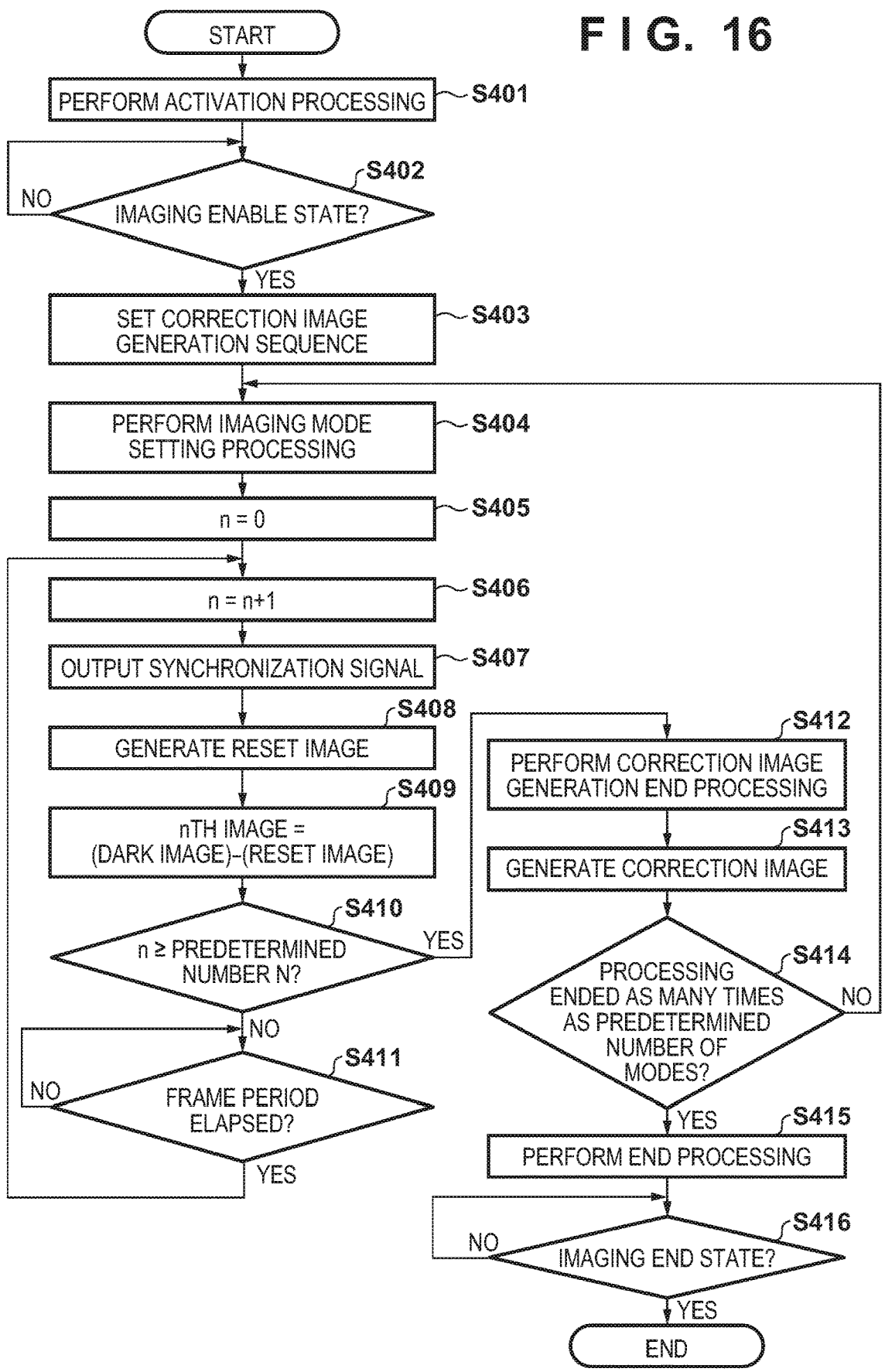
FIG. 16 is a flowchart showing an example of processing until a correction image is generated based on a plurality of dark images according to some embodiments of the present invention.

FIG. 16 is a flowchart showing an example of processing of generating a correction image based on a plurality of dark images by the signal processing unit 101 that performs system control. This processing is performed before a radiation imaging system SYS receives an imaging start instruction from the user. The difference between the third embodiment and the fourth embodiment will mainly be explained below.

In the activation process of step S401, the signal processing unit 101 issues a control command to the control unit 109 and makes the radiation imaging apparatus 100 transit to an imaging enable state. In step S402, the signal processing unit 101 waits until the radiation imaging apparatus 100 transits to the imaging enable state ("NO" in step S402). If the radiation imaging apparatus 100 transits to the imaging enable state ("YES" in step S402), in step S403, the signal processing unit 101 issues a control command to the control unit 109 and sets such that the radiation imaging apparatus 100 is driven in a correction image generation sequence. When the correction image generation sequence is set, the control unit 109 becomes ready to control the radiation imaging apparatus by the driving method shown in FIG. 15. That is, the control unit 109 is ready to, upon detecting the leading edge of the pulse of the synchronization signal SYNC, sequentially transfer a reset image and an accumulation image to the signal processing unit 101.

In step S404, the signal processing unit 101 issues a control command to the control unit 109 and sets an imaging mode. In step S405, the signal processing unit 101 resets an internal counter configured to count the number of acquired images to 0. In step S406, the signal processing unit 101 increments the counter. In step S407, the signal processing unit 101 outputs the synchronization signal SYNC to the control unit 109. Here, the control unit 109 that receives the synchronization signal SYNC starts the driving shown in FIG. 15. That is, the control unit 109 starts the driving RSD, reset image transfer, reset driving RD, accumulation, driving SCSD, and accumulation image transfer. In step S408, the signal processing unit 101 receives a reset image and stores the received reset image in a storage unit 115.

Next, in step S409, the signal processing unit 101 subtracts the reset image stored in the storage unit 115 from the dark image transferred from the control unit 109, thereby generating an nth image (n is a natural number). The signal processing unit 101 stores the nth image in the storage unit 115.

In step S410, the signal processing unit 101 determines whether the predetermined number N of images are acquired. If the predetermined number N of images are acquired ("YES" in step S410), the signal processing unit 101 executes the process of step S412. If the predetermined number N of images are not acquired ("NO" in step S410), the signal processing unit 101 waits for the elapse of time from the output of the synchronization signal SYNC in step S411 ("NO" in step S411). If the frame period has elapsed ("YES" in step S411), the signal processing unit 101 repeats the processing of image generation from step S406.

Since acquisition of the predetermined number N of frame images is completed, in step S412, the signal processing unit 101 transmits a control command to notify the end of image generation in the current imaging mode to the control unit 109. In step S413, the signal processing unit 101 performs averaging processing of the first image to the Nth image acquired in accordance with the flowchart from step S404 and stores the resultant image as a correction image in the storage unit 115.

In step S414, the signal processing unit 101 determines whether correction image acquisition is completed as many times as the number of imaging modes used for imaging by the radiation imaging system SYS. If the correction image acquisition is not completed ("NO" in step S414), the signal processing unit 101 repeats the processing from step S404 to generate a necessary number of correction images.

If correction images as many as the predetermined number of modes could be acquired ("YES" in step S414), in the end process of step S415, the signal processing unit 101 issues a control command to the control unit 109 and makes the radiation imaging apparatus 100 transit to an imaging end state. In step S416, the signal processing unit 101 determines whether the radiation imaging apparatus 100 transits to the imaging end state and waits until the radiation imaging apparatus 100 transits to the imaging end state ("NO" in step S416). If the radiation imaging apparatus 100 transits to the imaging end state ("YES" in step S416), the signal processing unit 101 completes the correction image generation processing.

Figure 17:
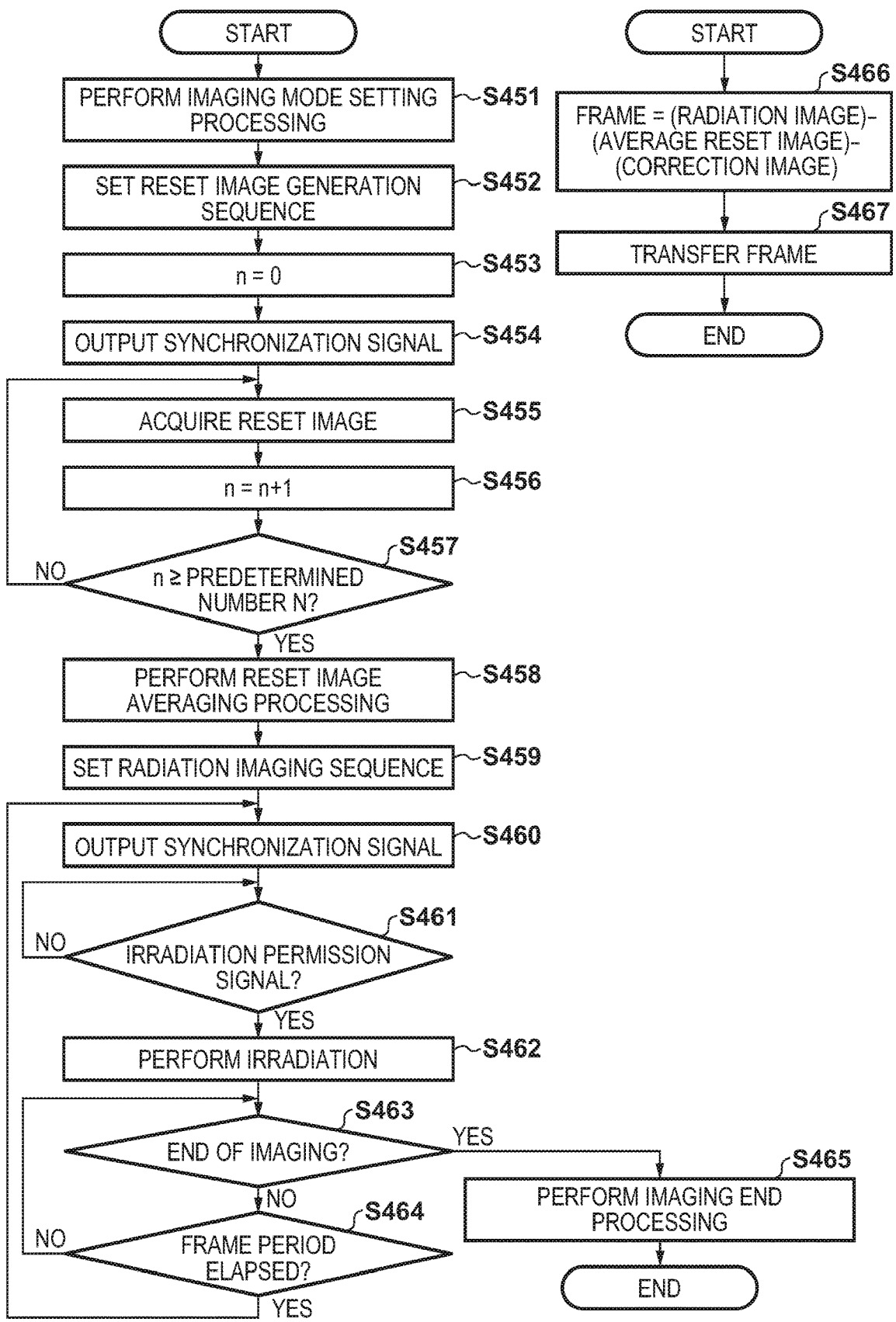
FIGS. 17A and 17B are flowcharts showing an example of processing of performing offset correction of a radiation image according to some embodiments of the present invention.

FIGS. 17A and 17B show a procedure for explaining radiation imaging control according to the fourth embodiment. FIGS. 17A and 17B are flowcharts showing an example of processing of acquiring a reset image immediately before the start of radiation imaging and correcting a radiation image acquired in radiation imaging using the reset image and a correction image. The flowcharts of FIGS. 17A and 17B show an example in which control starts from a state in which the radiation imaging apparatus 100 can perform imaging. A description of the same portions as in the third embodiment and the description of FIG. 16 will be simplified.

The processes of steps S451 to S458 shown in FIG. 17A are the same as the processes of steps S351 to S358 shown in FIG. 13. In step S451, the signal processing unit 101 sets an imaging mode. The predetermined number N of reset images are acquired while outputting the synchronization signal SYNC. After that, average reset image data is generated by performing averaging processing of the reset images and stored in the storage unit 115. The processing up to this point is performed before the initial irradiation.

In step S459, the signal processing unit 101 issues a control command to the control unit 109 and sets such that the radiation imaging apparatus 100 is driven in a radiation imaging sequence. In step S460, the signal processing unit 101 outputs the synchronization signal SYNC to the control unit 109. The control unit 109 that receives the synchronization signal SYNC starts driving of the imaging panel 105 in accordance with the timing chart of FIG. 14 and outputs an irradiation permission signal 114 to the signal processing unit 101 during the accumulation period T. In step S461, the signal processing unit 101 waits for the irradiation permission signal 114 ("NO" in step S461). Upon detecting that the irradiation permission signal 114 is activated, and an irradiation enable state is set ("YES" in step S461), in step S462, the signal processing unit 101 outputs a control signal to an irradiation control unit 103 such that irradiation is performed in the accumulation period T.

In step S463, the signal processing unit 101 determines, based on a radiation fluoroscopy switch (not shown) or a programmed number of images, whether to end the imaging. To continue the imaging ("NO" in step S463), in step S464, the signal processing unit 101 determines the elapse of time of the frame period. Upon determining to end the imaging ("YES" in step S463), in step S465, the signal processing unit 101 transmits a control command to notify the end of the current imaging to the control unit 109, and performs end processing of the imaging. Upon determining in step S464 that the frame period has not elapsed ("NO" in step S464), the signal processing unit 101 performs the determination processing of step S463 again. Upon determining that the frame period has elapsed ("YES" in step S464), the signal processing unit 101 performs imaging of the next frame image from step S460.

The signal processing unit 101 starts radiation image acquisition processing shown in FIG. 17B at the same time as the end of the accumulation period of the control unit 109 in parallel to the irradiation control processing shown in FIG. 17A. In step S466, the control unit 109 that completes the accumulation performs the driving SCSD and transfers the accumulation signal held by each pixel to the signal processing unit 101 as a radiation image. The signal processing unit 101 subtracts the average reset image stored in step S458 and the correction image of the same imaging mode stored in step S413 from the sequentially transferred radiation image, thereby generating a frame image.

In step S467, the signal processing unit 101 transfers the frame image to the post-process in accordance with the imaging mode. The frame image transferred to the post-process undergoes various kinds of correction processing, and is displayed on a display unit or stored in the storage unit.

Fifth Embodiment

A driving method of a radiation imaging apparatus 100 according to the fifth embodiment will be described with reference to FIG. 18. The hardware arrangement of the radiation imaging apparatus 100 may be the same as in the first embodiment, and a repetitive description thereof will be omitted. The difference between the third embodiment and the fifth embodiment will mainly be explained below. Concerning the driving method shown in FIG. 18, a case in which an imaging mode to read two types of sensitivities is set will be described. Images of the read two types of sensitivities may be used as images for synthesis to expand the dynamic range. In the fifth embodiment, a description concerning synthesis will be omitted.

Figure 18:
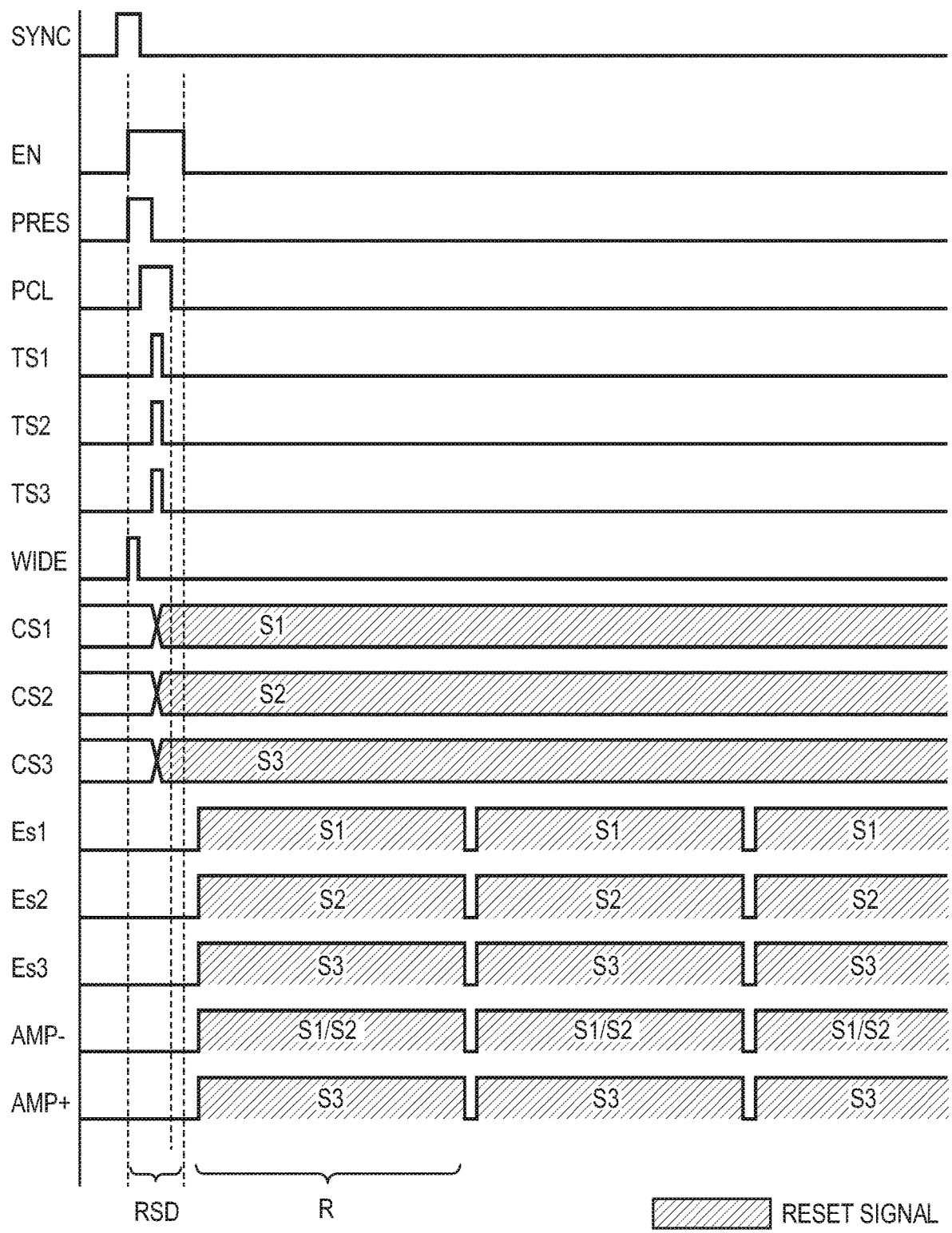
FIG. 18 is a timing chart showing an example of a driving method of continuously reading a reset signal according to some embodiments of the present invention.

FIG. 18 is a timing chart showing an example of a driving method of continuously reading a reset signal after resetting of a conversion portion CP and an amplification portion AP in a pixel P is performed. Reset driving and sample hold driving RSD will be described. Upon detecting the leading edge of the pulse of a signal SYNC, a control unit 109 starts driving to generate a reset image. First, the control unit 109 activates an enable signal EN. The control unit 109 also activates a reset signal PRES and a control signal WIDE for sensitivity switching. This sets a transistor M1 in a conductive state, and charges in a photodiode PD, a floating diffusion capacitor Cfd, and an additional capacitor Cfd' for sensitivity switching in the conversion portion CP are reset.

Next, the control unit 109 inactivates the control signal WIDE. Accordingly, the voltage at the time of resetting is held by the additional capacitor Cfd'. Next, the control unit 109 activates a clamp signal PCL. Accordingly, a clamp voltage VCL is input to an output terminal n2 of a clamp capacitor Ccl. The control unit 109 inactivates the reset signal PRES. This sets a reset transistor M2 in a non-conductive state.

Next, the control unit 109 temporarily activates control signals TS1 to TS3 until the clamp signal PCL is inactivated. Accordingly, reset signals S1 to S3 are transferred to holding capacitors CS1 to CS3 and held (that is, sampling of the reset signals is performed).

An operation of reading the reset signals S1 to S3 in a read period R will be described continuously with reference to FIG. 18. In this embodiment, a reading circuit 20 starts reading the reset signals S1 to S3 after the elapse of a predetermined time from the start of holding of the reset signals S1 to S3. More specifically, first, the control unit 109 activates a select terminal Ecs. Next, the control unit 109 activates a control signal TRO1 and inactivates a control signal TRO2. The reset signal S1 is thus selected. Subsequently, the control unit 109 controls a vertical scanning circuit 403 and a horizontal scanning circuit 404, thereby selecting a pixel to read first in a plurality of pixels P included in a pixel array 120. Accordingly, the reset signal S1 of the first pixel is input to an inverting input terminal AMP− of a signal amplification unit 107, and the reset signal S3 is input to a noninverting input terminal AMP+ of the signal amplification unit 107. In this way, the reading circuit 20 reads the difference between the reset signal S1 and the reset signal S3 at the same timing.

The control unit 109 sequentially switches the selected pixel by controlling the horizontal scanning circuit 404, and reads the pixel data of one row as the difference between the reset signal S1 and the reset signal S3. Next, the control unit 109 inactivates the control signal TRO1 and activates the control signal TRO2. The reset signal S2 is thus selected. The control unit 109 sequentially switches the selected pixel by controlling the horizontal scanning circuit 404, and reads the pixel data of one row as the difference between the reset signal S2 and the reset signal S3. That is, the control unit 109 scans one row twice, reads the difference between the reset signal S1 and the reset signal S3 by the first scanning, and reads the difference between the reset signal S2 and the reset signal S3 by the second scanning.

The control unit 109 switches the control signal TRO1 and the control signal TRO2 for each scanning while controlling the vertical scanning circuit 403 and the horizontal scanning circuit 404, thereby generating pixel data used to generate two types of images in the read period R. The control unit 109 generates a high-sensitivity reset image based on the reset signal S1 held by the holding capacitor CS1 and a low-sensitivity reset image based on the reset signal S2 held by the holding capacitor CS2. The control unit 109 generates a plurality of reset images by performing the read in the period R a plurality of times.

Figure 19:
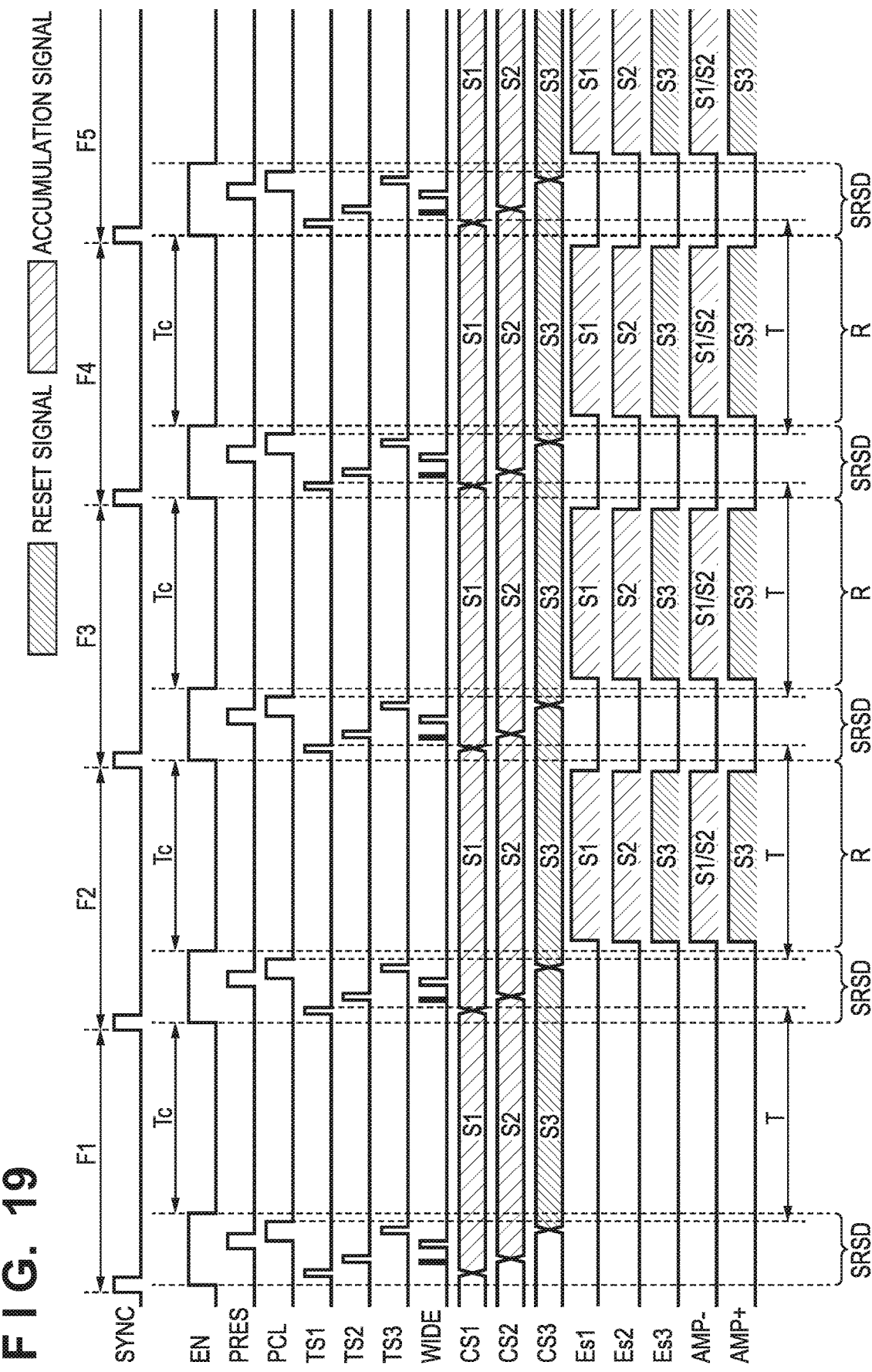
FIG. 19 is a timing chart showing an example of a driving method of maximizing an accumulation period according to some embodiments of the present invention.

FIG. 19 is a timing chart showing an example of a driving method of maximizing an accumulation period. Concerning the driving method shown in FIG. 19, a case in which an imaging mode in which the frame image rate is constant, and a high sensitivity without adding the additional capacitor Cfd' and a low sensitivity with addition of the additional capacitor Cfd' are used is set will be described. Images of the read two types of sensitivities are used as, for example, images for synthesis to expand the dynamic range.

Frame periods F1 to F5 represent the first to fifth frame periods after the start of imaging. Before imaging, an imaging mode is set. Upon detecting the leading edge of the pulse of the signal SYNC, the control unit 109 starts driving to generate a frame image in the frame period F1.

Driving SRSD in the frame period F1 will be described. An imaging mode is set before the start of imaging. Upon detecting the leading edge of the pulse of the signal SYNC, the control unit 109 starts driving to generate a frame image in the frame period F1. First, the control unit 109 activates an enable signal EN. Next, the control unit 109 temporarily activates the control signal TS1 while keeping the control signal WIDE for sensitivity switching inactive. Accordingly, the high-sensitivity voltage of the FD capacitor Cfd is transferred to the holding capacitor CS1 and held as the accumulation signal S1. Next, the control unit 109 activates the control signal WIDE for sensitivity switching and the control signal TS2. When the signal WIDE is activated, the transistor M1 changes to the conductive state, and the capacitor of the conversion portion CP becomes the composite capacitor of the FD capacitor Cfd and the capacitor Cfd'. The output of the conversion portion CP is a low-sensitivity voltage of the composite capacitor of the FD capacitor Cfd and the capacitor Cfd' corresponding to the charges generated in the photodiode PD.

Next, the control unit 109 inactivates the control signal WIDE for sensitivity switching. The transistor M1 changes to the non-conductive state, and the capacitor of the conversion portion CP becomes the FD capacitor Cfd, but the output of the conversion portion CP is maintained. Next, the control unit 109 inactivates the control signal TS2. The low-sensitivity voltage is transferred to the holding capacitor CS2 and held as the accumulation signal S2. Here, the accumulation signals S1 and S2 are unnecessary signals in the first driving SRSD of imaging.

Next, the control unit 109 activates the reset signal PRES and activates the control signal WIDE. Accordingly, a reset voltage VRES that is a predetermined potential is supplied to the photodiode PD, and charges in the photodiode PD, the FD capacitor Cfd, and the additional capacitor Cfd' are reset. As a result, the voltage from the conversion portion CP at the time of resetting is input to an input terminal n1 of the clamp capacitor Ccl. Next, the control unit 109 inactivates the control signal WIDE for sensitivity switching. The transistor M1 changes to the non-conductive state, and the capacitor of the conversion portion CP becomes the FD capacitor Cfd.

Next, the control unit 109 activates the clamp signal PCL. Accordingly, the voltage VCL that is a predetermined potential is input to the output terminal n2 of the clamp capacitor Ccl. Next, the control unit 109 inactivates the reset signal PRES. This changes the reset transistor M2 to the non-conductive state. Next, the control unit 109 temporarily activates the control signal TS3 until the clamp signal PCL is inactivated. Accordingly, the reset signal S3 is transferred to the capacitor CS3 and held.

The control unit 109 inactivates the control signal TS3 and, after that, inactivates the clamp signal PCL. This changes a reset transistor M5 to the non-conductive state, the potential difference generated between the input terminal n1 and the output terminal n2 is held by the two terminals of the clamp capacitor Ccl, and the accumulation period T in which charges converted in correspondence with radiation are accumulated in the photoelectric conversion element PD starts. The control unit 109 inactivates the clamp signal PCL and, after that, inactivates the enable signal EN. The driving SRSD in the frame period F1 thus ends. In the period F1, since effective accumulation signals are not held by the holding capacitors CS1 and CS2, read of the pixel signal is not performed.

Upon detecting the next leading edge of the pulse in the signal SYNC, the control unit 109 starts driving to generate a frame image in the frame period F2. In the frame period F2 as well, the driving SRSD is performed, as in the frame period F1.

By the driving SRSD in the frame period F2, the high-sensitivity voltage of the FD capacitor Cfd corresponding to the charges generated in the photodiode PD in the accumulation period T of the frame period F1 is transferred to the holding capacitor CS1 and held as the accumulation signal S1. In addition, when the signal WIDE is activated, the transistor M1 changes to the conductive state, and the low-sensitivity voltage of the composite capacitor of the FD capacitor Cfd and the capacitor Cfd' corresponding to the charges generated in the photodiode PD is transferred to the holding capacitor CS2 and held as the accumulation signal S2. Finally, the reset signal S3 is transferred to the capacitor CS3 and held as the reset signal S3, and accumulation in the frame period F2 starts.

An operation of reading the accumulation signal S1, the accumulation signal S2, and the reset signal S3 in a period Tc of the frame period F2 will be described continuously with reference to FIG. 19. The reading circuit 20 starts reading the accumulation signal S1, the accumulation signal S2, and the reset signal S3 after the elapse of a predetermined time from the completion of holding of the signals. More specifically, first, the control unit 109 activates the select terminal Ecs. Next, the control unit 109 activates the control signal TRO1, and inactivates the control signal TRO2. The accumulation signal S1 is thus selected. Subsequently, the control unit 109 controls the vertical scanning circuit 403 and the horizontal scanning circuit 404, thereby selecting a pixel to read first in the plurality of pixels P included in the pixel array 120. Accordingly, the accumulation signal S1 of the first pixel is input to the inverting input terminal AMP− of the signal amplification unit 107, and the reset signal S3 is input to the noninverting input terminal AMP+ of the signal amplification unit 107. In this way, the reading circuit 20 reads the difference between the accumulation signal S1 and the reset signal S3 at the same timing.

The control unit 109 sequentially switches the selected pixel by controlling the horizontal scanning circuit 404, and reads the pixel data of one row as the difference between the accumulation signal S1 and the reset signal S3. Next, the control unit 109 inactivates the control signal TRO1 and activates the control signal TRO2. The accumulation signal S2 is thus selected. The control unit 109 sequentially switches the selected pixel by controlling the horizontal scanning circuit 404, and reads the pixel data of one row as the difference between the accumulation signal S2 and the reset signal S3. That is, the control unit 109 scans one row twice, reads the difference between the accumulation signal S1 and the reset signal S3 by the first scanning, and reads the difference between the accumulation signal S2 and the reset signal S3 by the second scanning.

The control unit 109 switches the control signal TRO1 and the control signal TRO2 for each scanning while controlling the vertical scanning circuit 403 and the horizontal scanning circuit 404, thereby generating pixel data used to generate two types of images in the read period R. The control unit 109 generates a high-sensitivity accumulation image based on the accumulation signal S1 held by the holding capacitor CS1 and a low-sensitivity accumulation image based on the accumulation signal S2 held by the holding capacitor CS2.

In each frame period after the frame period F3 as well, the same driving SRSD as described above is performed. By the driving SRSD, the accumulation signal S1 in the immediately preceding frame period is held. When the driving SRSD ends, the control unit 109 sequentially switches the selected pixel, and generates an accumulation image corresponding to the immediately preceding frame period.

In the correction method according to the fifth embodiment, a correction image is generated in advance before reception of an imaging start instruction, as in the third embodiment, and a radiation image at the time of radiation imaging is corrected using the correction image and the reset image generated immediately before radiation imaging.

Processing up to generation of a correction image based on the reset image and the dark image by the signal processing unit 101 that performs system control and frame image generation processing in radiation imaging are the same as the procedures shown in FIGS. 12 and 13 of the third embodiment. In the fifth embodiment, processing for handling two types of pixel signals of different sensitivities is different. That is, imaging mode setting processing, image acquisition processing, averaging processing, and correction image generation processing in FIG. 12 and imaging mode setting processing, image acquisition processing, averaging processing, and frame image generation processing in FIG. 13 are different. These differences will be described below with reference to FIGS. 20A to 21.

Figure 20A:
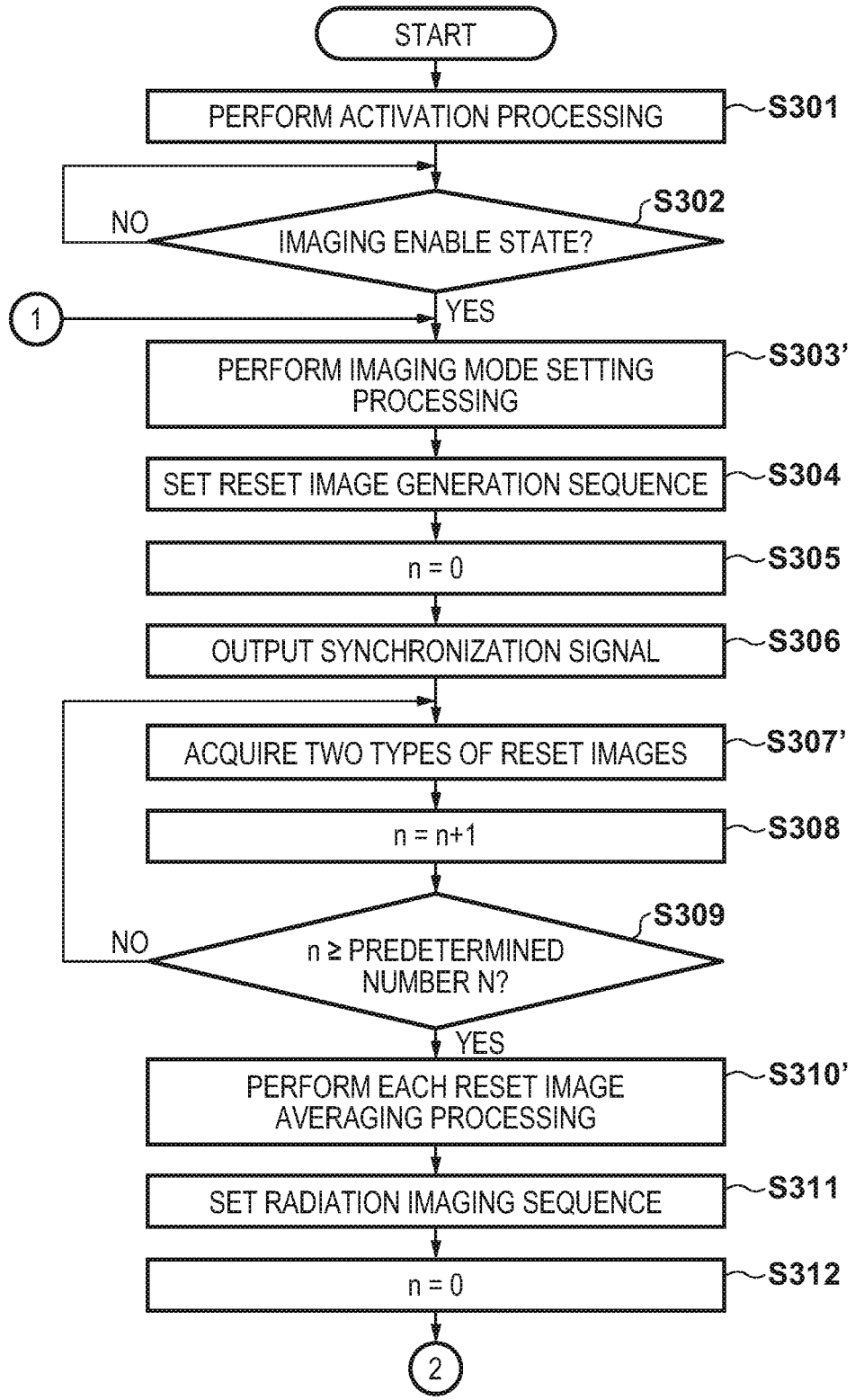
FIGS. 20A and 20B are flowcharts showing an example of processing of generating a correction image in an imaging mode using two types of sensitivities according to some embodiments of the present invention.
Figure 20B:
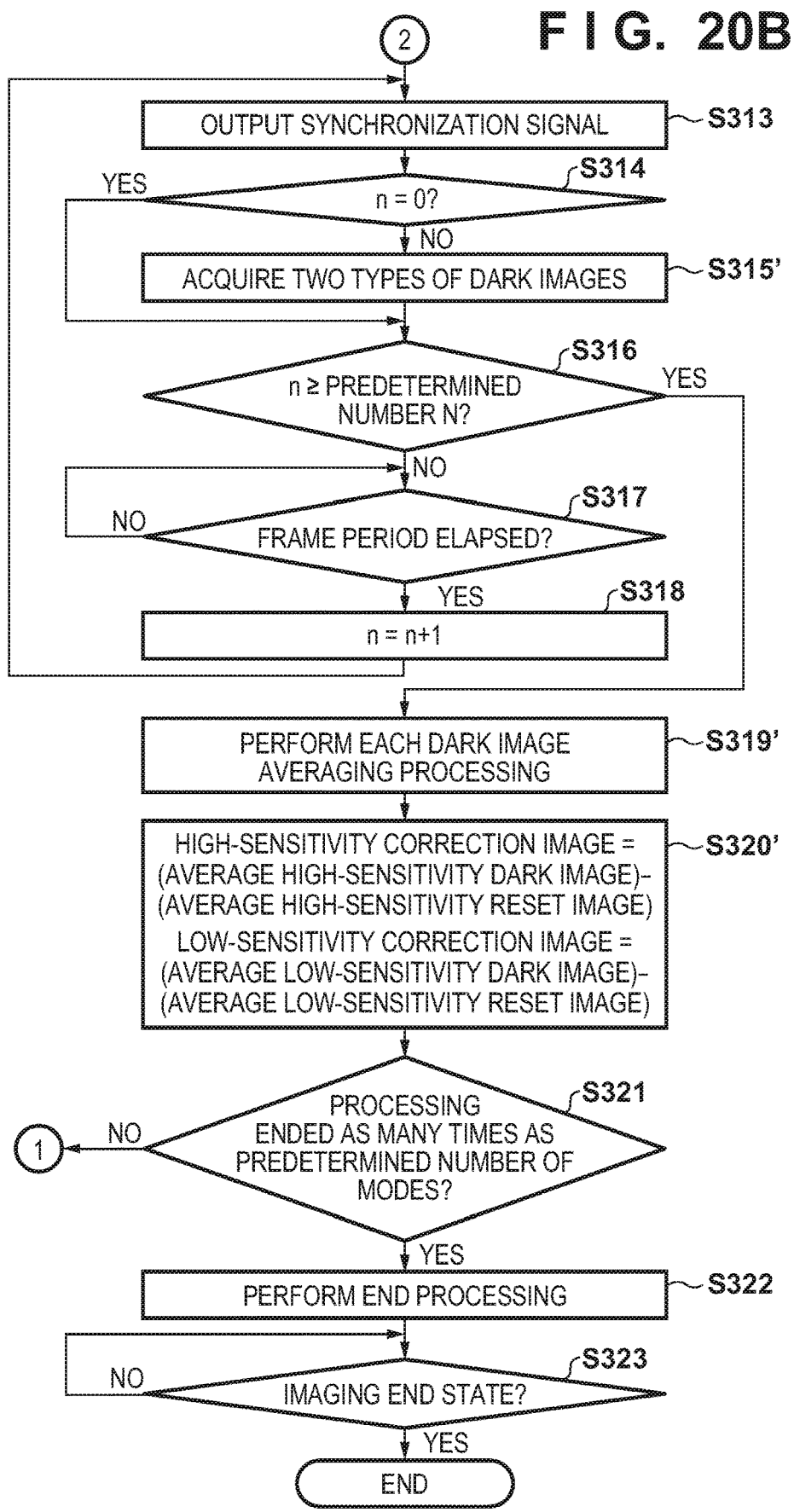

FIGS. 20A and 20B are flowcharts showing an example of processing of generating a correction image in an imaging mode using two types of sensitivities. This processing is performed before a radiation imaging system SYS receives an imaging start instruction from the user. The difference between the third embodiment and the fifth embodiment will mainly be explained below. In step S303', the signal processing unit 101 issues a control command to the control unit 109 and sets an imaging mode. Setting of the imaging mode includes signal read with two types of sensitivities, setting of a frame image rate, accumulation time setting, pixel addition setting, and the like.

In step S307', the control unit 109 drives an imaging panel 105 and the reading circuit 20 based on the pattern shown in FIG. 18. The control unit 109 generates a high-sensitivity reset image and a low-sensitivity reset image and transfers them to the signal processing unit 101. The signal processing unit 101 stores the transferred pixels in the storage unit 115.

In step S310', the signal processing unit 101 generates an average high-sensitivity reset image and an average low-sensitivity reset image by averaging the predetermined number N of received high-sensitivity reset images and the predetermined number N of received low-sensitivity reset images, and stores them in the storage unit 115.

In step S315', the control unit 109 drives the imaging panel 105 and the reading circuit 20 based on the pattern shown in FIG. 19. The signal processing unit 101 receives one high-sensitivity dark image and one low-sensitivity dark image and stores the received dark images in the storage unit 115.

In step S319', the signal processing unit 101 generates an average high-sensitivity dark image and an average low-sensitivity dark image by averaging the predetermined number N of received high-sensitivity dark images and the predetermined number N of received low-sensitivity dark images, and stores then in the storage unit 115. In step S320', the signal processing unit 101 generates a high-sensitivity correction image and a low-sensitivity correction image using the average high-sensitivity dark image, the average low-sensitivity dark image, the average high-sensitivity reset image, and the average low-sensitivity reset image stored in the storage unit 115.

Figure 21:
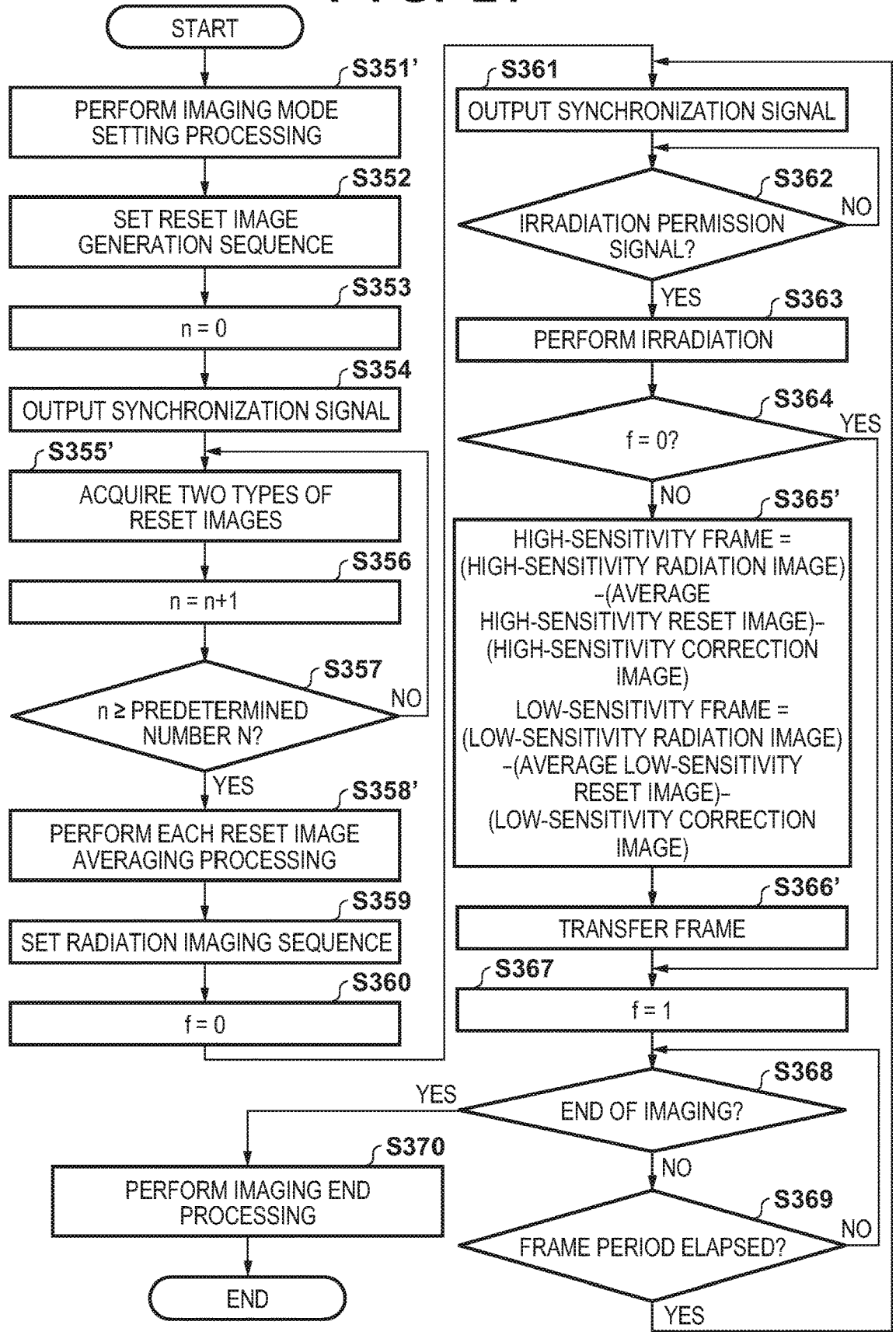
FIG. 21 is a flowchart showing an example of processing of performing offset correction of a radiation image in an imaging mode using two types of sensitivities according to some embodiments of the present invention.

FIG. 21 is a flowchart showing an example of processing of correcting a radiation image in the imaging mode using two types of sensitivities. The difference between the third embodiment and the fifth embodiment will mainly be explained below. In step S351', the signal processing unit 101 issues a control command to the control unit 109 and sets an imaging mode. Setting of the imaging mode includes signal read with two types of sensitivities, setting of a frame image rate, accumulation time setting, pixel addition setting, and the like.

In step S355', the control unit 109 drives the imaging panel 105 and the reading circuit 20 based on the pattern shown in FIG. 18. The control unit 109 A/D-converts a reset signal held by each pixel within the frame period, generates a high-sensitivity reset image and a low-sensitivity reset image, and transfers them to the signal processing unit 101. The signal processing unit 101 stores the transferred images in the storage unit 115.

In step S358', the signal processing unit 101 generates an average high-sensitivity reset image data and an average low-sensitivity reset image data by averaging the predetermined number N of received high-sensitivity reset image data and the predetermined number N of received low-sensitivity reset image data, and stores them in the storage unit 115.

In step S365', the control unit 109 A/D-converts an accumulation signal held by each pixel within the frame period, generates a high-sensitivity radiation image and a low-sensitivity radiation image, and transfers them to the signal processing unit 101. The signal processing unit 101 reads the average reset images and the correction image from the storage unit 115. The signal processing unit 101 subtracts the average reset image of the corresponding sensitivity and the correction image from the sequentially transferred radiation image, thereby generating a frame image.

In step S366', frame images of a plurality of sensitivities are transferred to the post-process in accordance with the imaging mode. In the post-process, image processes such as gain correction processing, dynamic range expansion processing, and sharpening processing are performed for the transferred frame images by a pipeline method in parallel to the radiation imaging. In imaging such as radiation fluoroscopy in which an image is observed in real time, an image after processing is transferred to a display unit 102 and displayed. In imaging such as 3D imaging in which processing is performed based on a plurality of images, a frame image after image processing is stored in the storage unit 115. The signal processing unit 101 continues the processing of the acquired images up to the end of the imaging.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-185316, filed Sep. 26, 2017, and No. 2017-185320, filed Sep. 26, 2017, which are hereby incorporated by reference herein in their entirety.

What is claimed is:

1. A radiation imaging system for generating a moving image, comprising:
   a plurality of pixels each including a signal generation unit configured to convert radiation into charges;
   a reading circuit electrically connected to the signal generation unit and configured to read, from each pixel, an accumulation signal output from the signal generation unit in accordance with accumulated charges and a reset signal output from the signal generation unit that is in a reset state;
   a storage unit capable of storing data; and
   a signal processing unit configured to store, in the storage unit, a correction image generated based on the reset signal and the accumulation signal read from each pixel before initial irradiation, said signal processing unit being further configured to generate a frame image in each frame period based on a radiation image generated based on the accumulation signal read from each pixel, a reset image generated based on the reset signal read from each pixel, and the correction image stored in the storage unit.

2. The system according to claim 1, wherein the accumulation signal and the reset signal are read from each pixel to the reading circuit via a same signal path.

3. The system according to claim 1, wherein each of the plurality of pixels further includes a holding portion capable of holding the accumulation signal and the reset signal, and
   the reading circuit reads the accumulation signal and the reset signal held by the holding portion.

4. The system according to claim 3, wherein the accumulation signal is held by the holding portion after the reset signal is read from the holding portion.

5. The system according to claim 3, wherein an accumulation period to generate the accumulation signal starts after the reset signal is held by the holding portion.

6. The system according to claim 1, wherein the signal processing unit is configured to generate the frame image by subtracting the reset image and the correction image from the radiation image.

7. The system according to claim 1, wherein each of the plurality of pixels further includes a first holding portion and a second holding portion,
   the first holding portion is configured to hold the accumulation signal output from the signal generation unit, and each of the first and second holding portions being configured to hold the reset signal output from the signal generation unit,
   the signal processing unit is configured to generate the reset image based on a first result of subtracting the reset signal read from the second holding portion via a second signal path from the reset signal read from the first holding portion via a first signal path before the initial irradiation, and
   the signal processing unit is further configured to generate the radiation image in each frame period based on a second result of subtracting the reset signal read from the second holding portion via the second signal path from the accumulation signal read from the first holding portion via the first signal path.

8. The system according to claim 7, wherein the reading circuit further comprises an A/D conversion unit, and
   the reading circuit is configured to supply the first result and the second result converted into digital data by the A/D conversion unit to the signal processing unit.

9. The system according to claim 1, wherein the signal processing unit is configured to generate the correction image based on the reset signal read from each pixel a plurality of times and the accumulation signal read a plurality of times.

10. A method of generating a moving image using data obtained by a radiation imaging apparatus including a plurality of pixels each including a signal generation unit configured to convert radiation into charges, and a reading circuit electrically connected to the signal generation unit and configured to read, from each pixel, an accumulation signal output from the signal generation unit in accordance with the accumulated charges and a reset signal output from the signal generation unit that is in a reset state, the method comprising:
    storing, in a storage unit, a correction image generated based on the reset signal and the accumulation signal read from each pixel before initial irradiation; and
    generating a frame image in each frame period based on a radiation image generated based on the accumulation signal read from each pixel, a reset image generated based on the reset signal read from each pixel, and the correction image stored in the storage unit.

11. A non-transitory storage medium storing a program for causing a computer to execute the method according to claim 10.

12. A radiation imaging system for generating a moving image, comprising:
    a plurality of pixels each including a signal generation unit configured to convert radiation into charges;
    a reading circuit electrically connected to the signal generation unit and configured to read, from each pixel, an accumulation signal output from the signal generation unit in accordance with accumulated charges and a reset signal output from the signal generation unit that is in a reset state;
    a storage unit capable of storing data; and
    a signal processing unit configured to store, in the storage unit, a correction image generated based on the reset signal and the accumulation signal read from each pixel before reception of an imaging start instruction, and to store, in the storage unit, a reset image generated based on the reset signal read from each pixel after the reception of the imaging start instruction and before initial irradiation, said signal processing unit being further configured to generate a frame image in each frame period based on a radiation image generated based on the accumulation signal read from each pixel, and the reset image and the correction image stored in the storage unit.

13. The system according to claim 12, wherein the accumulation signal and the reset signal are read from each pixel to the reading circuit via a same signal path.

14. The system according to claim 12, wherein each of the plurality of pixels further includes a holding portion capable of holding the accumulation signal and the reset signal, and
    the reading circuit is configured to read the accumulation signal and the reset signal held by the holding portion.

15. The system according to claim 12, wherein the signal processing unit is configured to generate the frame image by subtracting the reset image and the correction image from the radiation image.

16. The system according to claim 12, wherein each of the plurality of pixels further includes a first holding portion and a second holding portion,
- the first holding portion is configured to hold the accumulation signal output from the signal generation unit, and each of the first and second holding portions being configured to hold the reset signal output from the signal generation unit, and
- the signal processing unit is configured to generate the reset image based on a first result of subtracting the reset signal read from the second holding portion via a second signal path from the reset signal read from the first holding portion via a first signal path after the reception of the imaging start instruction and before the initial irradiation, and
- the signal processing unit is further configured to generate the radiation image in each frame period based on a second result of subtracting the reset signal read from the second holding portion via the second signal path from the accumulation signal read from the first holding portion via the first signal path.

17. The system according to claim 16, wherein the reset signal is not held by the first holding portion in each frame period.

18. The system according to claim 16, wherein the reading circuit further comprises an A/D conversion unit, and
- the reading circuit is configured to supply the first result and the second result converted into digital data by the A/D conversion unit to the signal processing unit.

19. The system according to claim 12, wherein the signal processing unit is configured to generate the correction image based on the reset signal read from each pixel a plurality of times and the accumulation signal read a plurality of times.

20. The system according to claim 12, wherein the signal processing unit is configured to generate the reset image based on the reset signal read from each pixel a plurality of times.

21. A method of generating a moving image using data obtained by a radiation imaging apparatus including a plurality of pixels each including a signal generation unit configured to convert radiation into charges, and a reading circuit electrically connected to the signal generation unit and configured to read, from each pixel, an accumulation signal output from the signal generation unit in accordance with the accumulated charges and a reset signal output from the signal generation unit that is in a reset state, the method comprising:
- storing, in a storage unit, a correction image generated based on the reset signal and the accumulation signal read from each pixel before reception of an imaging start instruction;
- storing, in the storage unit, a reset image generated based on the reset signal read from each pixel after the reception of the imaging start instruction and before initial irradiation; and
- generating a frame image in each frame period based on a radiation image generated based on the accumulation signal read from each pixel, and the reset image and the correction image stored in the storage unit.

22. A non-transitory storage medium storing a program for causing a computer to execute the method according to claim 21.

* * * * *